United States Patent [19]
Fairley et al.

[11] Patent Number: 5,672,861
[45] Date of Patent: *Sep. 30, 1997

[54] METHOD AND APPARATUS FOR AUTOMATIC FOCUSING OF A CONFOCAL LASER MICROSCOPE

[75] Inventors: Christopher R. Fairley; Timothy V. Thompson, both of San Jose; Ken K. Lee, Los Altos, all of Calif.

[73] Assignee: Ultrapointe Corporation, San Jose, Calif.

[*] Notice: The term of this patent shall not extend beyond the expiration date of Pat. No. 5,483,055.

[21] Appl. No.: 373,145

[22] Filed: Jan. 17, 1995

Related U.S. Application Data

[63] Continuation-in-part of Ser. No. 183,536, Jan. 18, 1994, Pat. No. 5,483,055.

[51] Int. Cl.$^6$ .................................................. G01J 1/20
[52] U.S. Cl. ............................... 250/201.3; 359/368
[58] Field of Search ........................ 250/201.3, 201.2, 250/204, 216; 359/361, 381, 371

[56] References Cited

U.S. PATENT DOCUMENTS

| | | | |
|---|---|---|---|
| 4,342,905 | 8/1982 | Fujii et al. | 250/201 |
| 4,844,617 | 7/1989 | Kelderman et al. | 356/372 |
| 5,122,648 | 6/1992 | Cohen et al. | 250/201.3 |
| 5,306,902 | 4/1994 | Goodman | 250/201.3 |
| 5,483,055 | 1/1996 | Thompson et al. | 250/201.3 |

*Primary Examiner*—Stephone Allen
*Attorney, Agent, or Firm*—Skjerven, Morrill, MacPherson, Franklin & Friel; Omkar Suryadevara

[57] ABSTRACT

A microscope system moves a target in a first direction relative to a low power objective lens and, during the relative motion, generates and records values of an electronic focus signal that depends on the magnitude of light reflected by the target. Then, a host workstation calculates a first estimate of position ("focus position") of the target at which the microscope system is focused, by a median point method. In the median point method, the host workstation calculates the sum of the recorded values and determines the position along the range of motion at which half of this sum was exceeded, to be a first estimate of the focus position. From the intensity values of the first pass, optimal sensor gain is set for subsequent passes. Second and third estimates of the focus position can be calculated in a similar manner if necessary and the target is moved to the most recent estimate of the focus position. In one embodiment, the microscope system uses an area scan in which the largest value of an electronic focus signal at a set of points within an area of the target is recorded at a given elevation of the target. The largest of the recorded values is then used to estimate the focus position of the brightest layer of the target. In one embodiment, the microscope system focuses on a predetermined layer using an offset from the brightest layer.

30 Claims, 42 Drawing Sheets

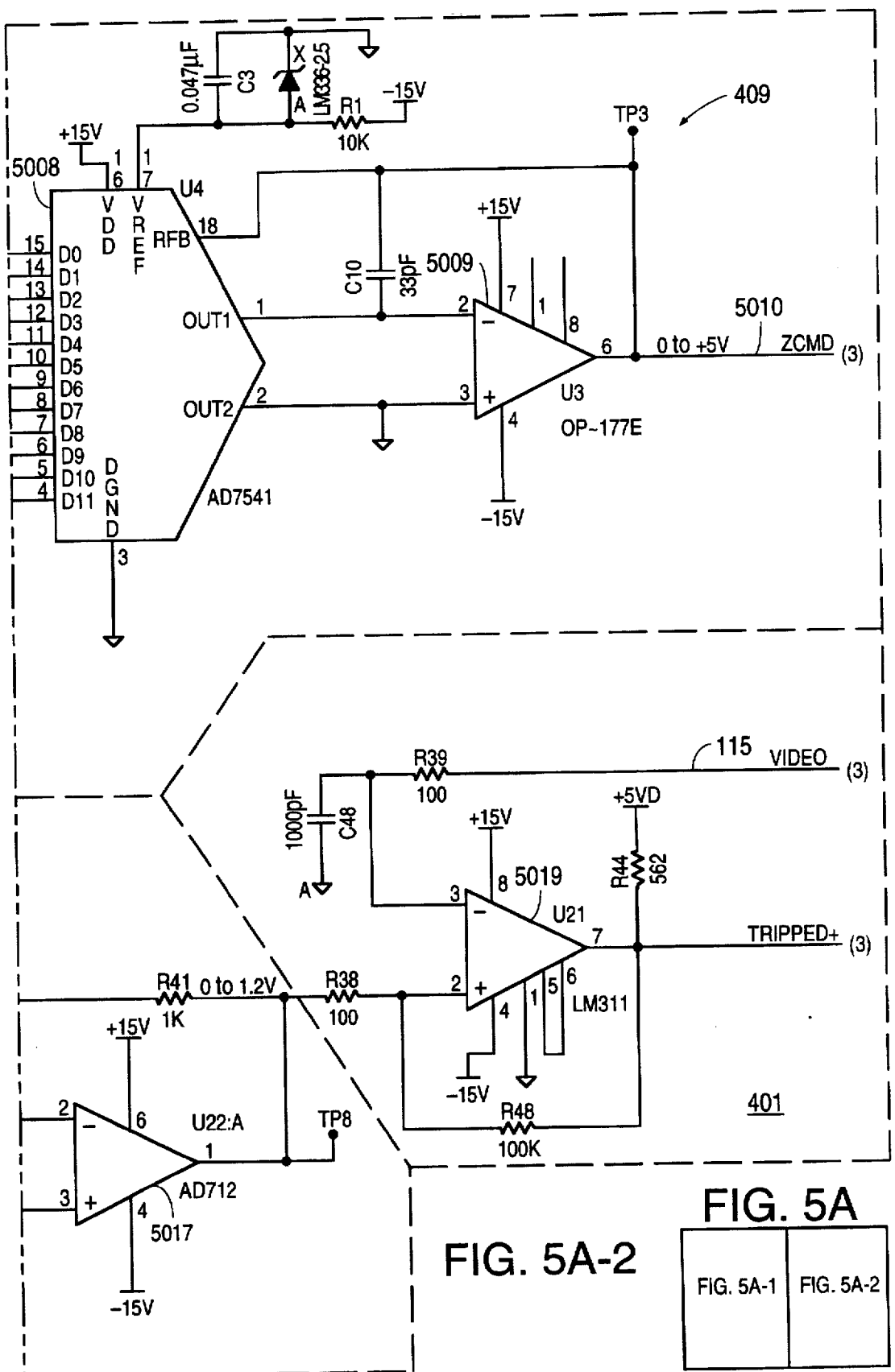
FIG. 5A-2
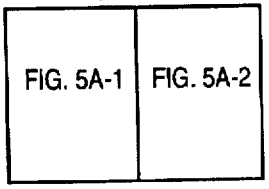

| FIG. 5B-1 | FIG. 5B-2 |

| FIG. 5C-1 | FIG. 5C-2 |

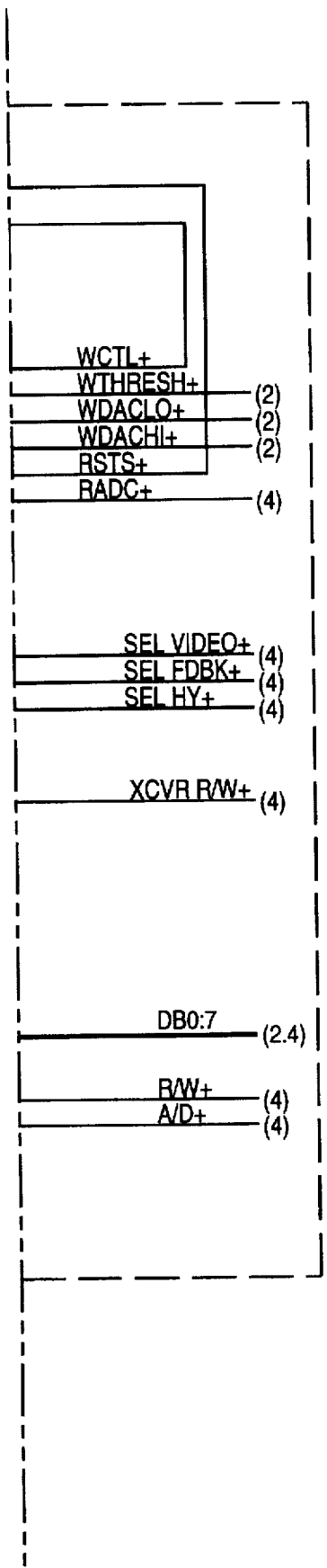
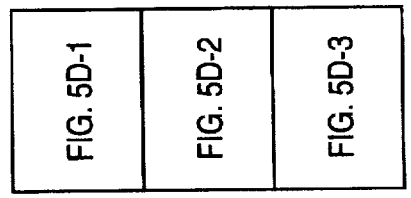
FIG. 5D-3
FIG. 5D

| FIG. 12A | FIG. 12B |

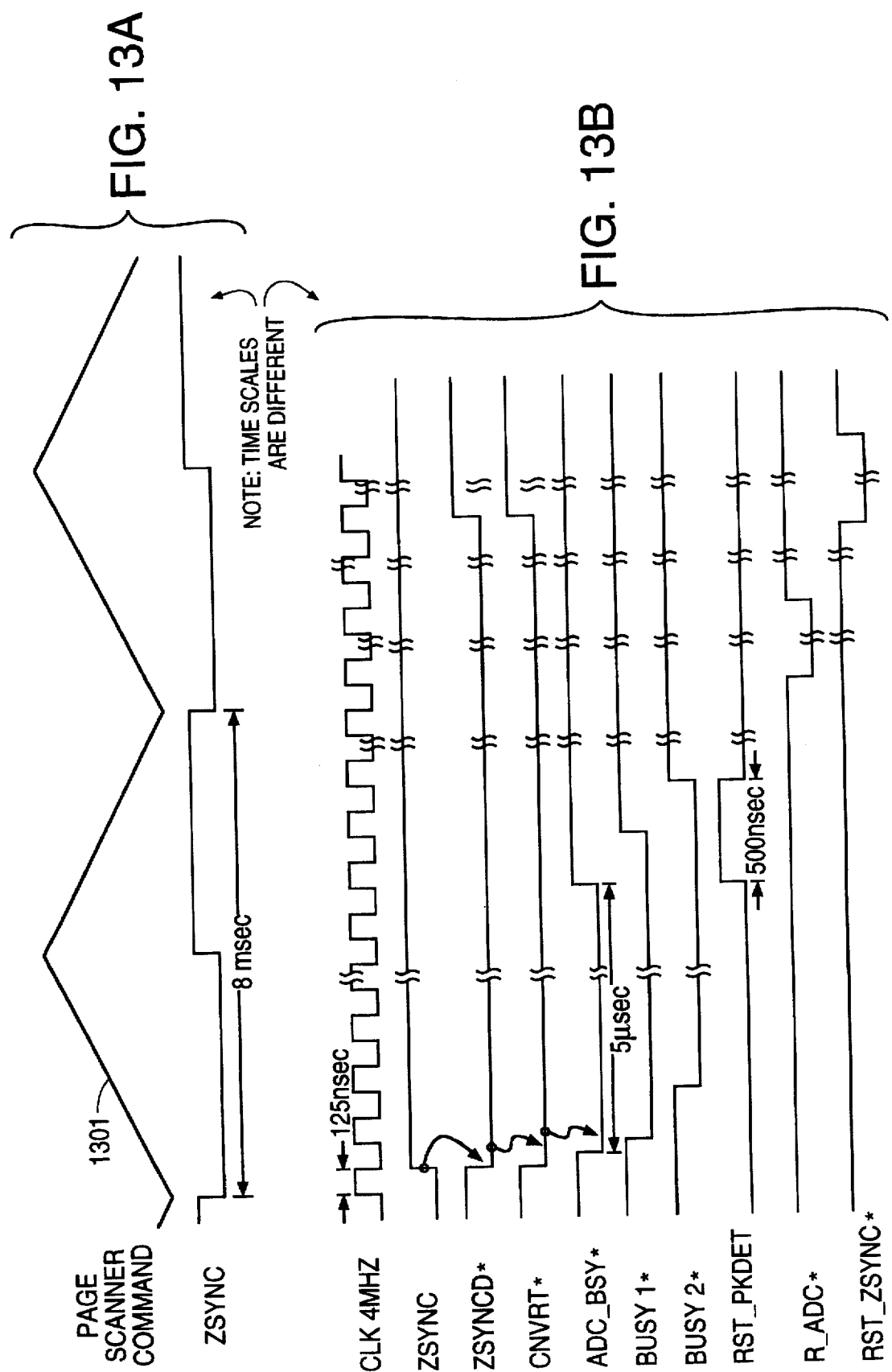

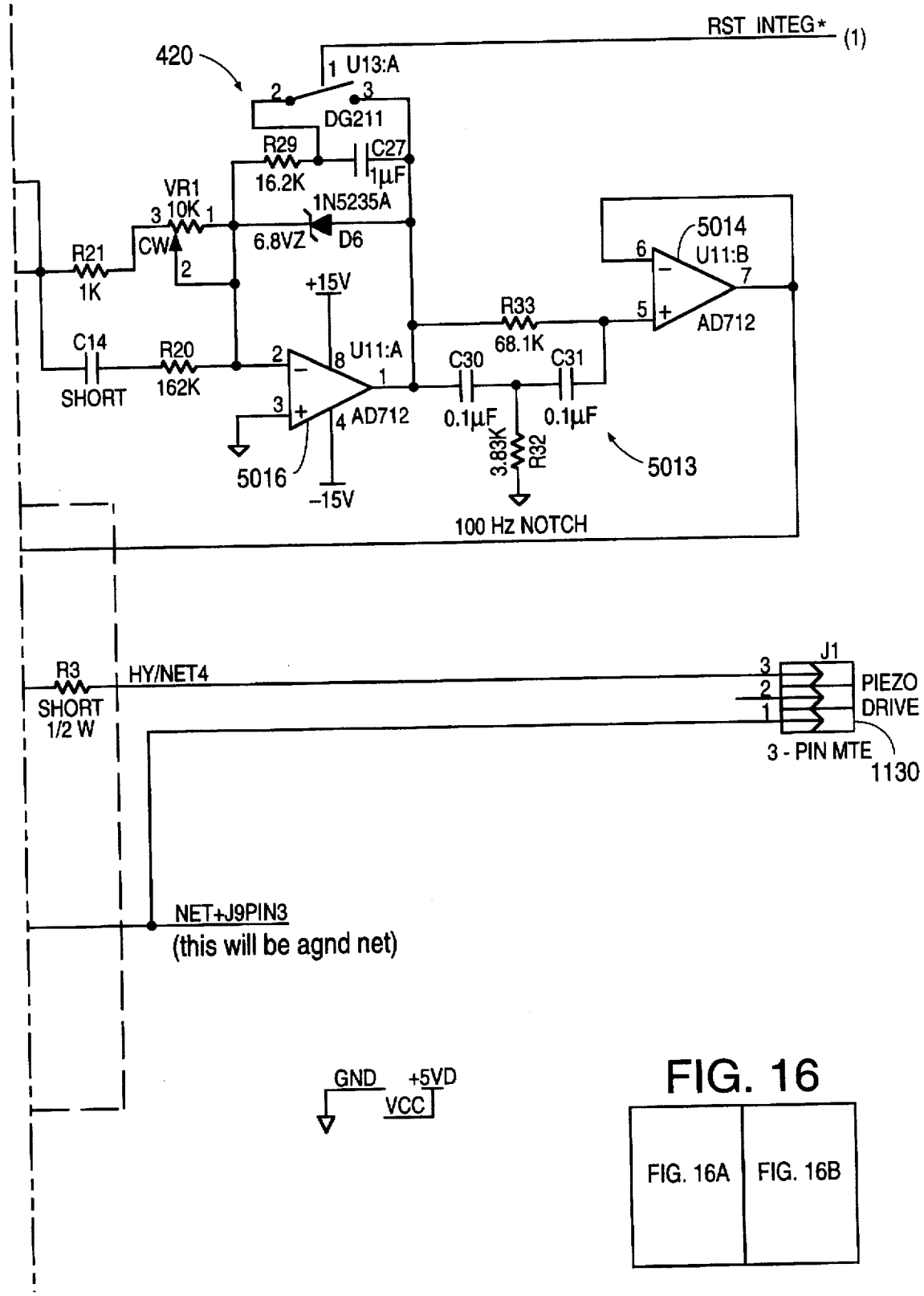

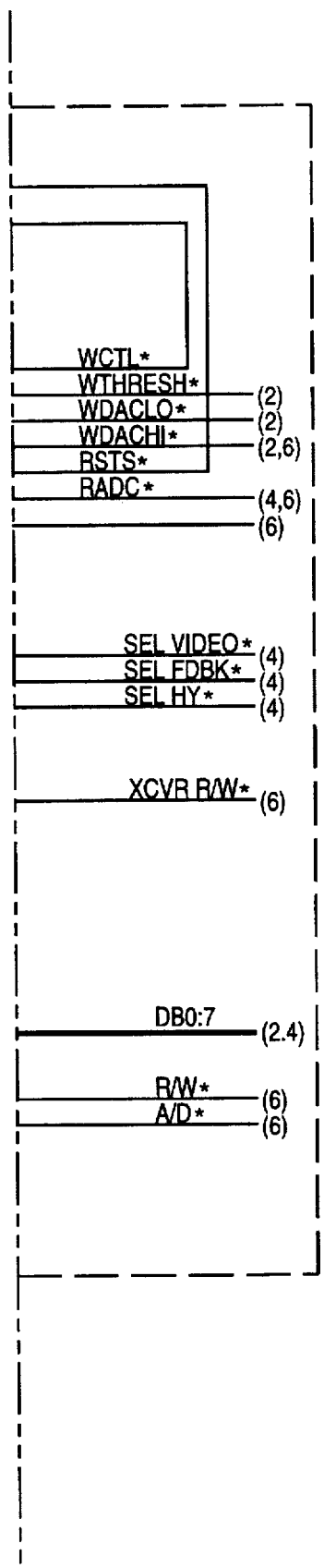
FIG. 17C
FIG. 17
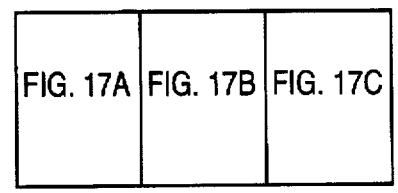

METHOD AND APPARATUS FOR AUTOMATIC FOCUSING OF A CONFOCAL LASER MICROSCOPE

CROSS-REFERENCE TO RELATED APPLICATIONS

This application is a continuation-in-part of U.S. patent application Ser. No. 183,536, filed Jan. 18, 1994 now U.S. Pat. No. 5,483,055, entitled "A Method and Apparatus for Performing an Automatic Focus Operation" filed by Thompson et al. on Jan. 18, 1994 that is incorporated by reference herein in its entirety.

This application is related to and incorporates by reference copending, commonly owned U.S. Pat. No. 5,557,113, entitled "Surface Data Processor."

This application is also related to and incorporates by reference, copending, commonly owned U.S. patent application Ser. No. 08/080,014, issued Dec. 26, 1995, as U.S. Pat. No. 5,479,252 entitled "Laser Imaging System for Inspection and Analysis of Sub-Micron Particles", filed by Bruce W. Worster et al, on Jun. 17, 1993.

CROSS-REFERENCE TO ATTACHED APPENDICES

Microfiche Appendices A–E (2 sheets of 158 frames) that are attached herewith, are parts of the present disclosure and are incorporated herein by reference in their entirety. Microfiche Appendices A and B are a listing of routines that are used in microprocessors of coarse and fine Z controllers in two alternative embodiments of a microscope system. Microfiche Appendix C is a listing of routines that are used in a programmer to program a Programmable Logic Device (PLD). Microfiche Appendix D is a listing of components used in one embodiment of a microscope system. Microfiche Appendix E is a listing of routines that implement computations for various auto-focus operations.

Appendix F is a listing of host workstation software that sets up various parameters for use in the area scan method. Appendix G, entitled "Ultrapointe Model 1000 Laser Imaging System Users' Manual" attached herewith is part of present disclosure and is incorporated herein by reference in its entirety.

NOTICE OF COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to a method and apparatus for automatic focusing. More particularly, the present invention relates to automatic focusing of a confocal microscope.

BACKGROUND OF THE INVENTION

Certain prior art auto-focus microscopes generate an electronic focus signal, that is related to the distance of the target from an objective lens of the microscope, to determine the position at which the target is in focus (henceforth "focus position").

In other auto-focus microscopes, a white light camera is used to detect a maximum contrast in the camera picture to indicate when the target is in focus. Measuring the picture contrast requires a large amount of computer processing. This method is therefore slow and complicated. Additionally, this method fails if the target has no contrast (i.e., if the target is flat and has a uniform color, or is mirror-like).

The above method can fail depending on the amount of noise in the electronic focus signal, such as the noise introduced by vibration of the target during relative movement between the target and the microscope. Such noise can result in detection of a false focus position when a microprocessor uses a low power objective lens. A low power objective lens is a lens that has a low power, such as 1.5× or 5×, as opposed to a high power objective lens that has a high power, such as 100× or 200×.

Use of a low power objective lens can result in a large depth of focus, for example, greater than half the range of motion of the target with respect to the microscope. A large depth of focus combined with noise can result in an electronic focus signal that does not have a single distinct well defined peak that is essential for proper operation of certain conventional microscopes. In such a case, a microscope can use a false peak to move the target to a position at a distance from the focus position, thereby requiring manual focusing.

In certain conventional microscopes, an electronic focus signal that is used for automatic focusing is generated from an illumination spot held stationary on the target. The illumination spot could be broad band white light or monochromatic laser light. Local height variations in the surface of the target can cause the focused condition for the entire filed of view to be less than optimal if the spot at which focusing is performed is significantly higher or lower than the elevation of the remainder of the target's surface in the field of view. Therefore in targets, such as semiconductor substrates, that consist of highly regular orthogonal lines, for example, row and column bit lines of a DRAM, the microscope can produce different results depending on whether a portion of a DRAM line or a portion of the substrate between two DRAM lines lies within the spot. If the spot is on a portion of the substrate in a trench, the microscope focuses on the bottom of the trench. If the spot is on the top of a levee, the microscope focuses on the top of the levee.

However, it is desirable that the microscope focus on the same layer all the time, for example, on the top layer, regardless of what layer happened to be within the spot, and regardless of the materials on the top layer. In the multi-layer structure of a substrate, the different layers can be of different materials with different reflectivities. In a typical wafer, the top layer is a transparent passivation layer, and a predetermined layer that is typically desired is under the top layer. There is a need to focus on such a predetermined layer even if the predetermined layer does not have the highest reflectivity.

Speed, accuracy and repeatability are additional desirable characteristics for focusing a microscope. The time required to automatically focus a microscope determines the number of targets that can be viewed in a given time period, or, equivalently, determines the amount of time required to view a given number of targets, and thereby determines the cost associated with viewing each sample.

Certain prior art microscopes utilize auto-focus optics that are separate from the imaging optics of the microscope. In such microscopes, any "drift" between the auto-focus optics and the imaging optics results in loss of auto-focusing accuracy and repeatability.

It is therefore desirable to have a microscope that can automatically focus on a predetermined layer of a target quickly, accurately and repeatably.

SUMMARY OF THE INVENTION

In accordance with the present invention a confocal microscope system (henceforth "microscope system") uses a median point method for a coarse autofocus operation and an area scan method for a fine autofocus operation to provide accurate, repeatable and high-speed automatic focusing on any predetermined layer of a target. During an auto-focus operation, such as a coarse auto-focus operation or a fine auto-focus operation, the microscope system moves a target with respect to an objective lens, while an electronic focus signal is measured. In a coarse auto-focus operation, the value of the electronic focus signal is recorded periodically at large distances between a target's elevation, as compared to smaller distances used in a fine auto-focus operation.

The electronic focus signal generated by the microscope system is a novel signal that has a magnitude proportional to the amount of light reflected by the target. The electronic focus signal reaches a maximum (sometimes referred to as "peak") when the target is in focus. The electronic focus signal is used to control an auto-focus operation in which the target is moved to its focus position (an elevation at which the target is in focus) with respect to the objective lens of a confocal microscope. Such an electronic focus signal provides a very precise indication of the focus position of the target. In one embodiment, the electronic focus signal is also used to generate an image of the target. Since the same signal (electronic focus signal) is used for both focusing and imaging, a good image signal is obtained after the auto-focus operation. The narrow peak also allows the microscope system to discriminate between semi-transparent layers of the target.

In a coarse auto-focus operation, when using an objective lens having low power (e.g. 1.5× or 5×), the microscope system moves the target in a start-up move to a predetermined starting position so that the direction of the focus position is in a first predetermined direction (e.g. positive Z-axis direction) with respect to the starting position. Then the microscope system moves the target in a first pass (a movement during which electronic focus signal values are recorded), in the first direction through a predetermined first distance (e.g. one-third of the complete range of motion) and after completion of the target's movement calculates a first estimate of the focus position by the median point method. In the median point method, a host workstation calculates the sum of the recorded values and determines the target's position at which half of this sum was exceeded, to be a first estimate of the focus position. After calculating an estimate of the focus position, the microscope system moves the target to this focus position estimate.

Depending on the amount of jitter, or lack thereof in the movement of the target, additional or fewer estimates of the focus position can be calculated prior to movement of the target to the focus position. The number of estimates are kept to a minimum, to get the highest speed possible.

In one embodiment, after a first pass in a coarse auto-focus operation, the microscope system makes an optional second pass (similar to the first pass), to move the target through a predetermined second distance that includes positions on both sides of the focus position's first estimate. During the second pass, the microscope system again records the values of the electronic focus signal, and calculates a second estimate of the focus position, again using the median point method. Although the second pass is optional, a coarse auto-focus operation for a low power objective lens that includes two passes has the advantage of accurate and repeatable focusing even in the presence of noise that typically causes conventional microscopes to malfunction. Also, such an auto-focus operation does not require a threshold and allows focus to be found quickly over a large range, but with high accuracy from the second pass. Finally, the median point method is less susceptible to stage backlash and stage motion irregularity than other conventional methods.

An auto-focus operation can be implemented with any one of three methods for generating the electronic focus signal: (a) spot method, (b) line scan method or (c) area scan method, in which a microscope system measures the value of an electronic focus signal for each elevation of the target (a) as the illumination spot is held stationary, (b) as the illumination spot is scanned along a line, or (c) as the illumination spot is scanned in an area in the field of view respectively. In a line scan method and an area scan method, the electronic focus signal can be measured at discrete spots or alternatively measured continuously over an infinite number of spots. In each of these three methods, the microscope system moves the target through several elevations, and determines the elevation that generates the peak (e.g. largest value) of the electronic focus signal.

Automatic focusing can be based on a line scan, so that the electronic focus signal is generated for several spots along a line segment on the target and the microscope automatically focuses on the brightest feature of the target that is in that line segment.

Automatic focusing can be based on an area scan, using an area peak detector (sometimes referred to as "peak detector") that generates and a microprocessor that records the largest value of the electronic focus signal as the illumination spot scans an area.

The microprocessor computes an estimate of the focus position by using the recorded values of the electronic focus signal for each target elevation. In one embodiment, during a pass in a fine auto-focus operation, the microprocessor estimates the focus position to be the target elevation at which the largest recorded value (sometimes referred to as "peak value") of the electronic focus signal was generated, and the microscope system moves the target to focus on the layer ("brightest layer") that generated this largest recorded value.

A predetermined layer that the user is interested in focusing on can be reached using an offset from the brightest layer. Use of the brightest layer and the offset results in an accurate and repeatable auto-focus operation that is dependent only on the brightest layer's reflectivity and is not influenced by the shape, location, or extent of other features on a target. Such an auto-focus operation is also not dependent on prior knowledge of the reflectivity of the predetermined layer.

The invention will be more fully understood in light of the following drawings taken together with the detailed description.

BRIEF DESCRIPTION OF THE DRAWINGS

FIGS. 13A, 13B and 13C are timing diagrams illustrating various signals in one embodiment of a confocal microscope system.

DETAILED DESCRIPTION

Figure 1:
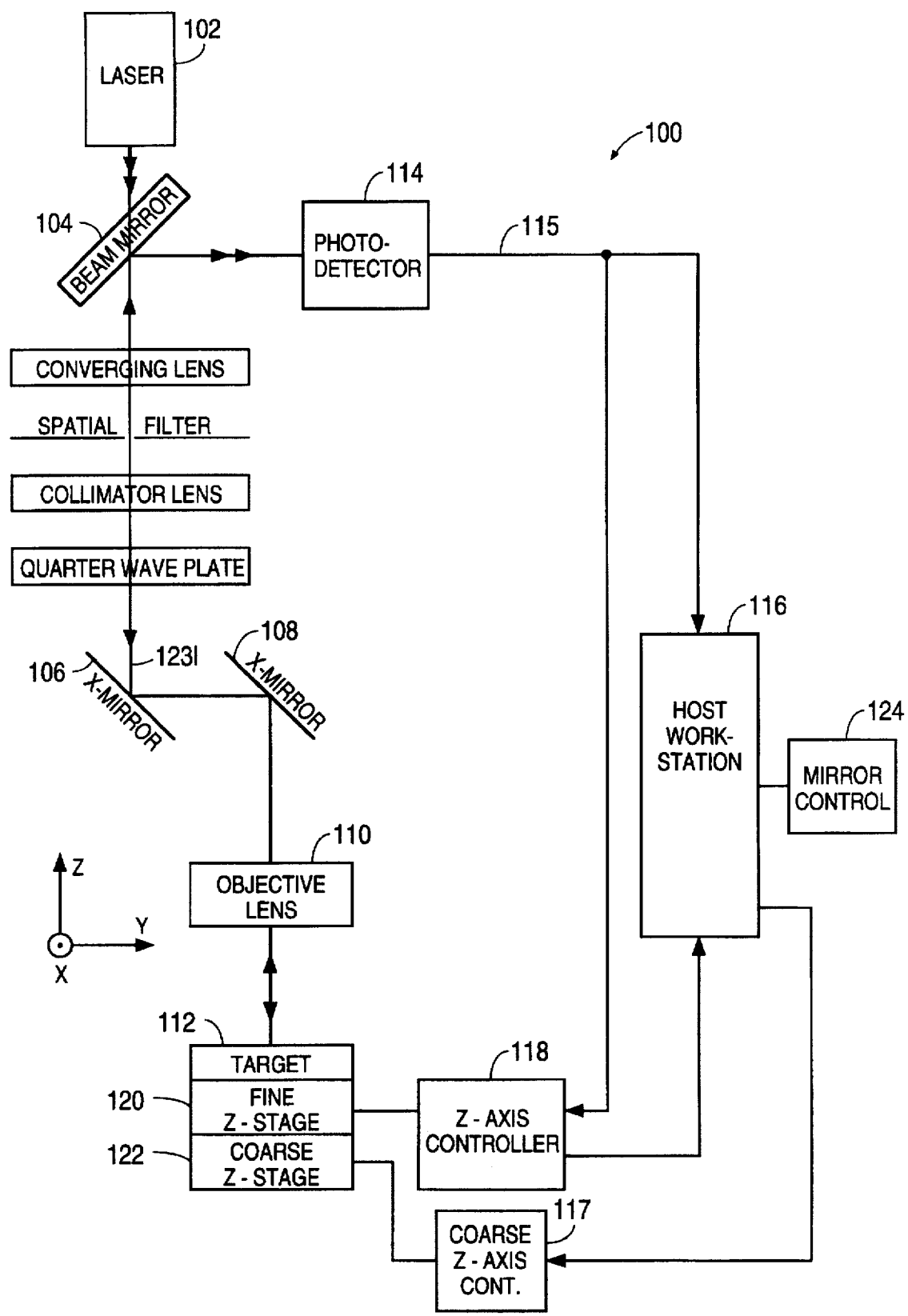
FIG. 1 is a simplified block diagram that illustrates a confocal microscope system according to an embodiment of the invention.

FIG. 1 is a simplified block diagram of a confocal microscope system 100 described briefly below and described in more detail in commonly owned, copending U.S. Pat. No. 5,479,252, entitled "Laser Imaging System for Inspection and Analysis of Sub-Micron Particles", filed by Bruce W. Worster et al, on Jun. 17, 1993, that is incorporated herein by reference in its entirety.

Laser 102 (FIG. 1) generates a laser beam 123I that is transmitted through a polarizing beam splitter 104, a converging lens 130, a spatial filter 131 (such as a pinhole), a collimator lens 132, a quarter waveplate 133, reflected from an X-mirror 106 and a Y-mirror 108, and transmitted through an objective lens 110 to the surface of a target 112. In one embodiment, laser 102 is a conventional argon-ion laser, however, other types of lasers may be utilized in alternate embodiments. Target 112 is an object, such as a semiconductor wafer, that is to be viewed using microscope system 100. X-mirror 106 and Y-mirror 108 are each rotatable about an axis such that the illumination spot created by incident laser beam 123I can be moved along an X-axis and a Y-axis, respectively, of target 112. Laser 102, beam splitter 104, converging lens 130, spatial filter 131, collimator lens 132, quarter waveplate 133, X-mirror 106, Y-mirror 108 and objective lens 110 are each conventional structures that are well known by those skilled in the art of confocal microscopes.

Figure 2B:
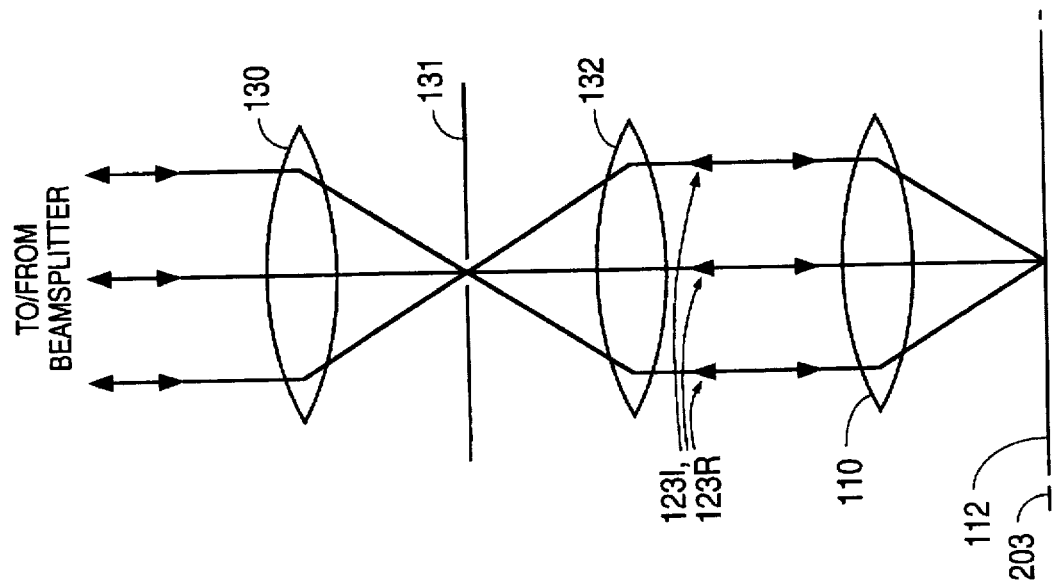
FIGS. 2A–2C show a target of a confocal microscope below the focus position, at the focus position and above the focus position, respectively, illustrating, at each position, the pattern of light reflected from the target.
Figure 2A:
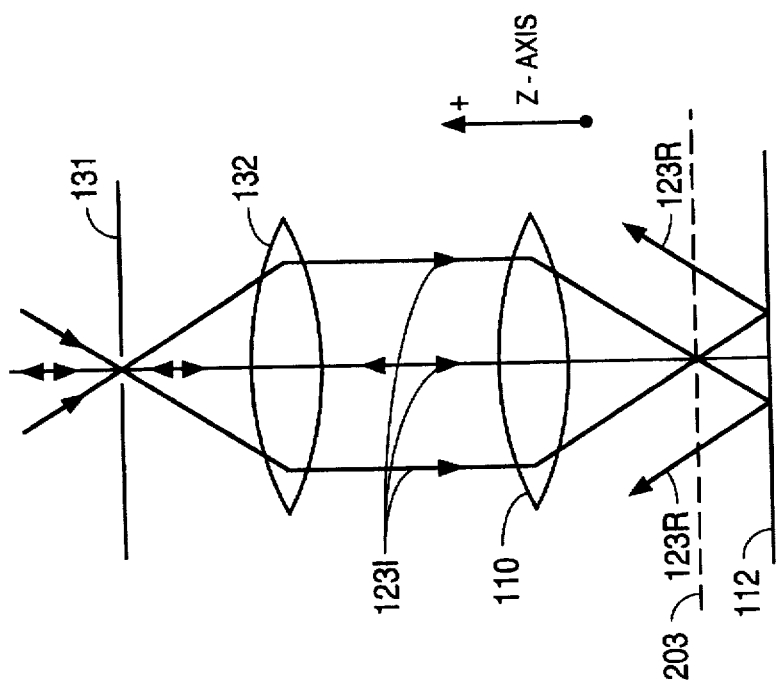
Figure 2C:
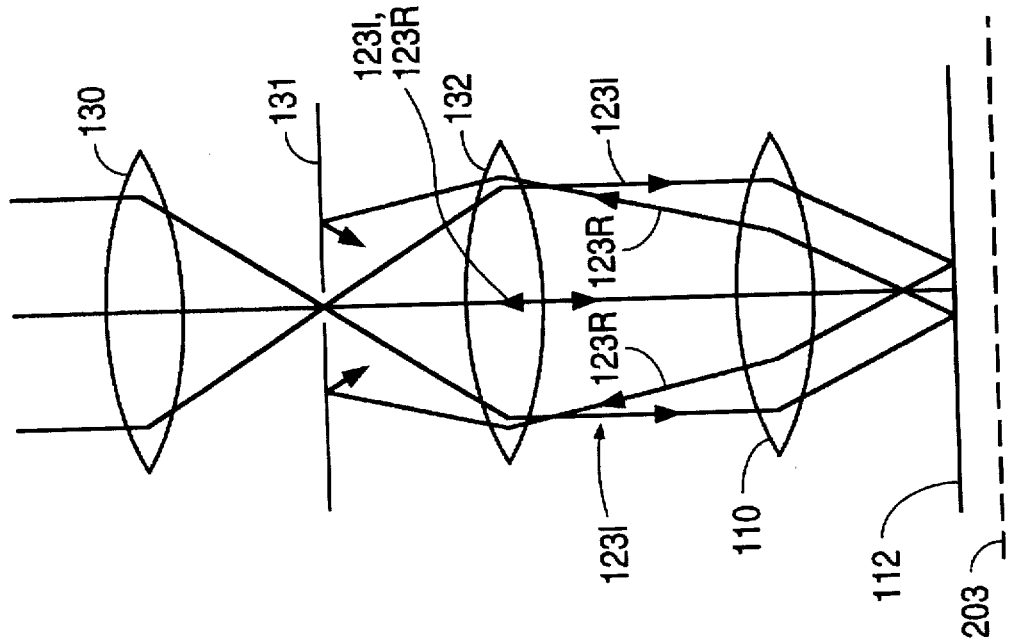

Laser beam 123I reflects from the surface of target 112 in a pattern (illustrated in FIGS. 2A–2C) that is dependent upon the distance of objective lens 110 from target 112. FIGS. 2A–2C show target 112 below focus position 203, at focus position 203 and above focus position 203, respectively. When target 112 is positioned below or above focus position 203, respectively, a small percentage of light 123R from incident laser beam 123I that is originally transmitted through objective lens 110 is reflected back through objective lens 110 in a coherent manner. The amount of reflected light 123R is illustrated by the graph of the electronic focus signal as a function of position in FIG. 3A. There is a gradual transition in the amount of reflected light (depending on the target's position) between FIGS. 2A–2C. As is well known in microscope engineering art, the amount of reflected light also depends on, for example, reflectivity of target, angle of target and angle of the chuck that supports the target.

Microscope system 100 includes a spatial filter 131 with a pin hole that permits passage of incident laser beam 123I and some portion of reflected light 123R, the portion depending on the position of target 112. Spatial filter 131 blocks off the rest of reflected light 123R as illustrated in FIGS. 2A and 2C. However, when target 112 is positioned at focus position 203 (FIG. 2B), a maximum amount of light from incident laser beam 123I is reflected (light 123R) and transmitted back through objective lens 110 and the pinhole along a conjugate path of microscope system 100.

Reflected light 123R passes through objective lens 110, is reflected by Y-mirror 108 (FIG. 1), X-mirror 106 and reflects off beam splitter 104 to a photodetector 114. Photodetector 114 is a device, such as a photo-multiplier tube (PMT) or photo-diode, that generates an electronic focus signal 115 that is an analog signal that has a magnitude (voltage in one embodiment) proportional to the intensity of reflected light 123R as measured by photodetector 114. The photodetector's gain is adjustable to accommodate different laser power, laser wavelength and target reflectivity. As is well known in microscope engineering, when the target is in focus, the value of the detected electronic focus signal is proportional to: PMT's GAIN * TARGET'S REFLECTIVITY * LASER'S POWER. The PMT's gain is adjusted empirically, as discussed below.

Electronic focus signal 115 (FIG. 1) is provided to host workstation 116 and to Z-axis controller 118. Z-axis controller 118 is directly coupled to fine Z-stage 120 and is indirectly coupled to coarse Z-stage 122 through host workstation 116 and coarse Z-axis controller 117. Coarse Z-stage 122 uses a motor, such as a stepper motor, to move target 112 relative to objective lens 110 through a relatively large range of motion (e.g. a large percentage of total possible movement) along the Z-axis, in an operation referred to as "coarse auto-focus operation". In one embodiment, coarse Z-stage 122 moves target 112 through 1000 microns in a start-up move of a coarse auto-focus operation to a starting position 516 (FIG. 6) from an initial position of target prior to the auto-focus operation (the total possible movement being approximately 6000 microns).

In one embodiment of the present invention, coarse Z-axis controller 117 is a conventional stepper motor controller available as part number 310MX3 from New England Affiliated Technology (NEAT) of 620 Essex St., Lawrence, Mass. 01841. Coarse Z-stage 122 can be driven by a conventional stepper motor (not shown) such as the Vexta C5858-9012 available from Oriental Motor of 16–17 Veno 6-Chome Taito-Ku, Tokyo, Japan. In this embodiment, coarse Z-stage 122 is Part # 1930237 available from NEAT (above).

As explained in more detail below, fine Z-stage 120 uses a piezoelectrically driven element to move target 112 through a relatively small range of motion (e.g. a small percentage of total possible movement) along the Z-axis, in an operation referred to as "fine auto-focus operation." In one embodiment, fine Z-stage 120 moves target 112 through 50 microns in a fine auto-focus operation (the total possible movement being approximately 6000 microns). Although the invention is described as having a movable target 112 and a stationary objective lens 110, target 112 can be held stationary while objective lens 110 is moved.

Figure 3A:
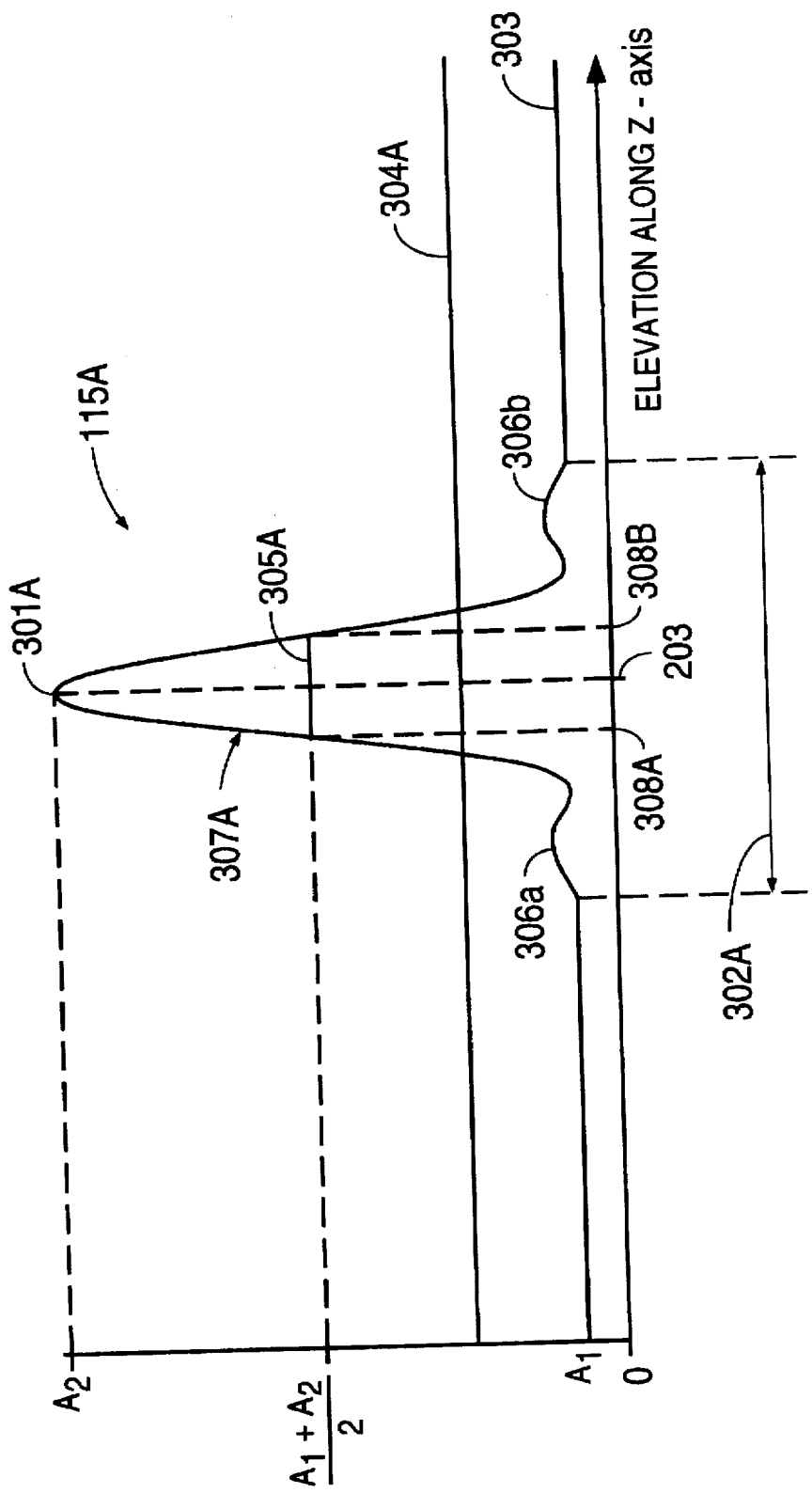
FIG. 3A illustrates the relation between the magnitude of an idealized electronic focus signal of a confocal microscope and the position of a target with respect to an objective lens as the target is moved along the Z-axis.

FIG. 3A is an idealized graph of the magnitude (sometimes referred to as "strength" or "intensity") of an electronic focus signal 115A as a function of the position, e.g. elevation of target 112 along the Z-axis. Electronic focus signal 115A has a magnitude that is theoretically proportional to a sinc-squared function $((\sin(x)/x)^2)$, having a full width half max measurement 305A that varies based on the numerical aperture of objective lens 110 and the wavelength of laser beam 123. The full width half max measurement 305A is the width, along the Z-axis, between two points 308A and 308B at which the magnitude of electronic focus signal 115A is at half of its maximum magnitude 301A at focus position 203. As illustrated in FIG. 3A, electronic focus signal 115A has a value of (A1+A2)/2 for the full width half max measurement 305A, wherein A1 is the background value (described below) and A2 is the maximum value for focus position 203. The relationship of the numerical aperture and the wavelength to the magnitude of the electronic focus signal is well known to a person skilled in the art of confocal microscopes.

In FIG. 3A, focus position 203 at the center of main lobe 307A is a distinct position, as shown by a sharp, well defined peak 301A in the magnitude of electronic focus signal 115A. Electronic focus signal 115A also exhibits side lobes such as lobes 306a–306b. Depth of focus (sometimes referred to as "width of focus") 302A spans a range along the Z-axis in which the magnitude of electronic focus signal 115 is greater than a background value 303. Background value 303 is a small value of electronic focus signal 115A that is non-zero and results from leakage currents and a small amount of background light that reaches photodetector 114.

Depth of focus 302A becomes smaller as the numerical aperture of objective lens 110 increases or as the wavelength of laser beam 123 decreases, as is well known. In the following discussion, objective lens 110 has a power of 100× and a numerical aperture of 0.95, and laser beam 123 has a wavelength of 488 nm in one embodiment. In this embodiment, electronic focus signal 115A has a full width half max measurement 305A of approximately 0.5 microns.

Figure 3B:
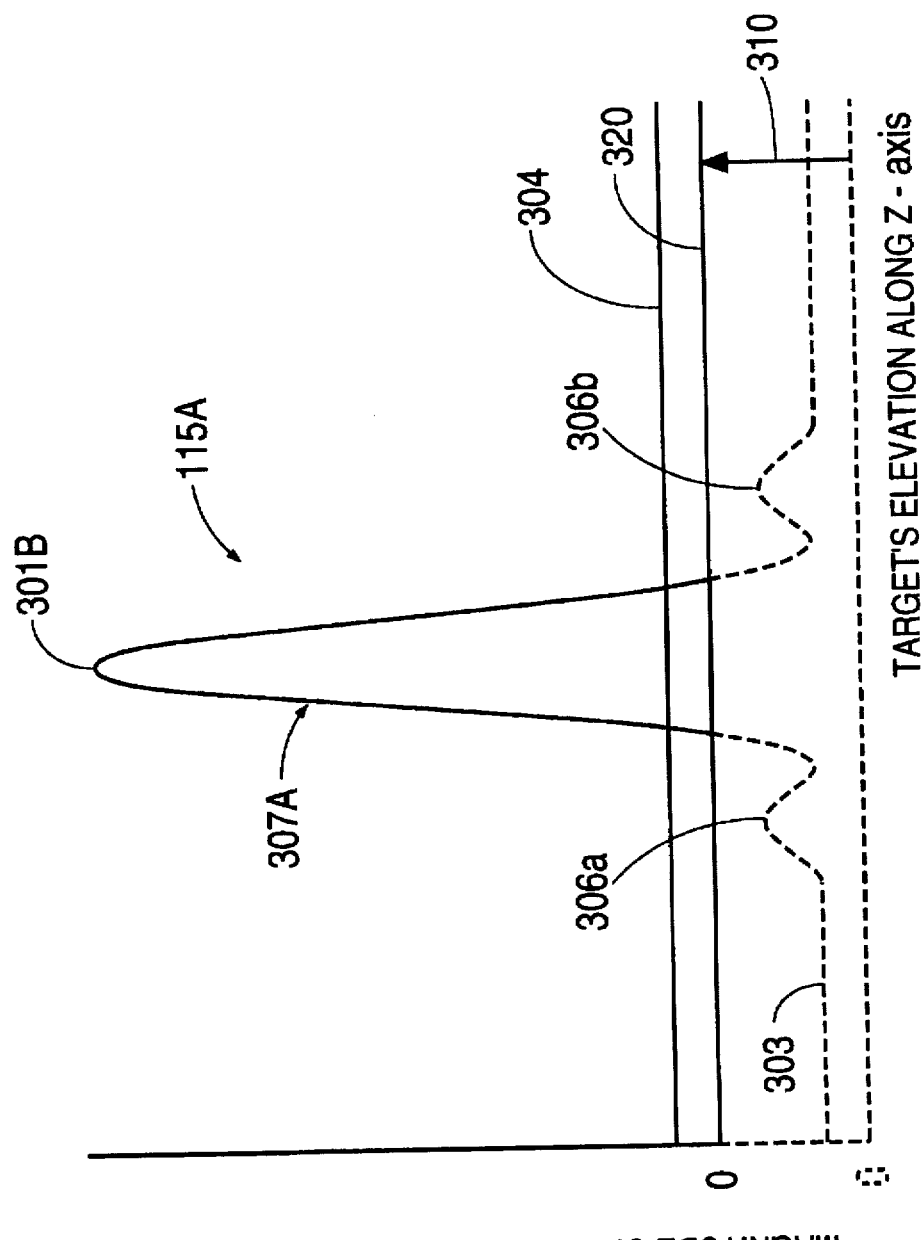
FIG. 3B illustrates an idealized electronic focus signal after the auto-focus system has been initialized.

Microscope system 100 automatically moves target 112 to an estimate of focus position 203 that results from one or more auto-focus operations as described below. To initialize microscope system 100 for a coarse auto-focus operation, the gain of photodetector 114 is increased to an empirically predetermined autofocus gain. Also, an empirically predetermined zero position offset 310 is applied to electronic focus signal 115 such that background value 303 and side lobes 306a–306b are effectively eliminated from electronic focus signal 115A. FIG. 3B illustrates electronic focus signal 115A after microscope system 100 has been initialized.

The auto-focus gain of photodetector 114 (FIG. 1) and zero position offset 310 (FIG. 3B) are empirically determined by performing a series of auto focus operations using different targets 112 to cover as wide a range of targets as typically used by the user (e.g. an aluminum target and a semiconductor target). Zero position offset 310 is selected to ensure that background value 303 and side lobes 306a–306b are below zero position 320. A small positive value greater than zero position 320 is then selected for use as threshold value 304. Once threshold value 304 has been selected, the threshold value 304 can be used for subsequent auto-focus operations on a wide variety of targets.

When the magnitude of electronic focus signal 115A exceeds a predetermined threshold value 304, a near-focused condition is said to exist. During a near-focused condition, target 112 is relatively close to focus position 203 (illustrated by positions 308a and 308b of FIG. 3A). The gain of photodetector 114 and the zero position offset 310 are then maintained during the coarse auto-focus operation.

Certain photodetectors 114, particularly photo multiplier tubes (PMTs), can be damaged when exposed to high signals (laser signals having a magnitude greater than magnitude that PMTs are designed for) that result from increasing the gain of photodetector 114. Such damage is not a problem in the current invention because PMT control circuitry has an overload sensing circuit that automatically reduces PMT's gain to zero by a conventional method, before damage occurs.

Figure 3C:
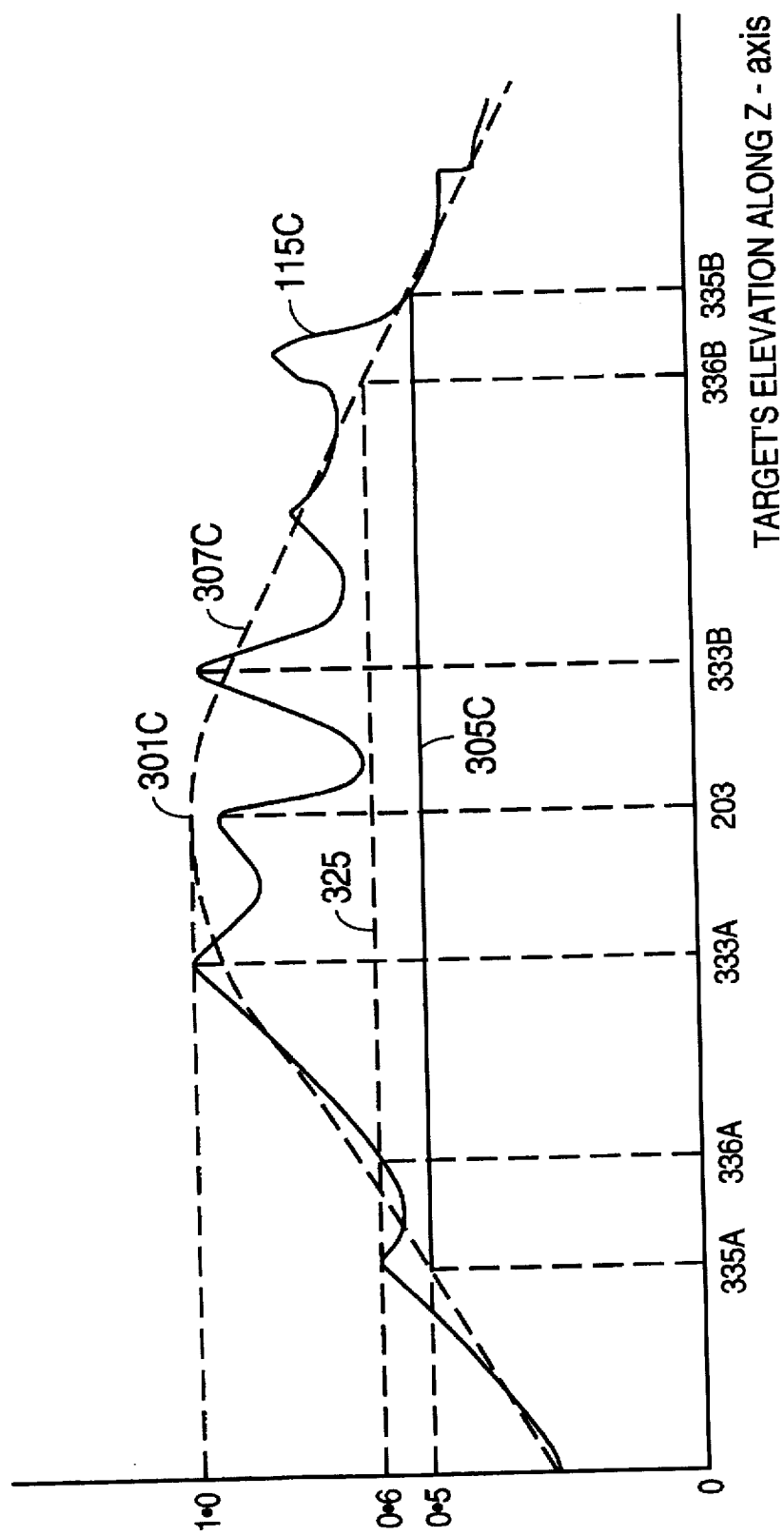
FIG. 3C illustrates an actual electronic focus signal for a microscope system that uses a low power objective lens.

FIG. 3C illustrates variations in magnitude of an actual electronic focus signal 115C. Magnitude of electronic focus signal 115C is irregular due to noise caused by, for example, vibration between target 112 and objective lens 110 during movement of target 112. In FIG. 3C, objective lens 110 has low power (for example magnification of 1.5× or 5×). The low power of objective lens 110 results in a large depth of focus, such as distance 305C (e.g. 30–100 microns) between elevations 335A and 335B for the full width half max measurement. The large depth of focus and the irregular waveform of electronic focus signal 115C can result in a false focus position, such as one of position 333A or 333B, if peak detection is used to estimate focus position 203.

Use of a threshold, as described above in reference to FIGS. 3A and 3B, when electronic focus signal 115C is generated by a low power objective lens has the disadvantage that a small change in threshold, (e.g. from 0.5 to 0.6) results in a large change in the target's elevation along the Z axis (e.g. from points 335A and 335B to points 336A and 336B) at which the threshold is exceeded. In such a case, focus position 203 of idealized main lobe 307 is estimated in one embodiment without using a threshold, by summing up the magnitude of electronic focus signal 115C at several elevations of target 112 in the range of motion along the Z-axis, in a median point method that is described below.

Figure 4:
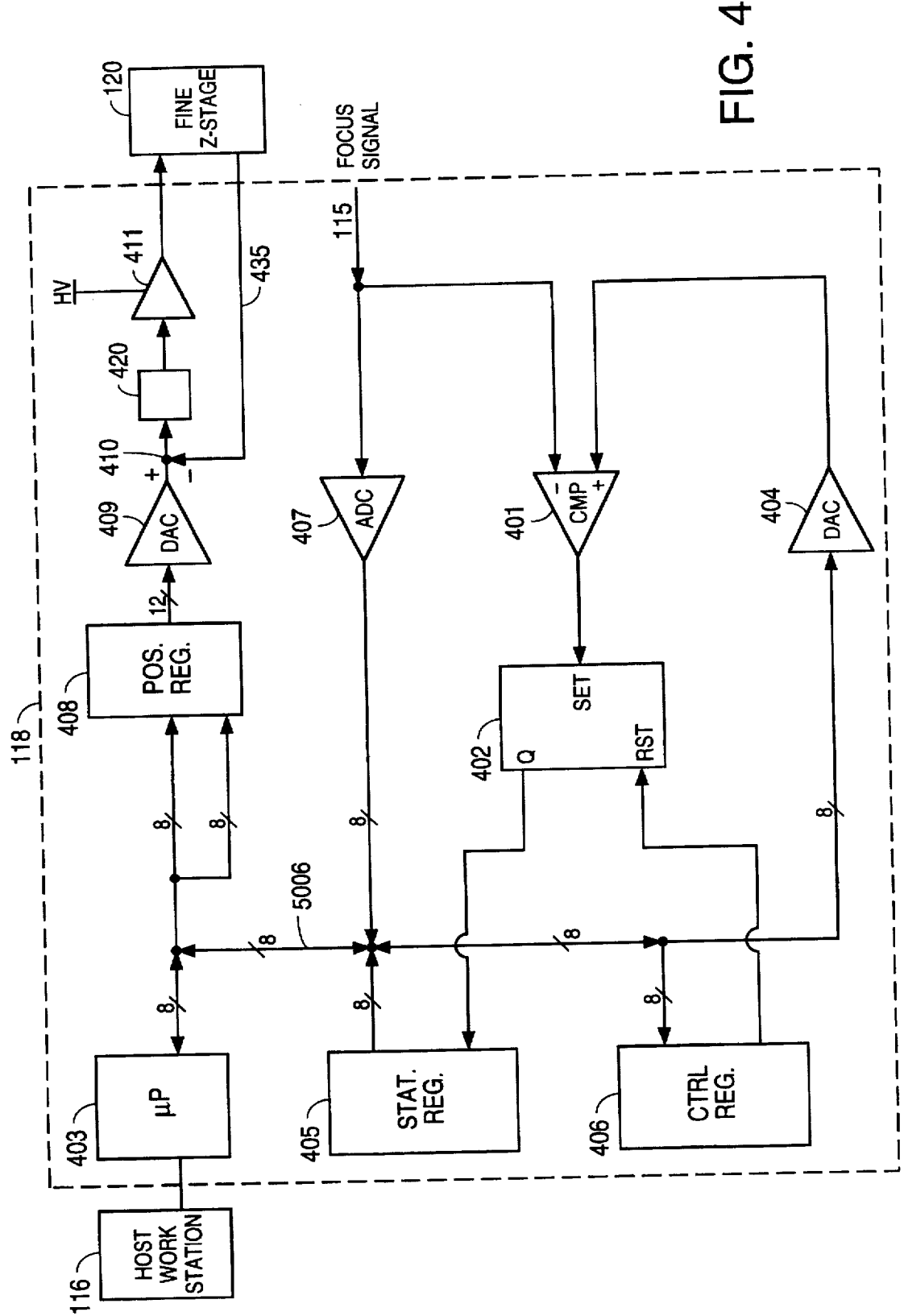
FIG. 4 is a block diagram of one embodiment of a Z-axis controller used to control a fine Z-stage and to provide feedback to a coarse Z-stage.

FIG. 4 is a block diagram of Z-axis controller 118 that controls fine Z-stage 120 and also provides feedback used to control coarse Z-stage 122. Operation of some structures in FIG. 4 is described below, while operation of the rest is described in reference to FIGS. 5A–5E and 6–8.

Within Z-axis controller 118 (FIG. 4), electronic focus signal 115 is transmitted to a first input terminal of comparator 401 and to an input terminal of an analog to digital converter (ADC) 407. ADC 407 measures the magnitude of electronic focus signal 115 when commanded by microprocessor 403, for example eighty (80) times a second. A digital output signal (on 8 lines in one embodiment) of ADC 407 drives microprocessor 403. Comparator 401 sets a flip-flop 402 when the magnitude of electronic focus signal 115 exceeds a threshold signal at the comparator's second input terminal that is driven by a digital to analog converter (DAC) 404. DAC 404 in turn receives a threshold value from microprocessor 403.

The output terminal of comparator 401 (FIG. 4) is coupled to the set terminal of latching flip flop 402. The Q output terminal of flip-flop 402 is coupled to an input terminal of status register 405.

An output terminal of control register 406 is coupled to the reset terminal of flip flop 402. Control register 406 resets flip-flop 402 on command from microprocessor 403.

Figure 11:
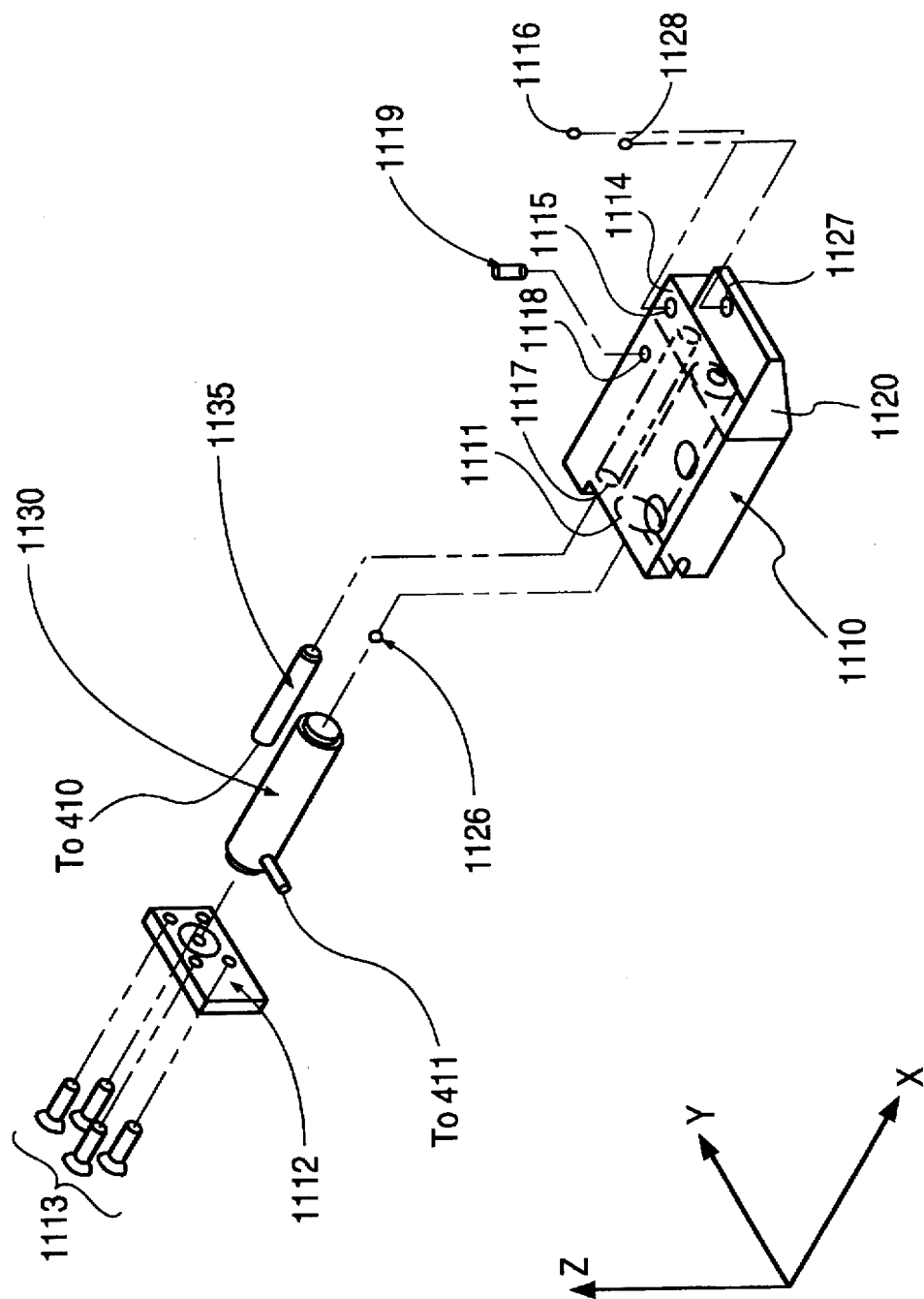
FIG. 11 is an exploded isometric view of a piezoelectric element, sensor and bottom plate of the fine Z-stage of FIG. 9.

Microprocessor 403 has terminals coupled to status register 405, control register 406, ADC 407 and host work station 116. Microprocessor 403 is also coupled to position control register 408. The output of position control register 408 is transmitted through DAC 409, summing node 410, integrator 420, and amplifier 411 to provide a control voltage signal to a piezoelectric element 1130 of fine Z-stage 120. Summing node 410 also receives a feedback signal (on line 435) that is linearly proportional to the position of target 112 along the Z-axis i.e. distance from a proximity sensor 1135 of fine Z-stage 120. The feedback signal is used to linearize the behavior of a piezoelectric element 1130 (FIG. 11).

FIGS. 5A–5E are schematic diagrams of one embodiment of Z-axis controller 118 of FIG. 4. Similar elements in FIGS. 4 and 5A–5E are labelled with the same number. Ratings of various components illustrated in FIGS. 5A–5E are listed in microfiche appendix D (at pages 59–64) for one embodiment.

Central processing unit (CPU) 5000 (FIG. 5D) of microprocessor 403 transmits and receives information through bus transceiver 5034 to 8-bit data bus 5006. CPU 5000 is, for example, a TP-RS485 twisted pair control module, model number 55050-00, available from Echelon of 4015 Miranda Avenue, Palo Alto, Calif. 94304. Bus transceiver 5034 provides additional drive capability to CPU 5000. Bus transceiver 5034 is a well known device, available for example as part number 74ALS245, from Texas Instruments (TI) of 7839 Churchill Way, Dallas, Tex. 75251.

Address register 5036 receives addressing information from CPU 5000 through data bus 5006. This addressing information determines the register or device within Z-axis controller 118 that the microprocessor 403 accesses. Address register 5036 is available, for example, from TI (above) as part number 74ALS573.

The output of address register 5036 is provided to address decoders 5038 and 5040. Address decoders 5038 and 5040 decode the addressing information and generate signals that enable a register or device within Z-axis controller 118 that microprocessor 403 accesses. Address decoders 5038 and 5040 are available for example from TI (above) as part numbers 74ALS138 and 74LS139, respectively. Microprocessor 403 communicates with position control register 408, status register 405, control register 406, DAC 404 and ADC 407 using 8-bit data bus 5006.

Registers 5001 and 5003 (FIG. 5A) within position control register 408 receive positioning information from microprocessor 403 on data bus 5006. Registers 5001–5004 are well known in the art of designing microprocessor based systems. Registers 5001 and 5003 are available for example from TI (above) as part number 74ALS574. Registers 5002 and 5004 are available for example from TI (above) as part number 74ALS273. Eight bit words on data bus 5006 are transmitted through registers 5001–5004 of position control register 408 to provide a 12-bit input to 12-bit DAC unit 5008 of DAC 409.

DAC unit 5008 is a conventional digital to analog converter (DAC), known in the electronics art, and available for example from Analog Devices (AD) of 1 Technology Way, Norwood, Mass. 02062, as part number AD7541. The remaining ancillary elements of DAC 409 including operational amplifier 5009 and the illustrated resistors, capacitors and diodes are conventional elements commonly seen in conventional circuits using DAC 409, as is well known to a person skilled in the art of electronic engineering. Operational amplifier 5009 is available for example from AD (above) as part number OP-177E. DAC 409 provides an analog output signal on lead 5010.

Figures 1, 5A:
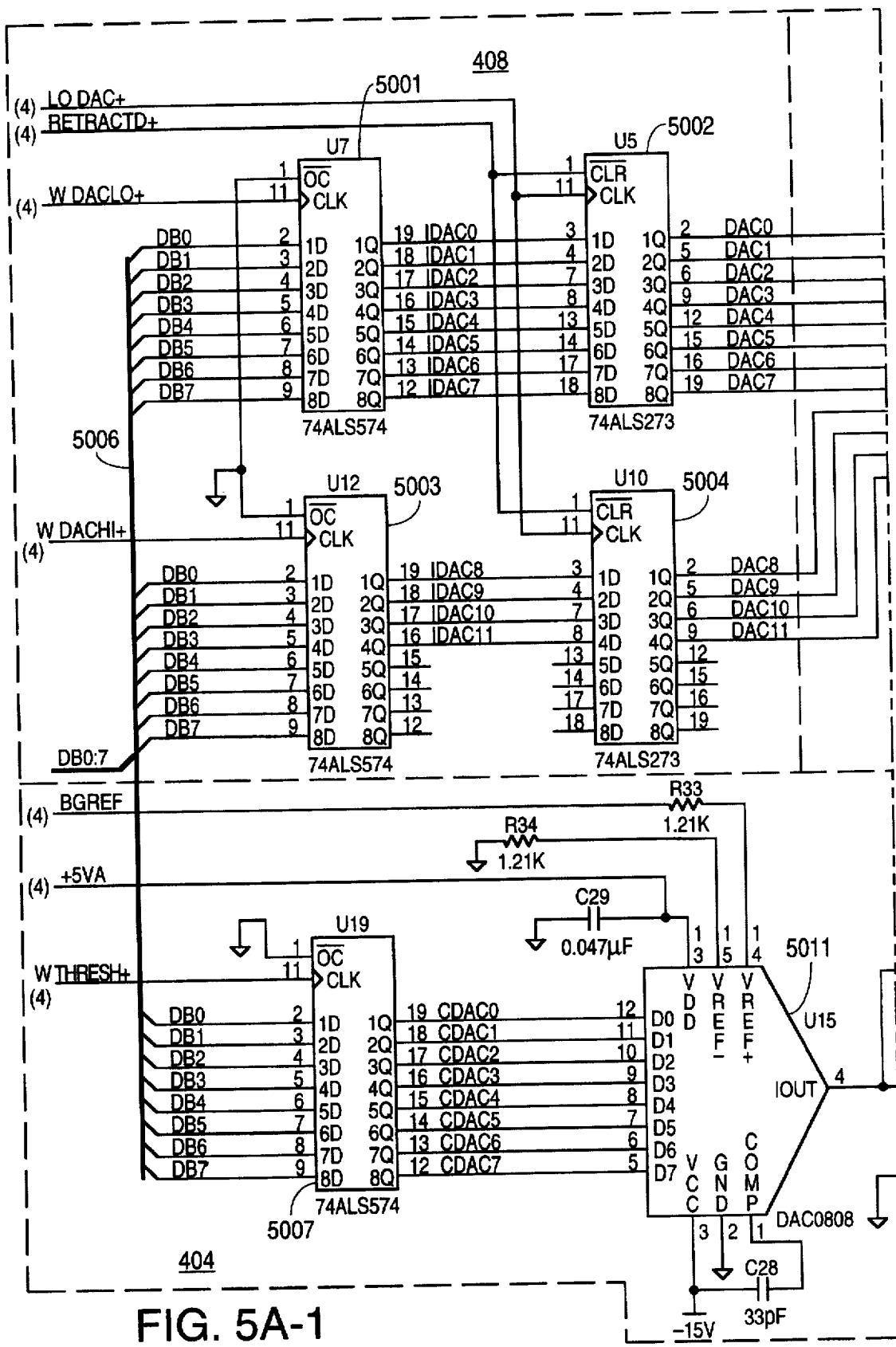
FIGS. 5A–5E are schematic diagrams of the embodiment of the Z-axis controller of FIG. 4.
Figures 1, 5B:
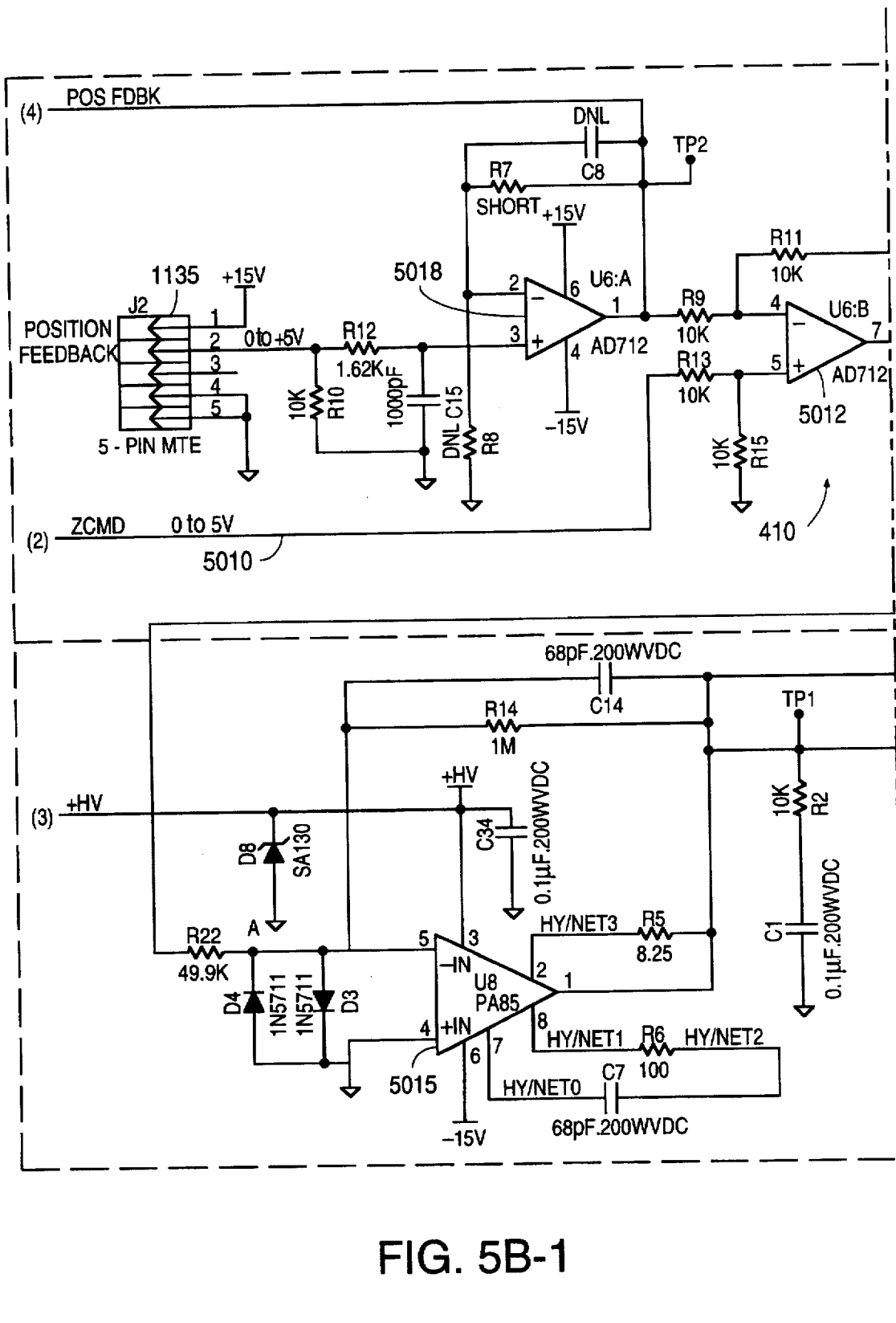
Figures 2, 5B:
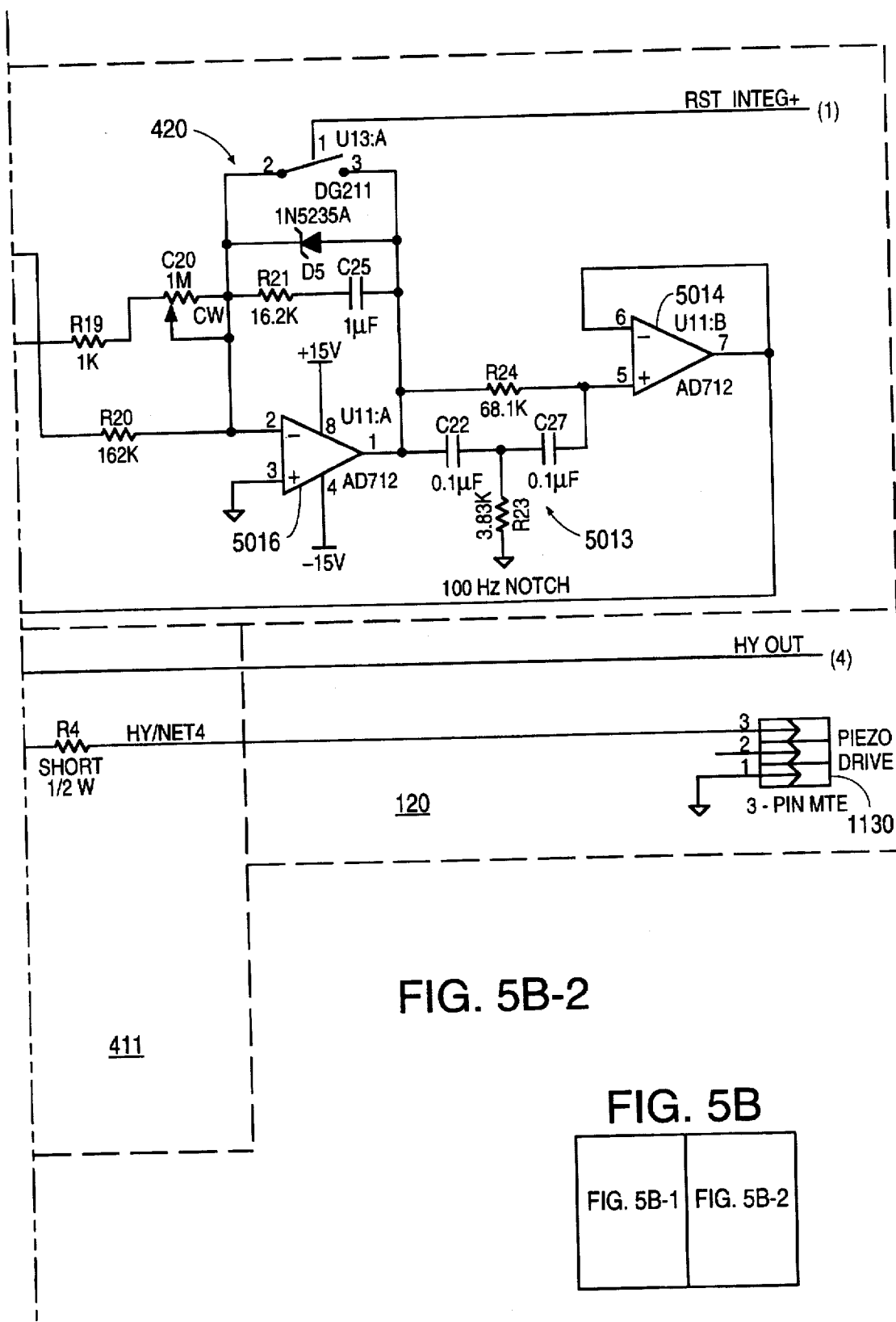

As shown in FIG. 5B, lead 5010 is connected to one input terminal of operational amplifier 5012 of summing node 410. Operational amplifier 5012 is available for example as part number AD712 from AD (above). The signal on the other input terminal of operational amplifier 5012 is derived from the position feedback signal (on line 435 in FIG. 4) of sensor 1135 (FIG. 11) in fine Z-stage 120. Sensor 1135 provides an input signal to operational amplifier 5018. Operational amplifier 5018 is available for example from AD (above) as part number AD712.

Various illustrated resistors and capacitors, such as R7, C8, and R8, that are coupled to operational amplifier 5018 create a conventional buffer. Components rated as DNL (Do Not Load) in FIGS. 5A–5E and FIGS. 14–21 are not used (i.e. not part of the circuit). The output signal of operational amplifier 5018 is provided to the other input terminal of operational amplifier 5012. The output terminal of summing node 410 is coupled to the input terminal of integrator 420. Integrator 420 includes an operational amplifier such as part number AD712, available from AD (above). The associated resistors, capacitors and diodes such as R19, C20, R20, R21, C25, D5 of integrator 420 are known to one skilled in the art of designing electronics.

The output signal of integrator 420 is provided to notch filter 5013, which includes two resistors (e.g. R24, R23) and two capacitors (e.g. C22, C27). The output signal of notch filter 5013 is provided to operational amplifier 5014, that is available, for example, from AD (above) as part number AD712. The output signal of operational amplifier 5014 is provided to the input terminal of amplifier 411.

Amplifier 411 is a conventional amplifier that includes an operational amplifier available from for example Apex Microtechnology of 5980 N. Shannon Rd., Tucson, Ariz. 85741 as part number PA85. The illustrated diodes, resistors and capacitors such as R22, D3, D4, D8, C34, R14, C14, R5, R6, C7, R2, C1, R4 of amplifier 411 are all known in the electronics art. The output signal of amplifier 411 is provided to piezoelectric element 1130 within fine Z-stage 120.

Figures 1, 5C:
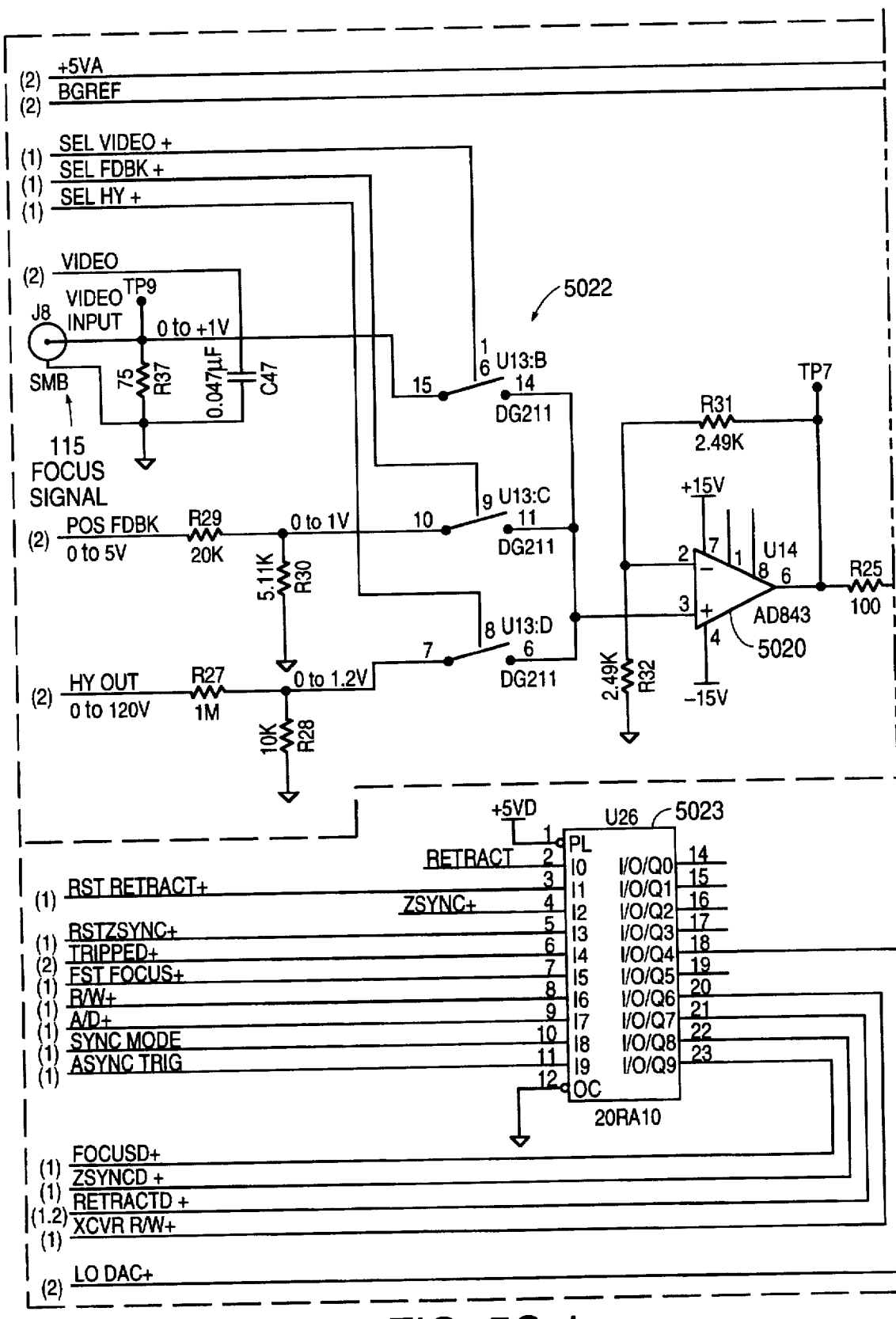
Figures 2, 5C:
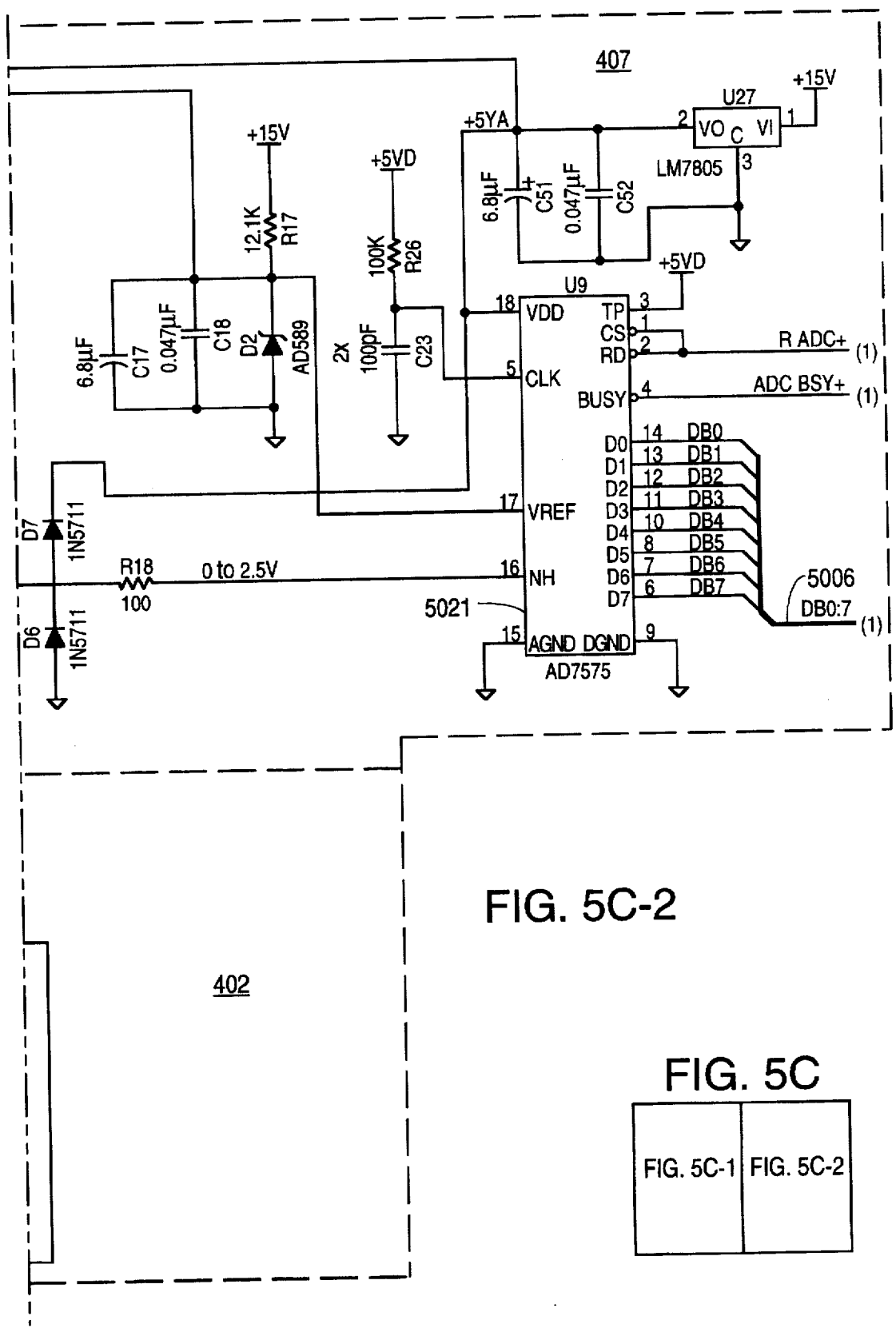

As shown in FIG. 5C, electronic focus signal 115 is provided to ADC 407. Electronic focus signal 115 is routed through multiplexer 5022 to operational amplifier 5020. Multiplexer 5022 is a conventional part available, for example from Siliconix of 2201 Laurelwood Road, Santa Clara, Calif. 95058 as part number DG 211. Operational amplifier 5020 is available from for example AD (above) as part number AD843. Operational amplifier 5020 buffers electronic focus signal 115. The output of operational amplifier 5020 is provided to an input of ADC unit 5021. ADC unit 5021 is a conventional part available for example as part number AD7575 from AD (above). The other devices C17, C18, D2, R26, C23, C51, C52, U27 coupled to ADC unit 5021, as illustrated in FIG. 5C, are known in the art of electronics. In response to electronic focus signal 115, ADC unit 5021 supplies an 8-bit digital signal representative of electronic focus signal 115. The 8-bit digital signal of ADC unit 5021 is provided to microprocessor 403 on data bus 5006.

FIG. 5C also illustrates flip flop 402. Flip flop 402 is programmed as one of the devices present within programmable logic device (PLD) 5023. PLD 5023 is available for example from Lattice Semiconductor of 5555 NE Moore Ct., Hillsboro, Oreg. 97124, as part number GAL20RA10. The input signals to PLD 5023 include: a set input signal from comparator 401 and a reset input signal from control register 406. PLD 5023 processes these input signals and generates a Q output signal representing the output signal at Q output terminal of flip flop 402. This Q output signal is provided to status register 405. (PLD 5023 also has input signals and output signals unrelated to auto-focus operations.) One embodiment of instructions to a programmer for programming PLD 5023 are listed in a microfiche appendix C that is incorporated herein by reference in its entirety. Instructions in microfiche appendix C can instruct programmer model no. BP-1200 available from BP Microsystems, Inc. of 1000 N. Post Oak Road, Houston, Tex. 77055.

Figures 1, 5D:
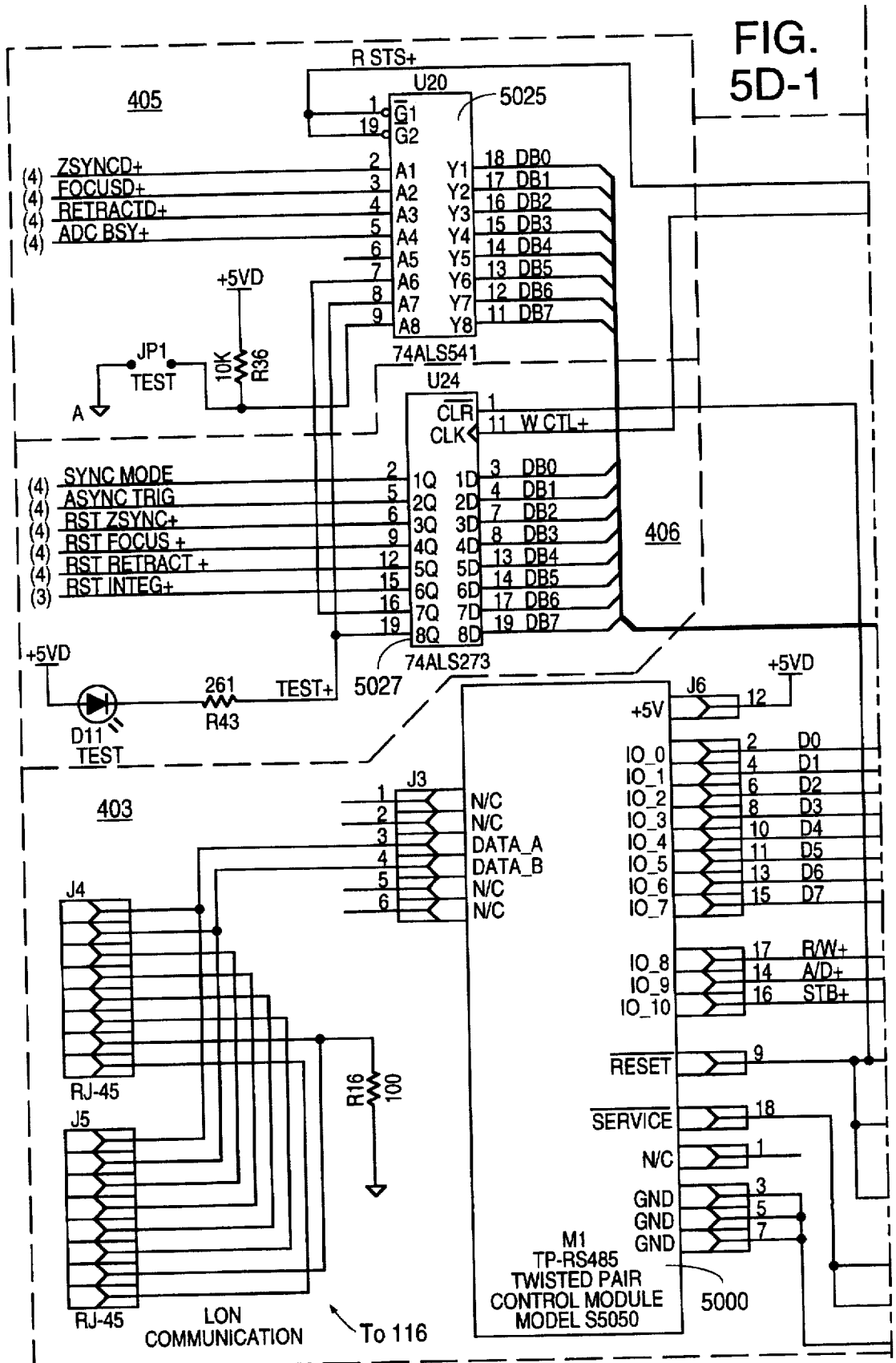
Figures 2, 5D:
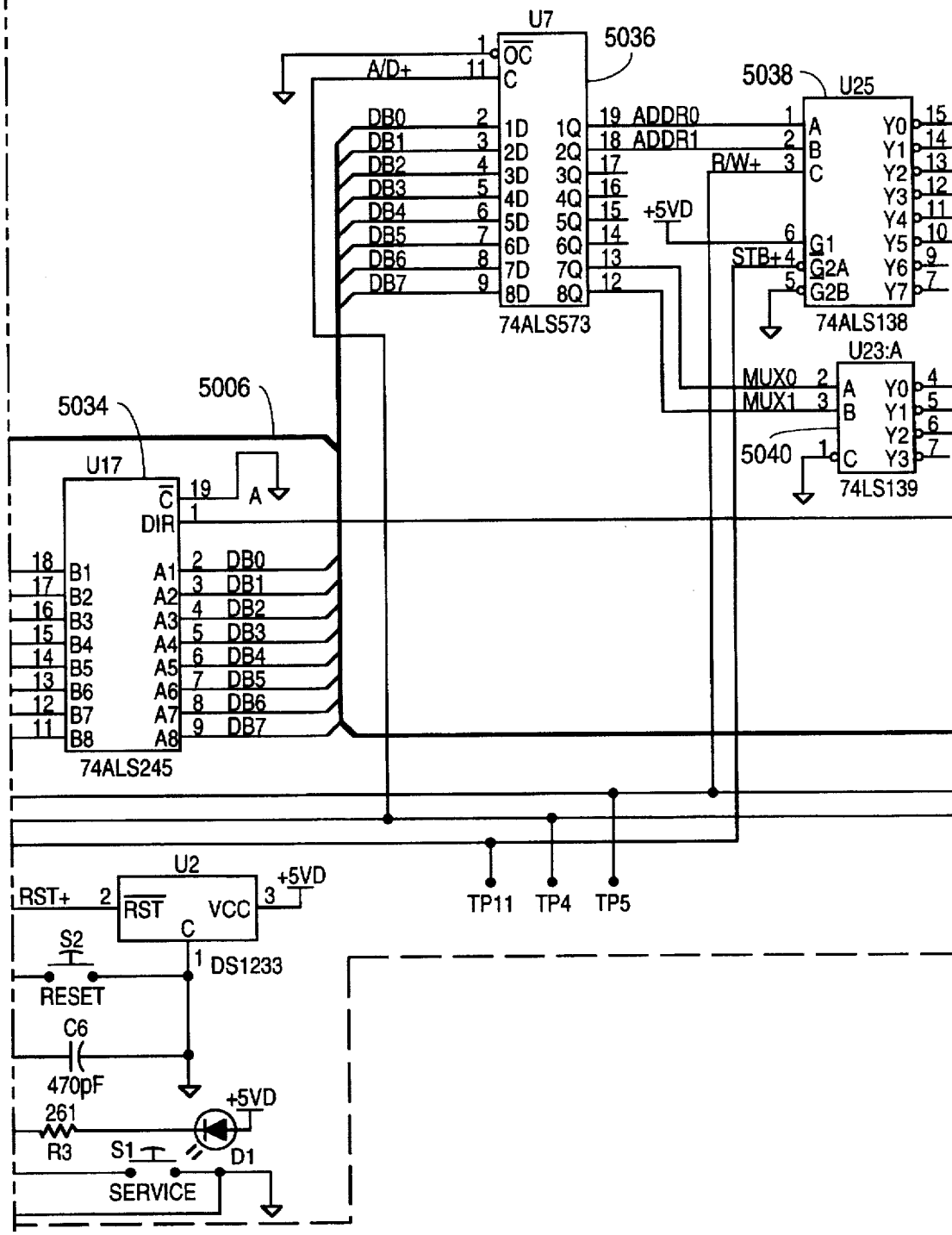

FIG. 5D illustrates status register 405. Status register 405 is a conventional register available for example as part number 74ALS541 from TI (above). As previously discussed, status register 405 receives the Q output signal of flip flop 402 from PLD 5023 (status register 405 also receives other information unrelated to auto-focus operations). The 8-bit output signal of status register 405 is provided to data bus 5006 such that microprocessor 403 can detect when flip flop 402 is set.

Control register 406 (FIG. 5D) receives an 8-bit input signal from microprocessor 403 on data bus 5006. Control register 406 is available for example from TI (above) as part number 74ALS273. An output terminal of control register 406 is coupled to PLD 5023, such that a signal from control register 406 can reset flip flop 402.

DAC 404 also receives an 8-bit input signal from microprocessor 403 on data bus 5006. This 8-bit input signal is transmitted through register 5007 (available for example from TI as part number 74ALS574) to conventional DAC unit 5011 (available for example from National Semiconductor as part number DAC0808). DAC unit 5011 converts the incoming 8-bit signal into an analog output signal. This analog output signal is provided to an input terminal of operational amplifier 5017 (available for example from AD as part number AD712). The output signal of operational amplifier 5017 is provided to an input terminal of comparator 401. Electronic focus signal 115 is provided to the other input terminal of comparator 401. Comparator 401 includes comparator unit 5019, available for example from National Semiconductor of 2900 Semiconductor Drive, Santa Clara, Calif. 95062, as part number LM311. The output signal of comparator 401 is provided to flip flop 402.

Figures 1, 5E:
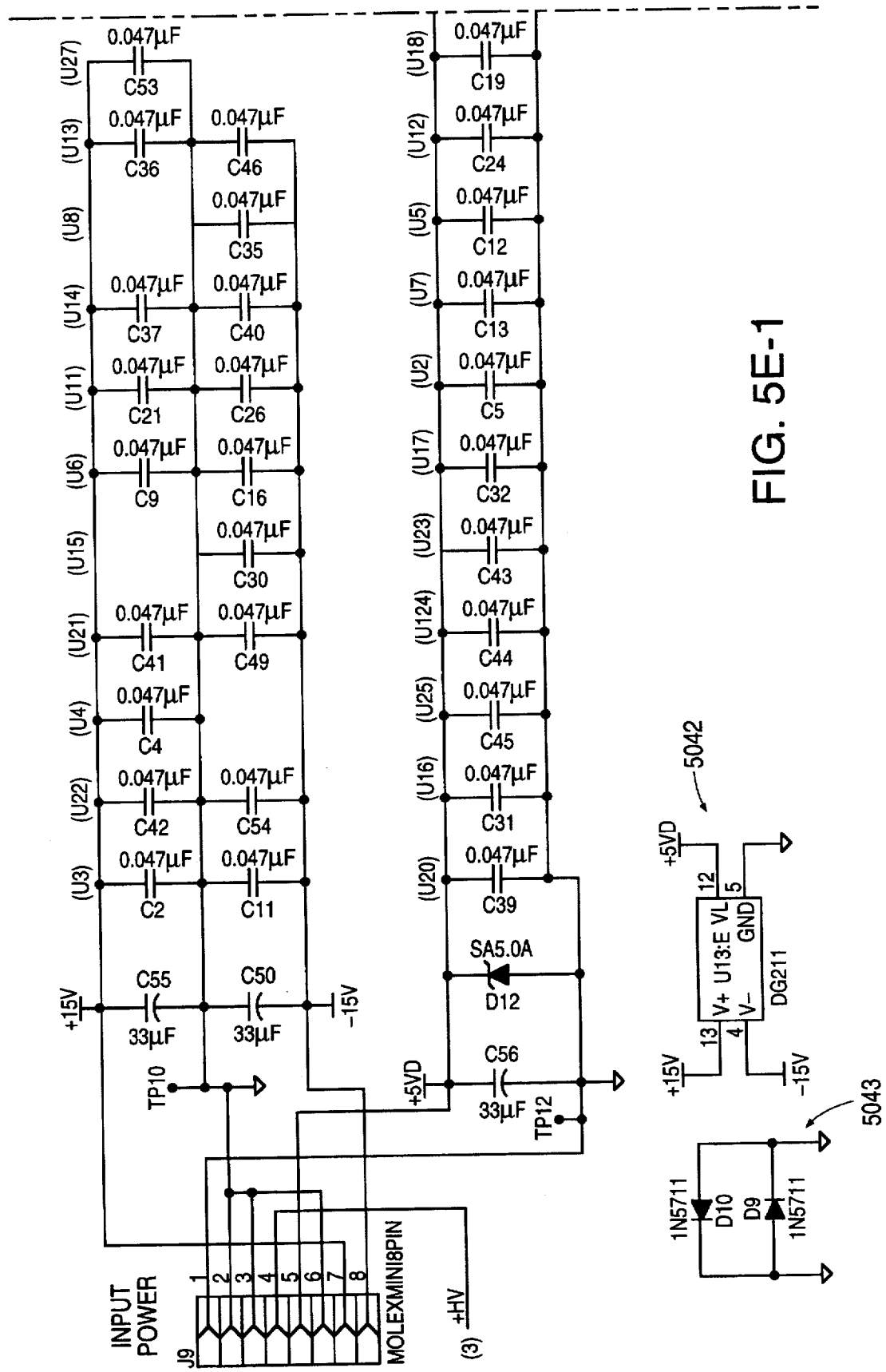
Figure 5E:
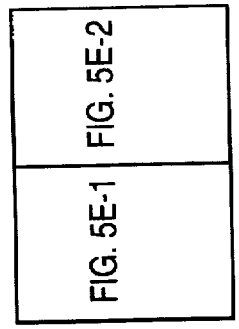
Figure 2:
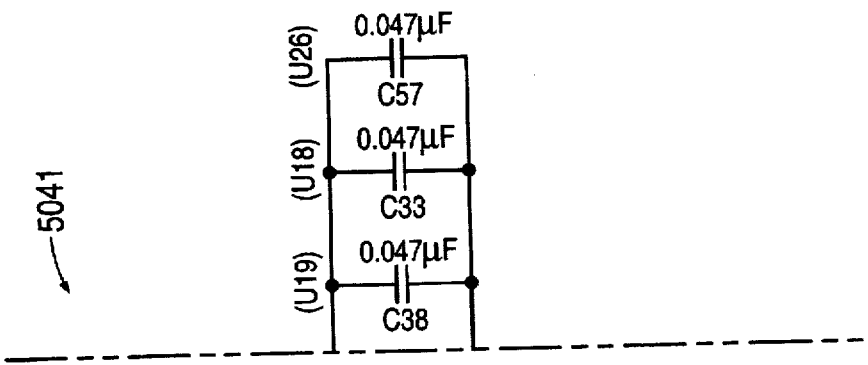

FIG. 5E illustrates conventional structures used in the power supply connections 5041, 5042 that supply power to fine Z-state controller 118. Analog/digital grounding structure 5043 is used to connect analog and digital grounds on fine Z-stage controller 118.

In one embodiment of the present invention, a coarse auto-focus operation is performed as follows. Host work station 116 (FIG. 1), through coarse Z-stage controller 117, instructs coarse Z-stage 122 to move target 112 in a start-up move (not shown) downward through a startup predetermined distance (e.g. 1000 microns) along the Z-axis from the current position of target 112. If there is less distance from the startup predetermined distance between the current position and a lowermost position (not shown) along the Z-axis, then target 112 is moved to the lowermost position along the Z-axis. The lowermost position is that position along the Z-axis below which target 112 cannot be moved by any mechanism in microscope system 100. This startup pass ensures that target 112 is positioned at a starting position 516 below focus position 203. For example, as all focus positions are within a limited distance (≈200 μm in one embodiment) of an upper travel limit, a position e.g. 1000 μm below any initial position (not shown) guarantees that starting position 516 is below focus position 203. Travel limits are two positions of a target that are farthest from each other, such as a lower most position (not shown) and first safe operating position 520 of FIG. 6. If the first time a target is loaded, coarse Z stage 122 is at its lowermost position, there is no startup pass. A startup pass also ensures that target 112 is positioned at least a minimum distance below focus position 203, thereby allowing coarse Z-stage 122 to achieve consistent start-up characteristics (i.e., velocity, acceleration, etc.) before target 112 encounters a focused condition.

Host work station 116 instructs microprocessor 403 to send a digital signal to DAC 404 such that the output signal of DAC 404 has a voltage level corresponding to threshold value 304 that was determined during initialization of microscope system 100. In one embodiment, the input signal to DAC 404 is a fixed digital input signal having a value of 24 (out of a range of values between 0 and 255). In response to another signal generated by host workstation 116, control register 406 transmits a reset signal to reset flip-flop 402 to its initial state (e.g., a logic "0").

Figure 6:
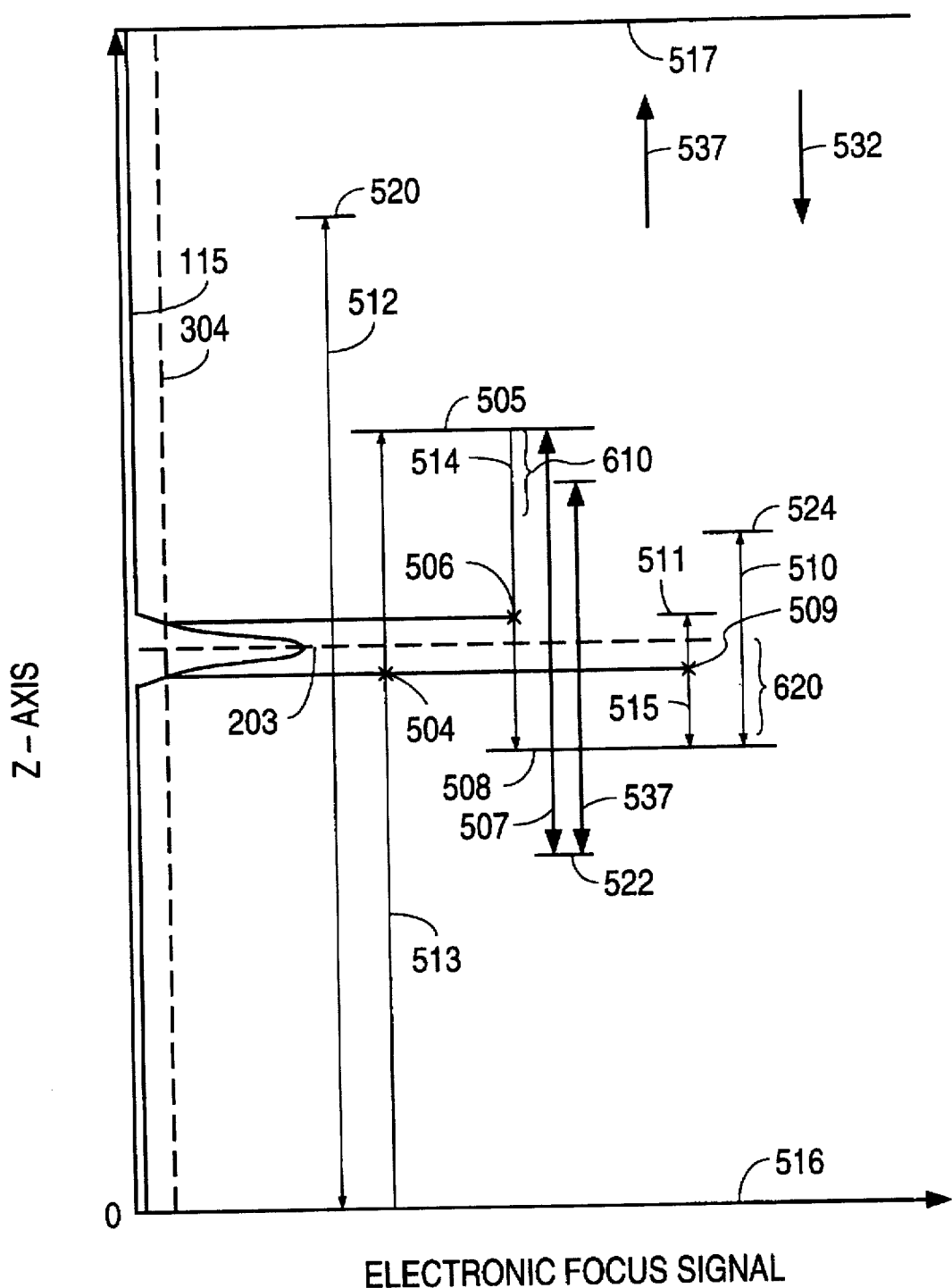
FIG. 6 is a graphic representation of three passes performed during a coarse auto-focus operation according to the invention.

FIG. 6 is a graphic representation of three coarse passes 513, 514 and 515 that are performed during a coarse auto-focus operation according to one embodiment of the invention. A number of coarse passes other than three can be used in other embodiments. The vertical axis in FIG. 6 illustrates the position (e.g. elevation) of target 112 (FIG. 1) along the Z-axis. The horizontal axis in FIG. 6 illustrates the magnitude of the electronic focus signal 115.

To perform a first coarse pass, host work station 116 (FIG. 1) instructs coarse Z-stage controller 117 to move (illustrated by arrow 512) coarse Z-stage 122, and thereby target 112, from starting position 516 in positive Z direction 533 through a first safe operating distance 512 to a first safe operating position 520. If no focus condition is detected during a first coarse pass, target 112 is moved to first safe operating position 520. If a focus position is detected, the movement of target 112 is illustrated by the three coarse passes, 513, 514 and 515.

First safe operating distance 512 is selected so that there is no chance that target 112 will contact objective lens 110 that is located at position 517. Any amount of clearance between first safe operating position 520 and position 517 can be selected. In one embodiment, the focus position of each objective lens is measured and travel limits are programmed (e.g. soft coded into a software configuration table) so that no contact occurs between target 112 and objective lens 110. All entries in a configuration table are defined by a user during installation of microscope system 100. In particular, travel limits for movement of the target are set by manual focusing on a target. In one embodiment, first safe operating position 520 is empirically set at 50 microns above focus position 203 (i.e., 50 microns above the focal point of objective lens 110) based on various parameters such as thickness of target and the working distance (e.g. 270 microns) as described below. In one embodiment, first safe operating distance 512, is selected from the range of 1000–6500 microns, depending on the initial position of target 112, i.e., before target 112 is moved to starting position 516.

The working distance of objective lens 110 is the distance from the objective len's position 517 (FIG. 6) to focus position 203. In various embodiments, the working distance varies from 270 microns to several millimeters, depending on the numerical aperture of objective lens 110.

Safe operating position 520 depends on many factors, such as flatness of the target, flatness of the XY stage on which the target is supported, position of fine Z stage 120, thickness of the target and repeatability of a "home" position of coarse Z stage 122. Safe operating position 520 is empirically selected to be above a typical focus position 203 for a typical target, but below the position at which the target touches objective lens 110. Safe operating position 520 is selected to be sufficiently away from focus position 203 to ensure enough travel to obtain a well defined peak in the magnitude of electronic focus signal 115.

In a threshold method, during first coarse pass 513, comparator 401 continuously compares incoming electronic focus signal 115 with threshold value 304 received from DAC 404. Because target 112 is initially out of focus, electronic focus signal 115 is initially less than threshold value 304. Under these conditions, the output signal of comparator 401 has a positive voltage. As target 112 approaches focus position 203, the magnitude of electronic focus signal 115 increases. When the magnitude of electronic focus signal 115 exceeds threshold value 304, the output signal of comparator 401 transitions to a negative voltage, thereby setting flip flop 402.

Once flip flop 402 (FIG. 4) is set, the voltage at the Q output terminal transitions to a logic high state in this embodiment. Such a logic high state at the Q output is transmitted to status register 405, causing a bit within status register 405 to change value. Microprocessor 403, which continuously monitors status register 405, thereby detects that flip flop 402 has latched. Upon detecting this latched condition, microprocessor 403 signals host work station 116. In response, host work station 116 instructs coarse Z-axis controller 117 to stop coarse Z-stage 122, and thereby stop movement of target 112.

Because electronic focus signal 115 is an analog signal and flip flop 402 latches when the magnitude of electronic focus signal 115 exceeds threshold value 304, the possibility of missing a focused condition is eliminated if the peak magnitude is greater than the threshold value. There are no discrete sampling periods during which the focused condition may be missed. Thus, flip flop 402 latches even for a focus signal 115 having a narrow depth of focus 302, as illustrated in FIG. 3A. Consequently, target 112 can be moved upward at a much faster velocity than was possible with auto-focus microscopes of the prior art.

In one embodiment, the average velocity of target 112 during first coarse pass 513 is dependent on first safe operating distance 512. Target 112 is moved at an average velocity that enables target 112 to move through first safe operating distance 512 in approximately one second. However, the maximum average velocity is approximately 3000 microns per second in this embodiment. This allows first coarse pass 513 to be completed in approximately 1 second.

If a focus condition is not detected before target 112 completes movement through first safe operating distance 512, host work station 116 instructs coarse Z-stage controller 117 to stop target 112 when first safe operating position 520 is reached. A focus position can remain undetected depending on the parameters used to detect focus position 203. For example, when a threshold value is larger than the peak magnitude of electronic focus signal 115, the output of comparator 401 does not transition to a negative voltage even as target 112 passes through focus position 203.

Because of the high velocity (e.g. 3000 microns per second) at which target 112 is moved during first coarse pass 513 and the significant amount of time (e.g. 20-60 milliseconds) required to stop the movement of target 112 after a focused condition is detected, target 112 moves ("target overshoot") to first stopping position 505 (FIG. 6) above focus position 203 at the time that target 112 comes to rest. This target overshoot is illustrated in FIG. 6, which shows that a focused condition is detected at first trip position 504, and that target 112 comes to rest at first stopping position 505. Thus, it is necessary to perform one or more additional passes to position target 112 closer to focus position 203.

The distance required to stop target 112 during first coarse pass 513 is dependent upon threshold value 304 (because a lower threshold value 304 causes flip flop 402 to latch sooner), the system gain (because a higher system gain allows for earlier detection of a focused condition), the time required for microprocessor 403 to detect that flip flop 402 has latched, the time required for microprocessor 403 to communicate this information to host work station 116, the time required for host work station 116 to issue a command to stop coarse Z-stage 122, and the velocity of coarse Z-stage 122 at first trip position 504. Such dependencies are well known to a person skilled in engineering.

Host work station 116, through microprocessor 403, then instructs control register 406 to transmit another reset signal to clear flip flop 402 (FIG. 4) before second coarse pass 514 is begun. This reset signal allows flip flop 402 to detect the next time electronic focus signal 115 exceeds threshold value 304.

The steps performed during second coarse pass 514 are similar or identical to those of first coarse pass 513. Host work station 116 instructs coarse Z-stage 122 (through coarse Z-stage controller 117) to move target 112 in negative Z direction 532 at a velocity that is slower than the velocity of target 112 during first coarse pass 513. This motion continues until a near-focused condition is detected at second trip position 506, causing flip flop 402 to latch, or until target 112 moves through a predetermined second safe operating distance 507 to second safe operating position 522. This second safe operating distance 507 is selected to assure that target 112 travels through focus position 203, based on the width of electronic focus signal 115 and the range of anticipated overshoot of target 112 during first coarse pass 513. Second operating distance 507 is selected greater than the overshoot from first coarse pass 513, plus the width of electronic focus signal 115.

In one embodiment, second safe operating distance 507 is 1200 microns, unless target 112 was stopped less than 50 microns from first safe operating position 520. If target 112 was stopped less than 50 microns from first safe operating position 520, the second safe operating distance 507 is smaller, e.g. 200 microns in this embodiment. The latter second safe operating distance is smaller because target 112 is decelerating near the end of first safe operating distance 512 so that it is easier to stop target 112, thereby decreasing the amount of target overshoot so that target 112 is stopped closer to focus position 203 than would otherwise be the case. Because target 112 is closer to focus position 203, a smaller second safe operating distance 507 can be used.

In one embodiment, it takes approximately 1 second for target 112 to pass through the entire second safe operating distance 507. The average velocity of target 112 during second coarse pass 514 therefore is approximately 200 microns per second or 1200 microns per second, depending upon second safe operating distance 507.

While traversing second safe operating distance 507, target 112 encounters a focused condition at second trip position 506. When electronic focus signal 115 exceeds threshold value 304, flip flop 402 latches and target 112 is stopped in the same manner as in first coarse pass 513. Target overshoot results in target 112 coming to rest below first trip position 504. In FIG. 6, target 112 stops at second stopping position 508 and a microscope system 100 estimates the location of focus position 203 based on overshoot and width of focus.

One or more additional passes can be used to make a better estimate (than the previous estimate) of focus position 203, depending on the resolution of ADC 407.

The steps performed during third coarse pass 515 are also similar or identical to the steps described above for second coarse pass 514 and first coarse pass 513. Host work station 116, through microprocessor 403, instructs coarse Z-stage controller 117 to move target 112 in positive Z direction 533 at a velocity slower than the velocity of target 112 during second coarse pass 514. This motion continues until a near-focused condition 509 causes flip flop 402 to latch or until target 112 moves through a predetermined third safe operating distance 510 to a third safe operating position 524. Again, third safe operating distance 510 is selected to assure that target 112 travels through focus position 203 and is dependent on the amount of target overshoot associated with second coarse pass 514.

In one embodiment, the third safe operating distance 510 is 140 microns. For target 112 to take approximately one second to pass through the entire third safe operating distance 510, the average velocity of target 112 during the third coarse pass 515 is approximately 140 microns per second in one embodiment.

Prior to traversing the entire third safe operating distance 510, target 112 again encounters a near-focused condition at first trip position 504. When the electronic focus signal 115 exceeds threshold value 304, flip flop 402, having been reset, latches and target 112 is stopped in the same manner as in coarse passes 513 and 514.

Because of the relatively low velocity of coarse Z-stage 122 during third coarse pass 515, target 112 comes to rest at a third stopping position 511 that can either be above or below focus position 203. After third coarse pass 515, the third stopping position 511 of target 112 is within approximately ±10 microns of focus position 203. To achieve this degree of accuracy, all of the factors contributing to target overshoot are considered to empirically determine the amount of time required to stop target 112 upon encountering a focused condition during the third coarse pass 515. Given the time required to stop target 112, the velocity of target 112 during third coarse pass 515 is selected to assure that third stopping position 511 of target 112 is within approximately ±10 microns of focus position 203.

If full width half max measurement 305 of electronic focus signal 115 is sufficiently wide, the coarse auto-focus operation described above is modified. Although there is no clear boundary that determines when an electronic focus signal 115 is "sufficiently wide", an electronic focus signal 115 created with a laser beam 123 having a wavelength of 488 nm and an objective lens 110 having a numerical aperture of 0.13 or lower is considered "wide," and has full width half max measurement 305 of approximately 29 microns. Electronic focus signal 115 exhibits a wider full width half max measurement 305 as the magnification and numerical aperture of objective lens 110 decreases or as the wavelength of laser beam 123 increases. For example, use of a low power (e.g. 1.5× or 5×) objective lens results in a large depth of focus, as illustrated by electronic focus signal 115C (FIG. 3C).

When attempting a first coarse pass 513 on a "wide" electronic focus signal 115, first stopping position 505 of target 112 is relatively close to the second trip position 506. In certain cases, first stopping position 505 of target 112 is at a position where the value of electronic focus signal 115 exceeds the threshold value 304. That is, there is not enough target overshoot to guarantee that target 112 "escapes" the electronic focus signal 115. Target 112 may "escape" if as a result of first coarse pass 513, target 112 is close to second trip position 506 and is unable to obtain a high velocity before flip-flop 402 latches during second coarse pass 514. As a result, second stopping position 508 of target 112 can be well short of peak 301. This condition causes the coarse auto-focus operation described above to miss focus position 203.

In one embodiment, to perform a coarse auto-focus operation on a "wide" electronic focus signal 115 (FIG. 3C), target 112 (FIG. 1) is moved in a start-up move by 2000 microns (rather than 1000 microns described above) below the target's initial position (not shown) to starting position 516 (FIG. 6). If target 112 is within 2000 microns of the lowermost position (not shown) along the Z-axis, target 112 is moved to this lowermost position. This starting position can provide target 112 with an additional distance in which to accelerate before reaching first trip position 504. This acceleration and starting position ensure that target 112 overshoots second trip position 506. The rest of the characteristics of first coarse pass 513 for wide electronic focus signal 115C are identical to those described above.

During second coarse pass 514 for wide electronic focus signal 115C, target 112 is moved downward along the Z-axis through second safe operating distance 507. The second safe operating distance 507 and the velocity of target 112 during the second coarse pass 514 are determined in the manner previously described (i.e. based on a first estimate determined by the threshold method described above). However, rather than monitoring the status of flip-flop 402 during second coarse pass 514, host work station 116 instructs microprocessor 403 to record the values of the electronic focus signal output by ADC 407 repeatedly at a predetermined interval (e.g. 80 times a second) while coarse Z-stage 122 is moving target 112 at an approximately constant velocity.

The values recorded by microprocessor 403 therefore roughly correspond to magnitude of electronic focus signal 115 at regular distances along the Z-axis for the entire predetermined second safe operating distance 507. Based on these recorded values, focus position 203 is calculated by a median point method described below. Because movement of coarse Z-stage 122 generally induces noise in the electronic focus signal 115, the values recorded by microprocessor 403 can exhibit peaks at positions other than focus position 203 (as illustrated by FIG. 3C). Microprocessor 403 therefore filters the noise to obtain a better estimate of focus position 203 in the "median point" method.

In the median point method host workstation 116 calculates the sum of the values previously recorded by microprocessor 403 and determines the elevation along the Z-axis at which half of this sum was reached during second coarse pass 514. Host workstation 116 then issues a command to move target 112 in the positive Z-direction to this position. The median point method assumes that noise in electronic focus signal 115 is due to irregularity of movement of coarse Z-stage 122 and that this irregularity occurs randomly and is equally probable on either side of the focus position 203 along the Z-axis.

In another embodiment of a microscope system 100 that uses a low power objective lens, during first coarse pass 513, instead of monitoring the status of flip-flop 402 according to the threshold method, microprocessor 403 records the values of electronic focus signal 115C (FIG. 3C) in the manner described above for second coarse pass 514 for use in the median point method. Therefore, during first coarse pass 513, coarse Z-stage 122 (FIG. 1) moves target 112 through a predetermined first safe operating distance 512 that is a safe travel limit of the movement of target 112. In this embodiment, starting position 516 is a predetermined distance of 1000 microns below the upper travel limit set by first safe operating position 520. Such a starting position 516 that is independent of the target's initial position avoids the inherent uncertainty in the location of the focus position relative to starting position if the target is moved by a predetermined distance from the target's initial position. At the end of first coarse pass 513, host work station 116 calculates a first estimate of focus position 203 by using the median point method described above.

Then host workstation 116 determines starting and stopping positions of second coarse pass 514. Starting position 531 is at a distance D (of 120 microns in one embodiment), above first estimate of focus position 203 while stopping position 522 is at the distance D after first estimated focus position 203. Distance D is chosen based on the desired precision and the accuracy of first estimate of focus position 203. If 80 values are collected during second coarse pass 514, a 240 micron range of movement yields a resolution of 4 microns.

In this embodiment, host workstation 116 uses values recorded during first coarse pass 513, to calculate (as described below) and set an auto-focus gain (e.g. gain of a PMT), so that, the intensity of the electronic focus signal during second coarse pass 514 is optimal. After the auto-focus gain is set, host workstation 116 instructs coarse Z stage 122 to move to second coarse pass starting position 531. After coarse stage 122 has moved to starting position 531, host workstation 116 instructs microprocessor 403 to start recording the values of electronic focus signal 115, and instructs coarse Z stage 122 to move to stopping position 522.

The calculation for optimal auto-focus gain depends on the specific sensor, and in one embodiment is as follows: if "peak intensity" of the electronic focus signal is below optimal: then new auto-focus gain=old auto-focus $$gain + \frac{\log(195)}{\log(peak\ intensity)} * 9;$$

if the peak intensity is above optimal, then new auto-focus gain=old auto-focus gain—(peak intensity—195/10, where sensor gain is normalized to a range of 1 to 100, 1 being minimum gain, electronic focus signal intensity being normalized to the range of 0 to 225, 0 being dark. The peak intensity (e.g. 195) of the electronic focus signal is at maximum fraction (e.g. ¾) of the maximum permitted intensity (e.g. 255), in one embodiment.

A maximum fraction (e.g. ¾) is empirically chosen so that electronic focus signal 115 is not too high (saturation) at focus position 203 and not too low (indistinguishable from noise) at positions other than focus position 203. Other maximum fractions, such as ⅔ or ⅘ can also be chosen, and the exact fraction that is chosen is not a critical aspect of this invention. If for some reason, the peak intensity of electronic focus signal is less than a given minimum, the minimum is used in the calculation. In one embodiment, 15 is the minimum intensity.

In one embodiment, first safe operating distance 512 is 1000 microns, yielding a 12 micron resolution for 80 samples of electronic focus signal 115. In this embodiment, second safe operating distance 537 is 240 microns, that yields a 4 micron resolution for 80 samples of electronic focus signal 115.

Microfiche Appendix E illustrates one embodiment of software code that implements in host workstation 116 various computations for the auto-focus operations described above for use with a low power objective lens. Routine Ionui_StageAF in host workstation 116 initializes variables and then invokes routine Ion_APIQuery that determines the characteristics of objective lens 110. Then host workstation 116 determines a travel limit fZLimUm and then finds out magnification iObjPwr of objective lens 110. Then host workstation 116 instructs fine Z-stage 120 to move to a predetermined middle position HDWR_FASTZ_MID_POS.

Host workstation 116 then saves values of several parameters currently in use, such as the intensity, system gain, zero value and Y axis scan amplitude. Then host workstation 116 sets a new zero value and a new system gain and invokes routine IonuiLoPwrStgAF for a low power objective lens or alternatively, performs various steps described below for a high power objective lens.

Routine IonuiLoPwrStgAF initializes variables, such as variable dHalfRange2ndPass and variable fZPos and then calls routine IonuiMoveStageZUm that moves target 112 to 1,000 microns below the uppermost travel limit set by first safe operating position 520 in one embodiment to starting position 516 (FIG. 6). Then host workstation 116 calls routine mot_SetCurrAxisSpeed that sets the target speed for travelling for one second. Next, host workstation 116 calls routine IonuiMoveStgAndReadInten to move coarse Z-stage 122 to a stopping position 522 and during this movement reads the intensity (i.e. magnitude) of electronic focus signal 115. Routine IonuiMoveStgAndReadInten returns with an estimate of focus position 203 and the peak intensity. Based on the peak focus signal intensity, host workstation 116 adjusts auto-focus gain for optimal focus signal intensity in the next pass. If the peak intensity is lower than optimal, auto-focus gain is increased, if peak intensity is higher than optimal, auto-focus gain is decreased.

Routine zr_SetTargetLaserIFrImgInten sets the auto-focus gain based on the intensity. Then host workstation 116 reads the current position by calling routine stg_ReadStageZUm.

After optimal auto-focus gain is set, host workstation 116 then determines target 112's position in second coarse pass 514 as variable fTarget. Variable fTarget is normally the Z position of target 1128 for the first estimate of focus position 203. If, during first coarse pass 513 electronic focus signal 115's intensity is all zero, or if photodetector 114 is overloaded, then variable fTarget is set to 400 micron away from coarse Z stage 122's position. Since actual focus position 203 can be at some distance away from the first estimate of focus position 203 the second coarse pass 514 starts at some distance before the first estimate and ends at some distance after the first estimate.

The distance before and after the first estimate is chosen to be several times the depth-of-focus of objective lens 110 (in this embodiment 120 microns) and is contained in variable dHalfRange2ndPass. If after first coarse pass 513, coarse Z stage 122 is at a position greater than distance dHalfRange2ndPass away from estimate of focus position 203, then host workstation 116 instructs coarse Z stage 122 to move to a starting position at a distance dHalfRange2ndPass before first estimate of focus position, and second coarse pass 514 starts from this position. Otherwise, second coarse 514 starts from wherever first coarse pass 513 ends. The stopping position of second coarse pass 514 is calculated to be two times dHalfRange2ndPass away from starting position 514.

Then host workstation 116 changes the speed so as to move through second safe operating distance 537 within one second, by using routine mot__SetCurrAxisSpeed. Host workstation 116 then moves target 112 through second safe operating distance 537 by calling routine IonuiMoveStgAndReadInten, and computes the second estimate of focus position 203.

After computing host workstation 116 moves target 112 to the second estimate by calling routine IonuiMoveStage-ZUm.

After one of the previously described coarse auto-focus operations is completed, an optional fine auto-focus operation can be performed, if electronic focus signal 115 has a sharp peak, as illustrated in FIG. 3A. The zero position offset 310 and photodetector gain illustrated in FIG. 3B are not utilized during a fine auto-focus operation. During a fine auto-focus operation, target 112 is moved by a fine Z-stage 120 that includes a piezoelectric element 1130. Fine Z-stage 120 is described in detail later.

Before a fine auto-focus operation is performed, target 112 is positioned by a coarse auto-focus operation (above) such that focus position 203 is within the operating range of fine Z-stage 120 (FIG. 1). In one embodiment, fine Z-stage 120 has an operating range of 50 microns along the Z-axis. Consequently, by performing the coarse auto-focus operation described above, in which target 112 is positioned within ± 10 microns of the focus position 203, target 112 is positioned such that focus position 203 is within the operating range of fine Z-stage 120.

Figure 7:
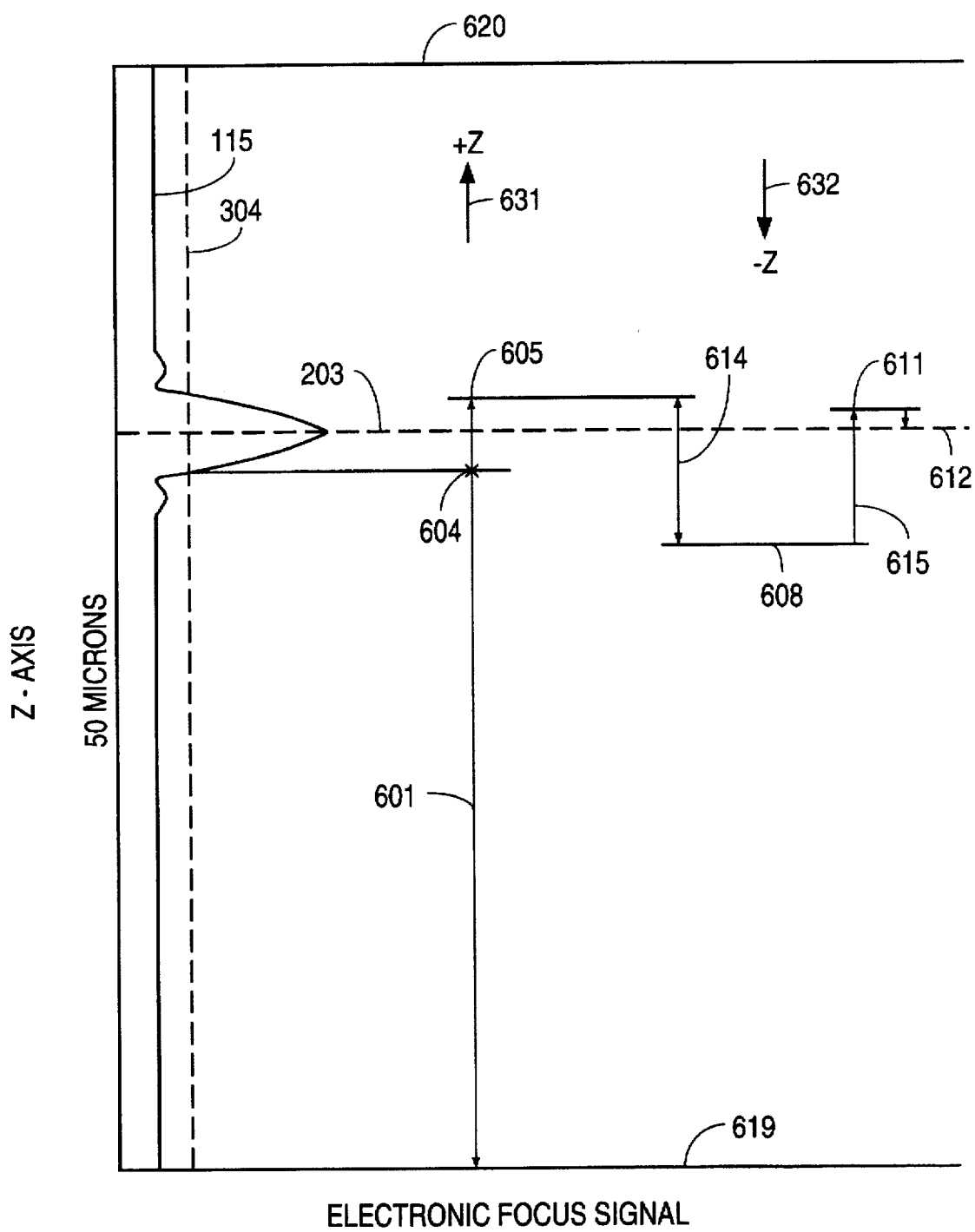
FIG. 7 is a graphic representation illustrating one embodiment of a fine auto-focus operation.

FIG. 7 is a graphic representation of one embodiment (henceforth "first" embodiment) of a fine auto-focus operation as encoded in routine AFocusServo on page 7 of microfiche appendix A. Although FIG. 7 illustrates two fine passes, any number of passes other than two can be used in other embodiments. The vertical axis in FIG. 7 illustrates the position of target 112 along the Z-axis. The horizontal axis in FIG. 7 illustrates the magnitude of electronic focus signal 115.

Prior to a first fine pass 601, microprocessor 403 sends a zeroing signal to position control register 408 (FIG. 4). This signal is transmitted through DAC 409, summing node 410 and amplifier 411 to piezoelectric element 1130 (FIG. 11) in fine Z-stage 120. Fine Z-stage 120, which was positioned in the middle of its operating range during the coarse auto-focus operation, moves to the lowermost position 619 (FIG. 7) of its operating range (in a startup pass similar to that described above for a coarse auto-focus operation) in response to the zeroing signal. Microprocessor 403 then instructs control register 406 to transmit a reset signal to clear flip flop 402. This instruction allows flip flop 402 to detect when electronic focus signal 115 exceeds threshold value 304.

To begin first fine pass 601, microprocessor 403 transmits a series of signals to position control register 408, thereby causing fine Z-stage 120 to move target 112 in positive Z direction 631 at a relatively high velocity. In one embodiment, this velocity is approximately 75 microns per second.

While it is necessary to precisely control the movement of target 112 during first fine pass 601, piezoelectric element 1130 (FIG. 11) of fine Z-stage 120 has a slightly non-linear position response to the voltage supplied by amplifier 411 (FIG. 4). To correct for this non-linear characteristic, a proximity sensor 1135 (FIG. 11) in fine Z-stage 120 produces an electrical feedback signal that is transmitted to summing node 410 (FIG. 4) and subtracted from the output signal of DAC 409 to create an error signal. When integrator 420 receives any non-zero error signal, integrator 420 generates an output signal that forces the error signal to zero. In this manner, integrator 420 compensates for the non-linear response of the piezoelectric element 1130, thereby allowing for linear control of the target's position by piezoelectric element 1130.

First fine pass 601 uses the threshold method so that before target 112 reaches the top of the operating range 620 of fine Z-stage 120, electronic focus signal 115 exceeds the threshold value 304 at a first trip position 604, because, as described above, the coarse auto-focus operation ensures that focus position 203 lies within the range of fine Z-stage 120 (FIG. 7). At this time, flip flop 402 latches, thereby enabling a bit in status register 405. Microprocessor 403, which continuously monitors status register 405, detects that the change in status of flip flop 402 and signals position control register 408 to stop movement of fine Z-stage 120, and thereby stop movement of target 112. Target 112 comes to rest at a first stopping position 605 which can either be above or below focus position 203.

Consequently, prior to performing a second fine pass 615, microprocessor 403 instructs fine Z-stage 120 to reposition target 112 a predetermined fixed distance 614 in negative Z direction 632 such that a second stopping position 608 of target 112 is below focus position 203. Factors that must be considered when selecting distance 614 are similar or identical to the factors described above regarding the distance required to stop target 112 during first coarse pass 513. In one embodiment, distance 614 is 3.6 microns.

After target 112 has been repositioned at second stopping position 608, a second fine pass 615 is performed by moving target 112 in positive Z direction 631 at a relatively low velocity (e.g. 7.5 microns per second). During second fine pass 615, microprocessor 403 monitors the output of ADC 407, rather than the status of flip flop 402. The output of ADC 407 is a digital representation of electronic focus signal 115. In this manner, microprocessor 403 measures the value of electronic focus signal 115 as target 112 moves along the Z-axis.

Second fine pass 615 uses a peak detection method in which software within microprocessor 403 maintains an updated record of the maximum value output by ADC 407 and the position of target 112 at this maximum output value. Upon detecting an increasing value of electronic focus signal 115, followed by a decreasing value of electronic focus signal 115, microprocessor 403 instructs fine Z-stage 120 to stop the motion of target 112 at third stopping position 611. Third stopping position 611 is located above focus position 203 because of target overshoot which occurs for reasons similar to those described above. Microprocessor 403 then instructs fine Z-stage 120 to move target 112 in negative Z direction 632 to position 612 where the maximum value output by ADC 407 was detected.

In one embodiment, position 612 is typically within one tenth of a micron of focus position 203. This accuracy is determined by the velocity of target 112 and the number of bits used in ADC 407. The slower the velocity of target 112 during second fine pass 615 and the greater the number of bits used in ADC 407, the closer position 612 will be to focus position 203. The entire fine auto-focus operation is completed in approximately one second in one embodiment. The completion time is dependent upon the location of focus position 203 within the range of fine Z-stage 120. Computer code used to perform an auto-focus operation in accordance with one embodiment of fine auto-focus method is set forth in Appendix A. The computer code of Appendix A is written in neuron C language, which requires an ECHELON compiler, available from Echelon Corp. of 4015 Miranda Ave., Palo Alto, Calif. 94304.

Figure 8A:
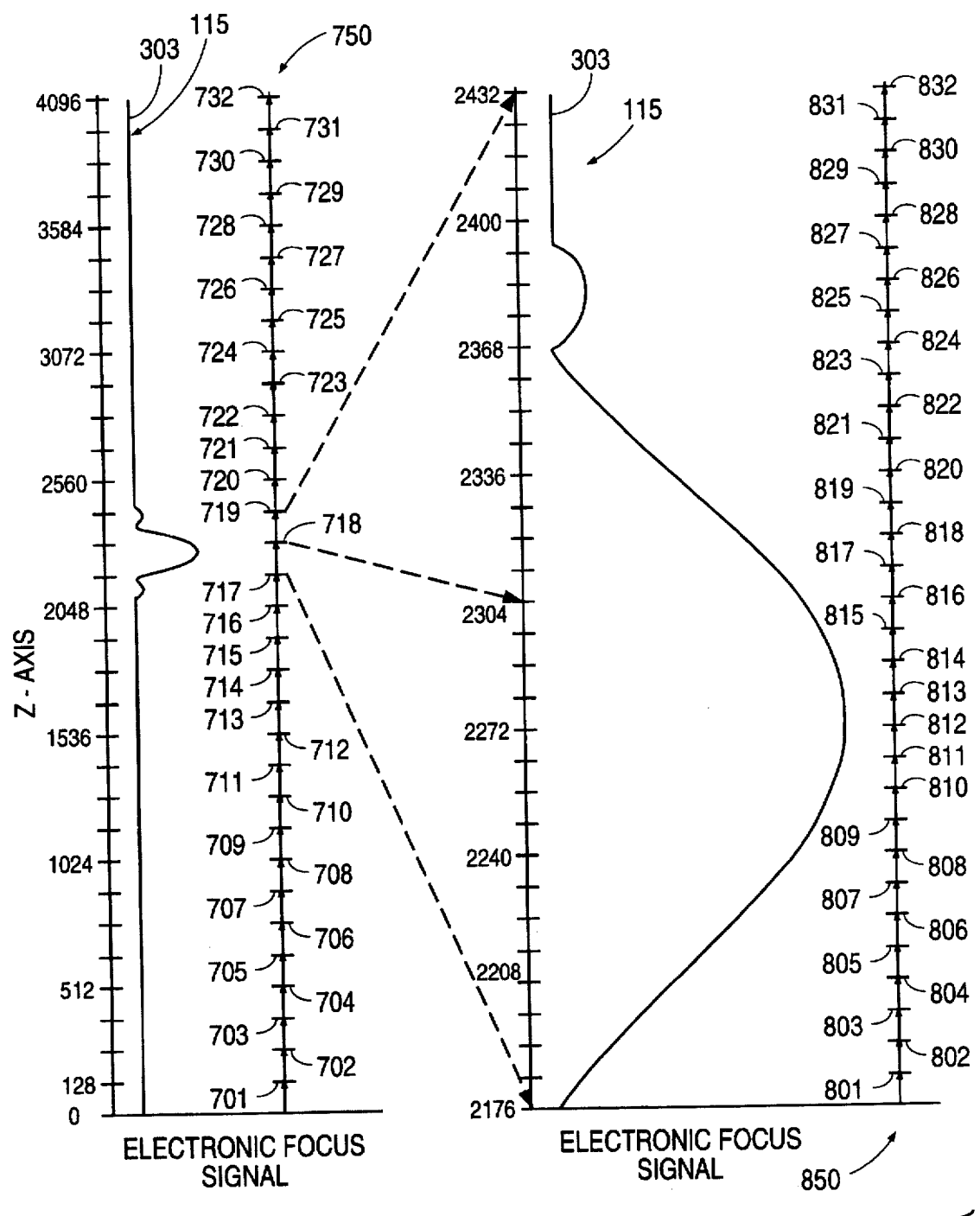
FIG. 8A is a graphic representation illustrating another embodiment of a fine auto-focus operation.

FIG. 8A is a graphic representation of another embodiment (henceforth "second" embodiment) of a fine auto-focus operation. Although FIG. 8A illustrates two fine passes, a number of passes other than two can be used in other embodiments. The vertical axis in FIG. 8A illustrates the position (e.g. elevation) of target 112 along the Z-axis. The horizontal axis in FIG. 8A illustrates the magnitude (i.e. strength) of electronic focus signal 115. In first fine pass 750, target 112 is moved to each of positions 701–732. In second fine pass 850, target 112 is moved to each of positions 801–832.

Prior to first fine pass 750, microprocessor 403 sends a zeroing signal to position control register 408 (FIG. 4). This signal is transmitted through DAC 409, integrator 420, summing node 410 and amplifier 411 to piezoelectric element 1130 of fine Z-stage 120. Fine Z-stage 120, which was positioned in the middle of its operating range before a coarse auto-focus operation (e.g., Step No. 2048 in FIG. 8A), moves to the bottom of its operating range (i.e., Step No. 0 in FIG. 8A) in response to the zeroing signal, as illustrated by FIG. 8B.

First fine pass 750 uses a peak detection method. During first fine pass 750, target 112 is moved in the positive direction, e.g. upward through the full range of motion of fine Z-stage 120 (i.e., 50 microns). As shown in FIG. 8A, this range is divided into 4096 steps. Other numbers of steps can be used in other embodiments. Microprocessor 403 can position target 112 at any one of these steps by sending a digital word to DAC 409 (FIG. 4). During first fine pass 750, microprocessor 403 sequentially provides 32 digital words to DAC 409, causing fine Z-stage 120 to sequentially move target 112 to each of 32 positions 701–732. Each of the 32 positions 701–732 are separated by 128 steps (approximately 1.56 microns in one embodiment). At each of the 32 positions 701–732, the output voltage of ADC 407 (corresponding to the electronic focus signal 115) is repeatedly measured and digitally filtered (low-pass) by microprocessor 403 to obtain a single value for each of the 32 positions 701–732. Microprocessor 403 saves the peak value of the output voltage and the position at which the peak value occurred.

Because the 32 positions 701–732 of first fine pass 750 are spaced 1.56 microns apart, and electronic focus signal 115 has a depth of focus 302 of approximately 2.54 microns, a focus position is not missed. A relative peak value of the electronic focus signal is found within the 32 positions 701–732 as long as there is enough system gain to distinguish electronic focus signal 115 from background value 303 and enough system gain such that electronic focus signal 115 can be detected by ADC 407. System gain is determined by the laser power, the gain of photodetector 114, and the reflectivity of the sample. The present invention therefore has an advantage over prior art auto-focus microscopes, which require a much larger system gain in order for an auto-focus operation to be performed.

The position 718 at which the peak value is detected during first fine pass 750 (illustrated as Step No. 2304 in FIG. 8A) becomes the center of the second fine pass 850. Microprocessor 403 instructs fine Z-stage 120 to move target 112 to 128 steps below position 718 (i.e., to Step No. 2176). In other embodiments, a different number of steps can be used.

Next, microprocessor 403 sequentially provides 32 digital words to DAC 409, causing fine Z-stage 120 to sequentially move target 112 upward to each of 32 positions 801–832. Each of 32 positions 801–832 are separated by 8 steps (approximately 0.0977 microns). The total distance of second fine pass is 3.125 microns. At each of 32 positions 801–832, output voltage of ADC 407 (corresponding to electronic focus signal 115) is repeatedly measured and digitally filtered (low-pass) by microprocessor 403 to obtain a single value for each of 32 positions 801–832. Microprocessor 403 saves the peak value of the output voltage and the position at which the peak value occurred.

Figure 8C:
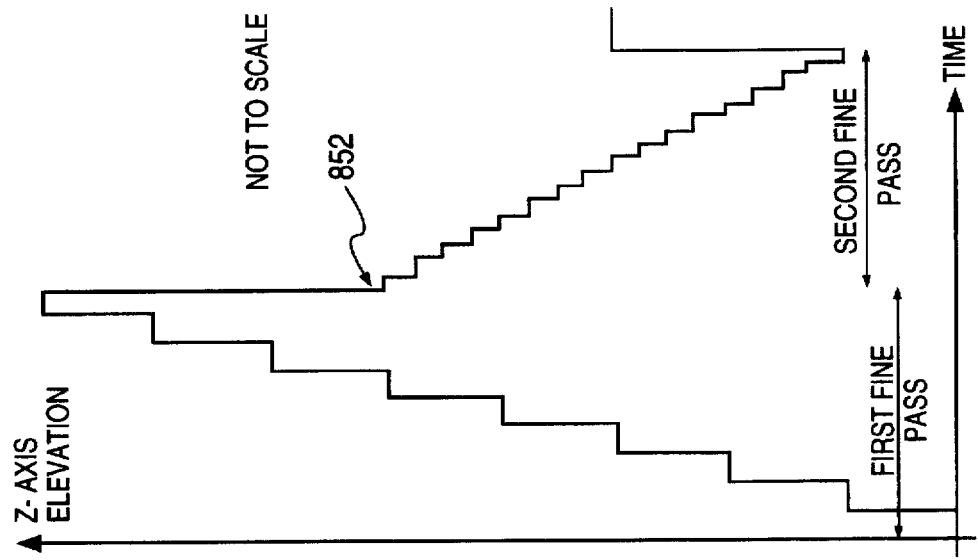
FIGS. 8B and 8C illustrate the movement of a target along the Z axis of FIG. 8A with respect to time in two alternative embodiments.
Figure 8B:
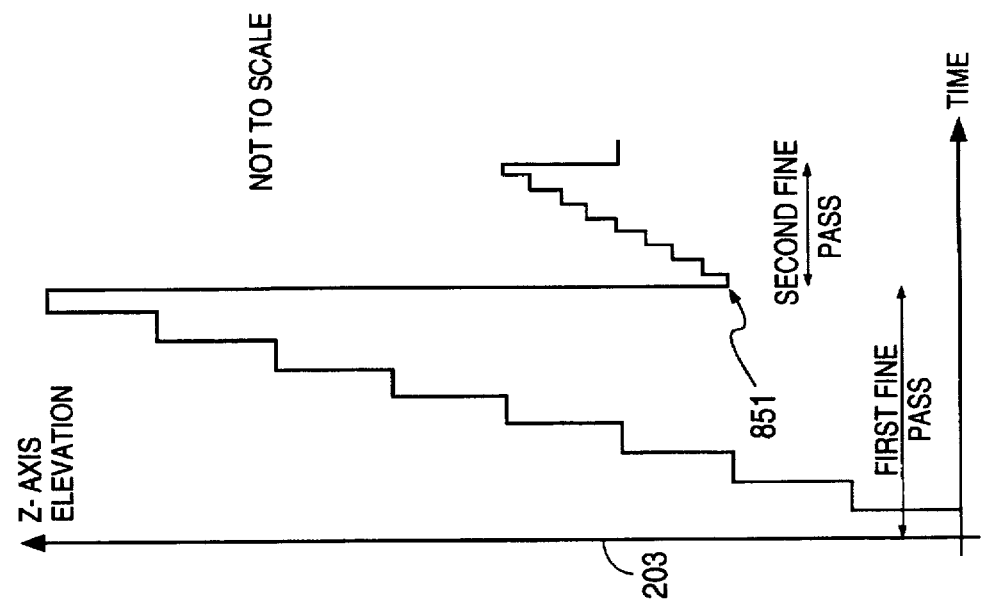

In yet another embodiment (henceforth "third" embodiment), first fine pass 750 is performed as described above for the second embodiment and second fine pass 850 is performed by positioning target 112 at 128 steps above position 718 sample value was detected during first fine pass 750 (e.g., at Step No. 2432 in FIG. 8A and at position 852 in FIG. 8C). Microprocessor 403 then sequentially provides 32 digital words to DAC 409, causing the fine Z-stage 120 to sequentially move target 112 in the same direction (e.g. downward) through 32 positions 832–801 in FIG. 8A. (See also FIG. 8C.) Moving in the same direction in second fine pass 850 avoids the large acceleration caused by direction reversal at position 851 (FIG. 8B).

After passing through the entire range (3.125 micron in one embodiment) of second fine pass 850, microprocessor 403 instructs fine Z-stage 120 to position target 112 at position 812 at which a peak value is detected during second fine pass 850 (illustrated as Step No. 2272 in FIG. 8A). At the end of second fine pass 850, target 112 is positioned adjacent to actual focus position 203, i.e., within half the length between each of the 32 positions of the second fine pass 850 (within at least 0.0488 microns in one embodiment).

An advantage of a second fine pass (and additional fine passes) that target 112 is positioned quickly and reliably without relying on a threshold value. In one embodiment, fine Z-stage 120 positions target 112 sixty-seven times (including sixty-four positions at which measurements are taken and three positions at which measurements are not taken) to perform the fine auto-focus operation in approximately 0.9 seconds. Computer code used to perform one embodiment an auto-focus operation for a fine pass is set forth in microfiche appendix A.

Figure 9:
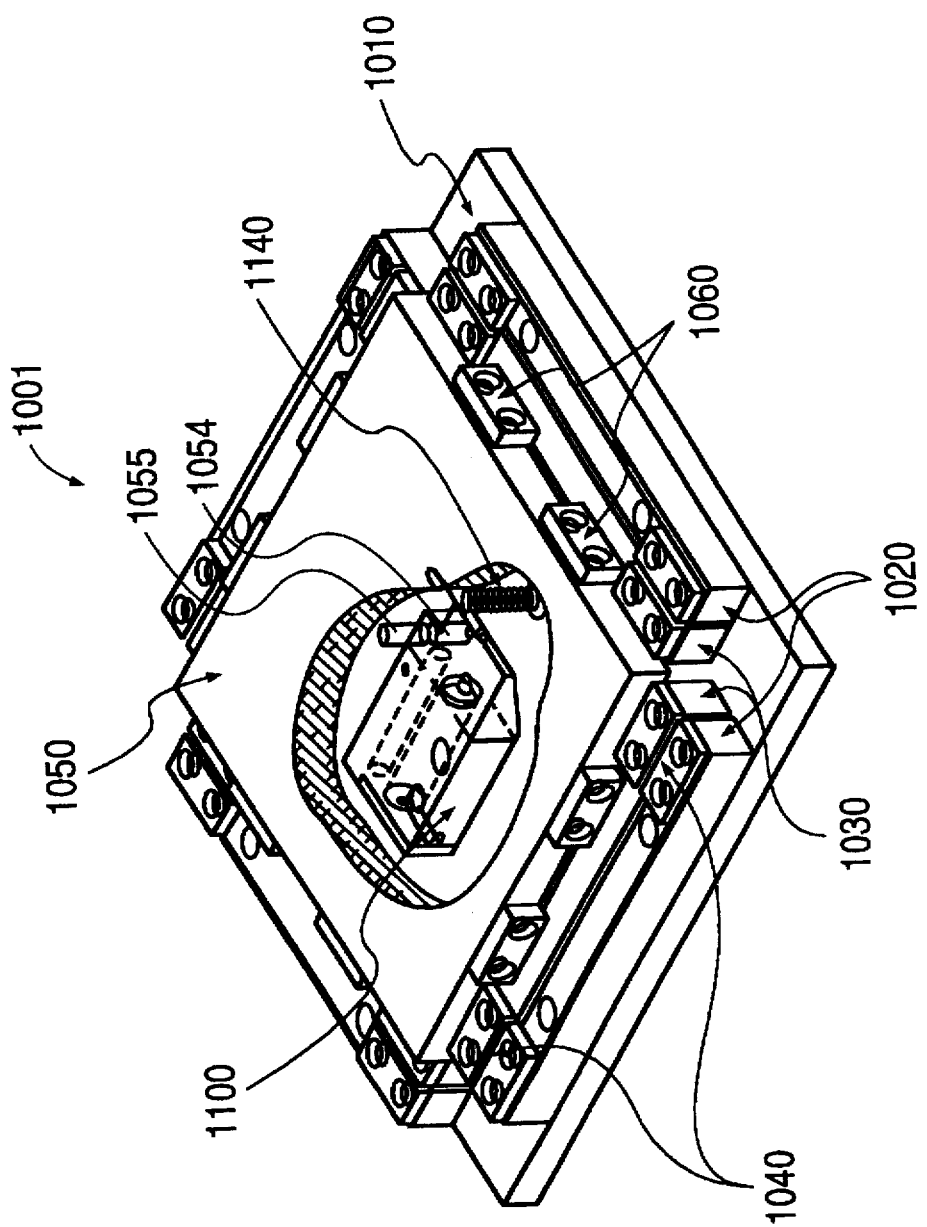
FIG. 9 is an isometric view of a fine Z-stage.
Figure 10:
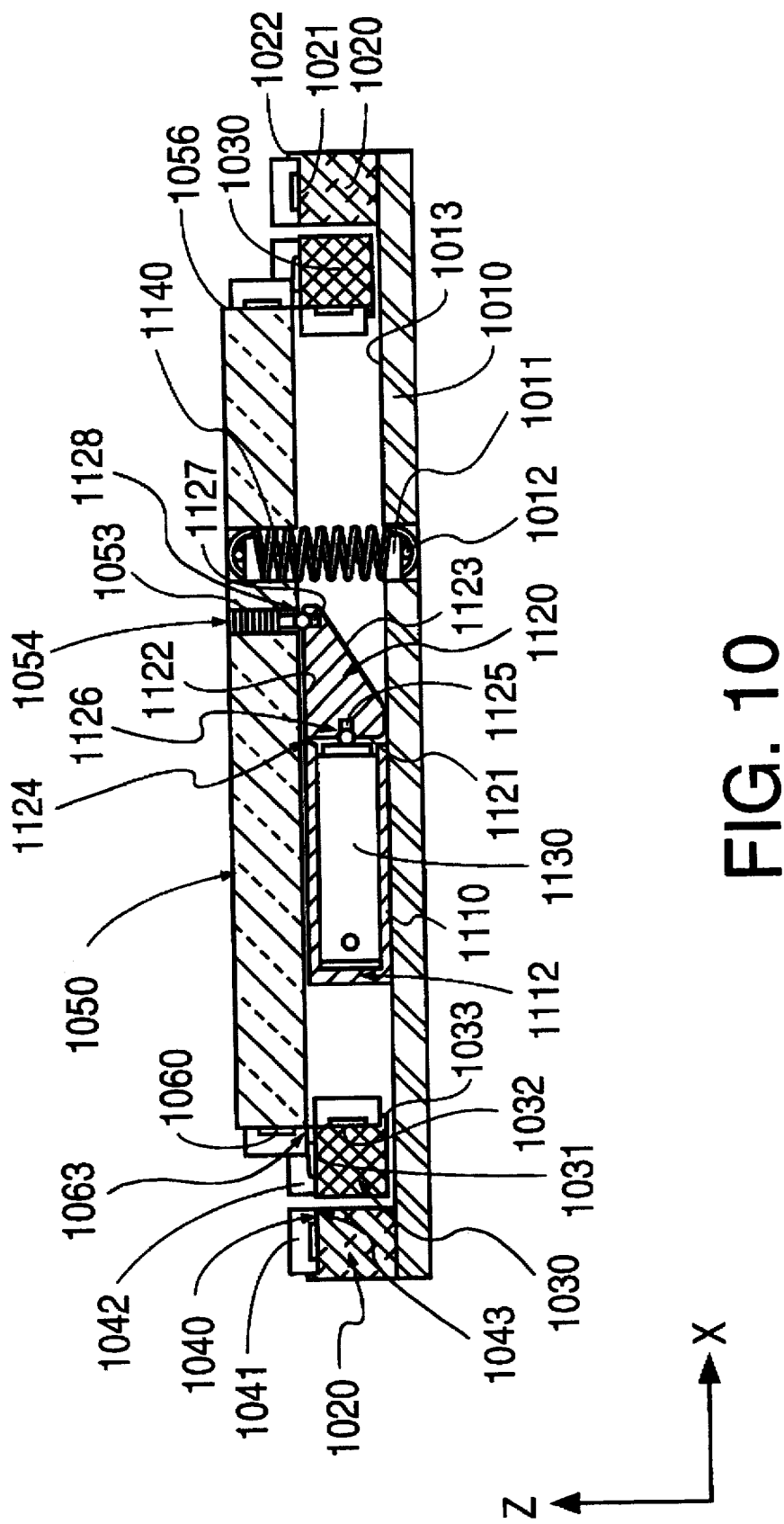
FIG. 10 is a cross sectional view of the fine Z-stage of FIG. 9.

A preferred embodiment of fine Z-stage 120 is shown in FIGS. 9–11. Microfiche appendix D at pages 65 and 66 lists various parts used in the embodiment shown in FIGS. 9–11. Referring to FIG. 9, fine Z-stage 120 includes a square bottom plate 1010, four stationary bars 1020 fixedly connected along the edges of the bottom plate 1010, four rotating bars 1030 pivotally connected to the stationary bars 1020 such that each rotating bar 1030 is connected to one stationary bar 1020, and a square top plate 1050 pivotally connected along its edges to the four rotating bars 1030.

A first set of horizontally-disposed flexures 1040 is connected between upper surfaces of the stationary bars 1020 and the rotating bars 1030, and a second set of vertically-disposed flexures 1060 is connected between side surfaces of the rotating bars 1030 and the edges of the top plate 1050. In addition, the fine Z-stage 120 includes a piezoelectric actuator mechanism 1100 disposed in a space formed between the top plate 1050 and the bottom plate 1010. Finally, an optional biasing spring 1140 is connected between the top plate 1150 and the bottom plate 1110 for biasing the top plate 1150 toward the bottom plate 1110.

Referring to FIG. 10, the bottom plate 1010 is preferably a flat aluminum sheet 8 by 8 inches wide and 0.375 inch thick. As shown in FIG. 10, the bottom plate 1010 includes a receiving hole 1011 within which is located a pin 1012 for securing a first end of the optional biasing spring 1140. The bottom plate 1010 also includes an upper surface 1013.

Referring back to FIG. 9, the stationary bars 1020 are preferably aluminum bars 5.5 inches long, 0.65 inch high and 0.5 inch wide. The stationary bars 1020 are connected to the upper surface 1013 of the bottom plate 1010 using screws. The stationary bars 1020 are formed into a square frame and located along the outer edges of the bottom plate 1020. Referring again to FIG. 10, each stationary bar 1020 includes an upper surface 1021. A lip 1022 is formed along an outer edge of the upper surface 1021 of each stationary bar 1020.

The rotating bars 1030 are preferably aluminum bars which are 5.5 inches long, 0.5 inch high and 0.6 inch wide. The rotating bars 1030 are pivotally connected to the stationary bars 1020, each rotating bar 1030 being connected to one stationary bar 1020. Each rotating bar 1030 includes an upper surface 1031 and an inner side surface 1032. A lip 1033 is formed along a lower edge of the inner side surface 1032 of each rotating bar 1030.

As shown in FIG. 10, thin horizontally-disposed flexures 1040 are connected between the stationary bars 1020 and the rotating bars 1030. Each flexure 1040 is a thin sheet of 303 stainless steel which is 1 inch long, 1 inch wide and approximately 0.01 inch thick. Each flexure 1040 has one portion connected to the upper surface 1021 of a stationary bar 1020 by a first fixture 1041, a second portion connected to the upper surface 1031 of a rotating bar 1030 by a second fixture 1042, and a small pivot portion 1043 located between the stationary bars 1020 and the rotating bars 1030. Two flexures 1040 are connected between each stationary bar 1020 and its associated rotating bar 1030, thereby restricting each rotating bar 1030 to pivot around the pivot portion 1043 such that the rotating bar 1030 remains in a parallel relationship with its associated stationary bar 1020.

The top plate 1050 is preferably a flat aluminum sheet 5.5 by 5.5 inches wide and 0.5 inch thick. Referring to FIG. 10, the top plate 1050 includes a receiving hole 1051 within which is located a pin 1052 for securing a second end of the optional biasing spring 1140 (discussed below). In addition, the top plate 1050 defines threaded holes 1053 (only one shown) for receiving preload screws 1054 and 1055 (see FIG. 9). Finally, the top plate 1050 includes side surfaces 1056.

As shown in FIG. 10, thin vertically-disposed flexures 1060 are connected between the top plate 1050 and the rotating bars 1030. Similar to the above-described horizontally-disposed flexures 1040, each vertically-disposed flexure 1060 is a thin sheet of 303 stainless steel which is 1 inch long, 1 inch wide and 0.01 inch thick. Each vertically-disposed flexure 1060 has one portion connected to the inner side surface 1032 of a rotating bar 1030 by a fixture 1061, a second portion connected to a side surface 1056 of top plate 1050 by a fixture 1062, and a pivot portion 1063 located between the rotating bars 1030 and the top plate 1050. Two flexures 1060 are connected between each rotating bar 1030 and one edge of the top plate 1050, thereby restricting the top plate 1050 to pivot with respect to the rotating bars 1030 such that the top plate 1050 remains in a parallel relationship with the rotating bars 1030.

Referring to FIGS. 10 and 11, the piezoelectric actuator mechanism 1100 includes a retainer block 1110 connected to the bottom plate 1010, a rotating block 1120 integrally and pivotally connected to the retainer block 1110, and an extending portion 1114 integrally and pivotally connected to the retainer block 1110. Further, a piezoelectric element 1130 is received in the retainer block 1110 and has a free end contacting the rotating block 1120. Finally, a sensor 1135 is received in the retainer block 1110 and generates a signal corresponding to an amount of rotation of the extending portion 1114.

Referring to FIG. 11, the retainer block 1110 is formed from 7075-T6 high-strength aluminum alloy and is approximately 1.1 inch long, 0.6 inch wide and 0.1 inch thick. The retainer block 1110 defines a first through-hole 1111 for receiving the piezoelectric element 1130. A stainless steel plate 1112 is connected by fasteners 1113 to retain the piezoelectric element 1130 within the through-hole 1111. In addition, the retainer block 1110 defines a second through-hole 1117 for receiving the sensor 1135. The retainer block 110 also includes a hole 1118 for receiving a sensor lock screw 1119 which contacts and secures the sensor 1135.

As shown in FIG. 11, an extended portion 1114 is formed from 7075-T6 high-strength aluminum alloy and is integrally connected to the upper surface of the retainer block 1110 by a thin flexure. The extended portion 1114 includes a socket 1115 for receiving a 0.125 inch diameter steel ball 1116 which contacts the top plate 1150. The extended portion 1114 is preloaded downward by the preload screw pressing against the steel ball 1116 (see FIG. 9). The sensor 1135 transmits a signal representing a distance between the sensor and a side wall of the extended portion 1114 which varies in response to the rotation of the extended portion 1114. The signal is used to determine the vertical displacement of the top plate 1050, as discussed above.

As shown in FIGS. 10 and 11, the rotating block 1120 is a prism formed from 7075-T6 high-strength aluminum alloy and is approximately 1 inch long. As shown in FIG. 10, the rotating block 1120 includes a vertical side wall 1121, an upper wall 1122 and a diagonal wall 1123. The rotating block 1120 is integrally connected to the upper surface of the retainer block 1110 by a flexure 1124. The side wall 1121 defines a socket 1125 for receiving a 0.125 inch diameter steel ball 1126 which contacts an end of the piezoelectric element 1130. In addition, the upper wall 1122 defines a second socket 1127 for receiving another 0.125 inch diameter steel ball 1128 which contacts the preload screw 1154 mounted in the top plate 1050. It is noted that the steel ball 1128 is located further from the flexure 1124 than the steel ball 1116, which is mounted on the extended portion 1114.

The piezoelectric element 1130 is a cylindrical unit housed in the through-hole 1111 of the retainer block 1110 such that movement of a first end is prevented by the plate 1112, and a second end contacts the vertical side wall 1121 of the rotating block 1120 through the ball 1126. The piezoelectric element 1130 is connected to amplifier 411, as discussed above. A preferred piezoelectric element is sold by Physic Instrument of Waldbronn, Germany under model number P830.20.

The sensor 1135 is also a cylindrical unit housed in the through-hole 1117 and spaced a predetermined distance from the vertical side wall of the extended portion 1114. The sensor 1135 is connected to summing node 410, as discussed above. Once the sensor 1135 is mounted a predetermined distance from the side wall of the extended portion 1114, the sensor lock screw 1118 is tightened against the side of the sensor to prevent movement of the sensor 1135 within the through-hole 1117. A preferred sensor is sold by Kaman Instrumentation of Colorado Springs, Colo. under model number SMU 9000-15N.

Finally, an optional biasing spring 1140 may be connected between the pin 1012 formed in the bottom plate 1010 and the pin 1052 connected to the top plate 1050.

In operation, when no actuating voltage is applied to the piezoelectric element 1130, the optional biasing spring 1140 pulls the top plate toward the bottom plate until the top plate abuts and rests against the ball 1116. In this position, the upper surface 1021 of the stationary bars 1020 and the upper surface 1031 of the rotating bars 1030 are aligned such that the horizontal flexures 1040 are substantially planar. In addition, the inner side surfaces 1032 of the rotating bars 1030 and the side surfaces 1055 of the top plate 1050 are aligned such that the vertical flexures 1060 are substantially planar.

Upon application of an actuating voltage across the piezoelectric element 1130, the piezoelectric element 1130 presses against the side wall 1121 of the rotating block 1120 through the ball 1126, thereby causing the rotating block 1120 to rotate about a pivot portion 1062 of the flexure 1060 connecting the rotating block 1120 to the retainer block 1110. As the rotating block 1120 is rotated away from the retainer block 1110, the ball 1128 presses upward on the preload screw 1154, causing the top plate 1050 to move upward.

Upward movement of the top plate 1050 causes a rotation of the rotating bars 1030. As the rotating bars 1030 are rotated, the horizontally disposed flexures 1040 restrain the rotating bars 1030 such that they remain parallel with their associated stationary bars 1020. In addition, the vertically disposed flexures 1060 cause the top plate 1050 to remain parallel with each of the rotating bars 1030. As a result, the rotating bars 1030 act as torsion bars which prevent unwanted rotation or translation of the top plate 1050, thereby resulting in the upper surface of the top plate 1050 remaining parallel with the bottom plate 1010.

Returning to FIG. 1, the mirror control 124 of FIG. 1 is used to rotate X-mirror 106 and Y-mirror 108 such that laser beam 123 can scan more than a single point on target 112 while performing the coarse and/or fine auto-focus operations. Thus, if X-mirror 106 is rotated while Y-mirror 108 is held still, laser beam 123 will trace a line along the X-axis on target 112. Similarly, X-mirror 106 can be held still while Y-mirror 108 is rotated, thereby tracing a line along the Y-axis on target 112.

In one embodiment of the present invention, the coarse and fine auto-focus operations are performed by scanning a line, rather than a spot, on target 112. In this embodiment, the line scan is performed at a frequency of approximately 8 Khz while target 112 is held stationary at one of several elevations in the range of movement along the Z-axis.

For an area scan method, X-mirror 106 and Y-mirror 108 can both be rotated to trace either a small area or selected parts of a larger area in the X-Y plane of target 112. The small area can be an area in the center of the field of view, while the larger area can be the entire field of view. During the area scan, microscope system 100 covers various features in the field of view in a path similar to a raster path of a television tube. To generate an electronic focus signal at a current Z-axis elevation, an area peak detector 1210 records and a microprocessor 403 reads the value generated by the highest amount of reflected light 123R that occurs during the area scan.

By using a line scan method or an area scan method and averaging the result of the scan to create electronic focus signal 115, the estimate of focus position 203 during a coarse auto-focus operation or a fine auto-focus operation becomes less sensitive to local height variations on the surface of target 112.

Figure 12A:
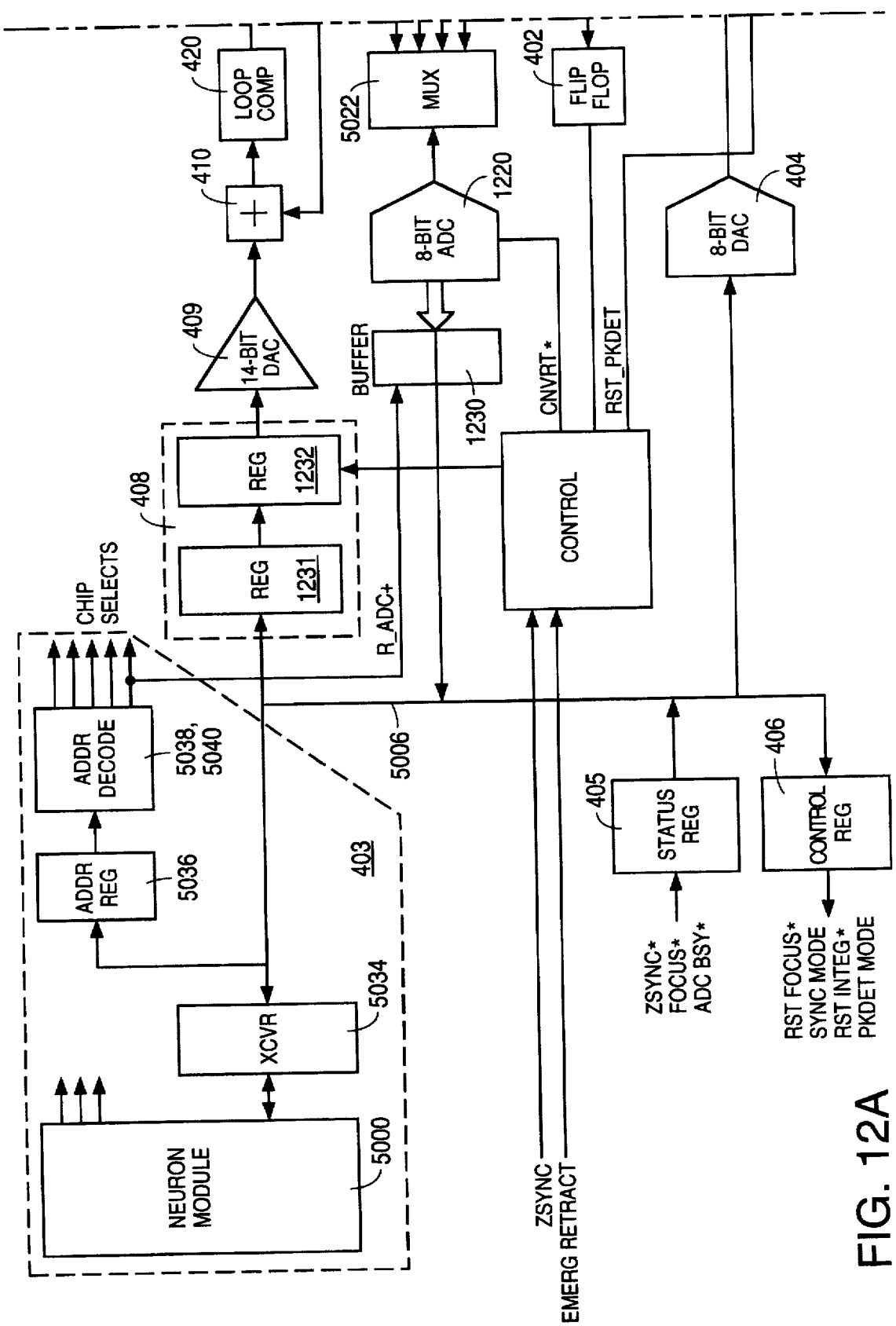
FIG. 12 is a block diagram of another embodiment of a Z-axis controller used to control a fine Z-stage and to provide feedback to a coarse Z-stage.
Figures 12, 12B:
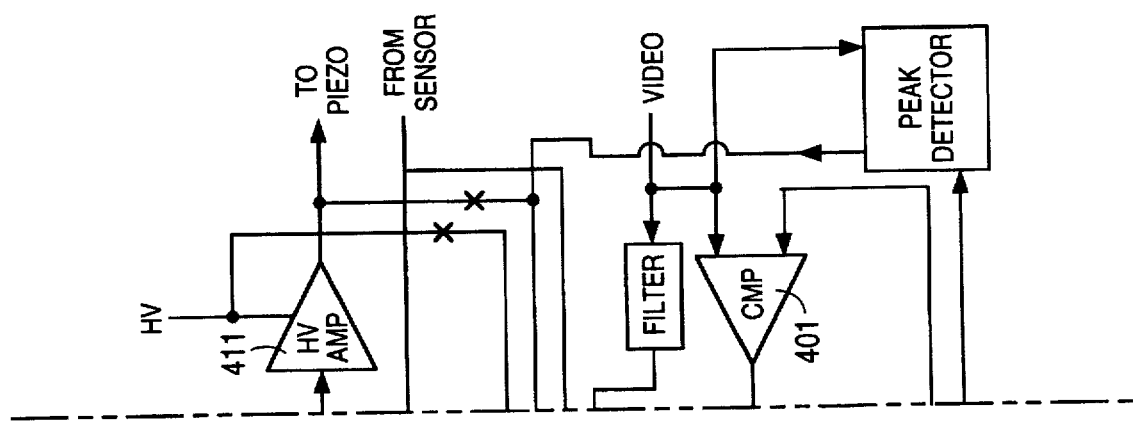

In a preferred embodiment, the area scan method is used for a fine auto-focus operation, although an area scan can also be used for a coarse auto-focus operation. In this embodiment, area peak detector 1210 (FIG. 12) is synchronously reset at the start of the area scan (anywhere on the area can be used as the start, as long as the reset is synchronous). FIG. 12 is similar or identical to FIG. 4, except for certain components that are described below. Area peak detector 1210 acquires or "loads up" during the rest of the area scan as follows. Area peak detector 1210 has a storage capacitor C67 (FIG. 14) that is discharged when area peak detector 1210 is reset. The voltage on storage capacitor C67 is continuously compared to the input voltage of op-amp U26. When op-amp U26's input voltage exceeds the stored voltage of capacitor C67, capacitor C67 is charged up to equal the input voltage. This process happens continuously, so that storage capacitor C67 records the highest input voltage to op-amp U26 no matter how short its duration, (within bandwidth limitations) that occurs after the reset. The only way that storage capacitor C67 discharges is through the reset mechanism or through leakage currents.

Just before being reset for the next area scan, a sampling ADC 5021 digitizes the output of area peak detector 1210. The output of ADC 5021 represents electronic focus signal 115 for the current elevation of target 112. ADC 5021 has a track-and-hold buffer in front (in one embodiment buffer is part of the architecture of ADC 5021), so that acquiring the output of area peak detector 1210 is virtually instantaneous. The ADC can digitize a voltage at the output of area peak detector 1210 at 0.386 V/µs without error, that translates to an acquisition time of about 25 ns. Area peak detector 1210 can be reset very quickly, using for example, a 500 nanosecond pulse. The time during which output of area peak detector 1210 is digitized and area peak detector 1210 reset is an extremely small portion of the overall area scan time so that only a very small portion of the area (e.g. 0.15%) is ignored while area peak detector 1210 is reset.

Normally an X-axis laser scanner (not shown) (also referred to as "line scanner") that is used in microscope system 100 is resonant, while a Y-axis scanner (not shown), is a closed-loop galvo scanner that follows a "sawtooth" waveform (relatively slow scan followed by a fast flyback) during normal imaging that is unrelated to an auto-focus operation.

For an area scan used to find focus position 203, the Y-axis scanner (also referred to as "page scanner") follows a triangular wave profile 1301 (FIG. 13A) that is different from the "sawtooth" waveform at a much higher scan rate (e.g. 125 Hz) than normal (e.g. 13 Hz). The high scan rate allows microscope system 100 to trace a raster (e.g. sine wave) path in the area in the field of view quickly (8 msec in one embodiment), albeit at less resolution (e.g. 32 lines/frame). At the end of an auto-focus operation, once target 112 has been positioned at focus position 203, the page scanner is returned to its normal slow sawtooth waveform.

Buffer 1230 connected to the output terminals of ADC 5021 allows signals on ADC 5021's output terminals to be turned on and held on without interfering with the operation of data bus 5006. This is required because ADC 5021 used in this embodiment cannot be configured to do a conversion without turning on signals at its output terminals. Conversion is initiated by hardware at a very precise predetermined time, at the end of an area scan. Signals that result from conversion remain active at the output terminals of ADC 5021 until microprocessor 403 detects that a scan is complete, reads ADC 5021 through buffer 1230 by asserting signal R_ADC* and resets ADC 5021 by pulsing signal RST-ZSYNC*.

FIG. 13B illustrates events after the rising edge of signal ZSYNC. Signal ZSYNC rises at the end of each page scan to indicate completion of a scan cycle. The time scale in FIG. 13B is different from that of FIG. 13A. Signal ZSYNCD*, that is a saved version of signal ZSYNC, goes low in response to a rising edge in signal ZSYNC. At the same time, signal CNVRT* (FIG. 13B) also goes low, initiating an analog to digital conversion and causing signal ADC_BSY* (FIG. 13B) to go low. Signal BUSY1* and signal BUSY2* are delayed versions of signal ADC_BSY*, and are used to generate an active high pulse in signal RST_PKDET (FIG. 13B) after signal ADC_BSY, returns high, to reset peak detector 1220 after ADC's conversion is completed. So ADC 5021 automatically starts a conversion when signal ZSYNC goes high, and area peak detector 1210 is automatically reset when the conversion is complete. Because there is a T/H in ADC 5021, the peak detector 1220 can be reset after the T/H has acquired, and before the conversion is complete.

Signal CNVRT* stays low until signal RST_ZSYNC* falls, which keeps the conversion result present at the output terminals of ADC 5021. Software in microprocessor 5000 reads ADC 5021 (via signal R_ADC*) before resetting signal ZSYNCD*. Signal ZSYNCD* is an input signal to microprocessor 5000 and indicates that a frame is complete.

In one embodiment, there is a relatively long and unpredictable latency in the response of host workstation 116 to signal ZSYNCD*. Hence most of the control signals (e.g. signals RST_PKDET and CNVRT*) for area peak detector 1210 and ADC 5021 are generated in hardware.

Figure 14A:
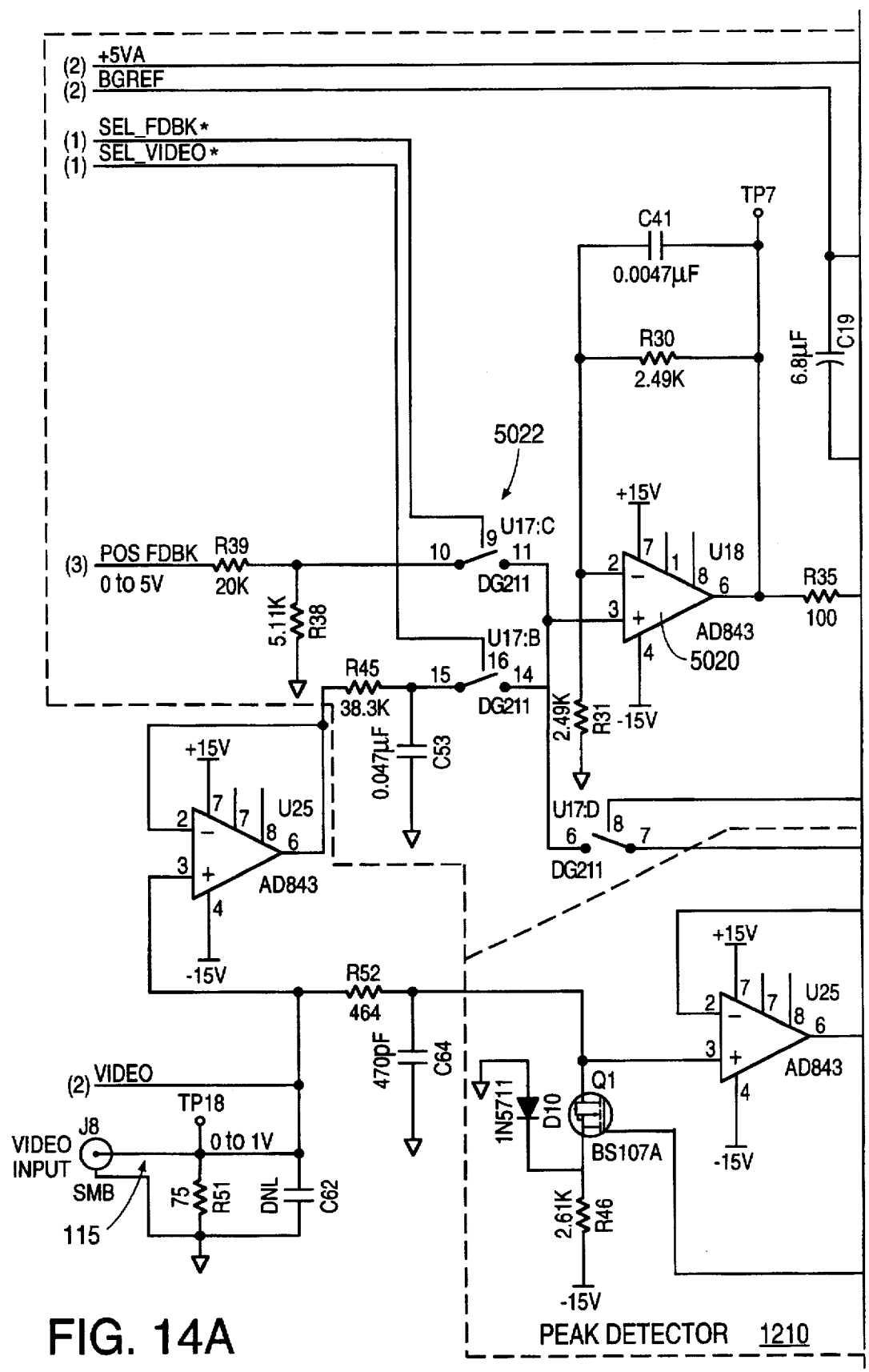
FIGS. 14–21 are schematic diagrams of the embodiment of the Z-axis controller of FIG. 12.
Figure 14B:
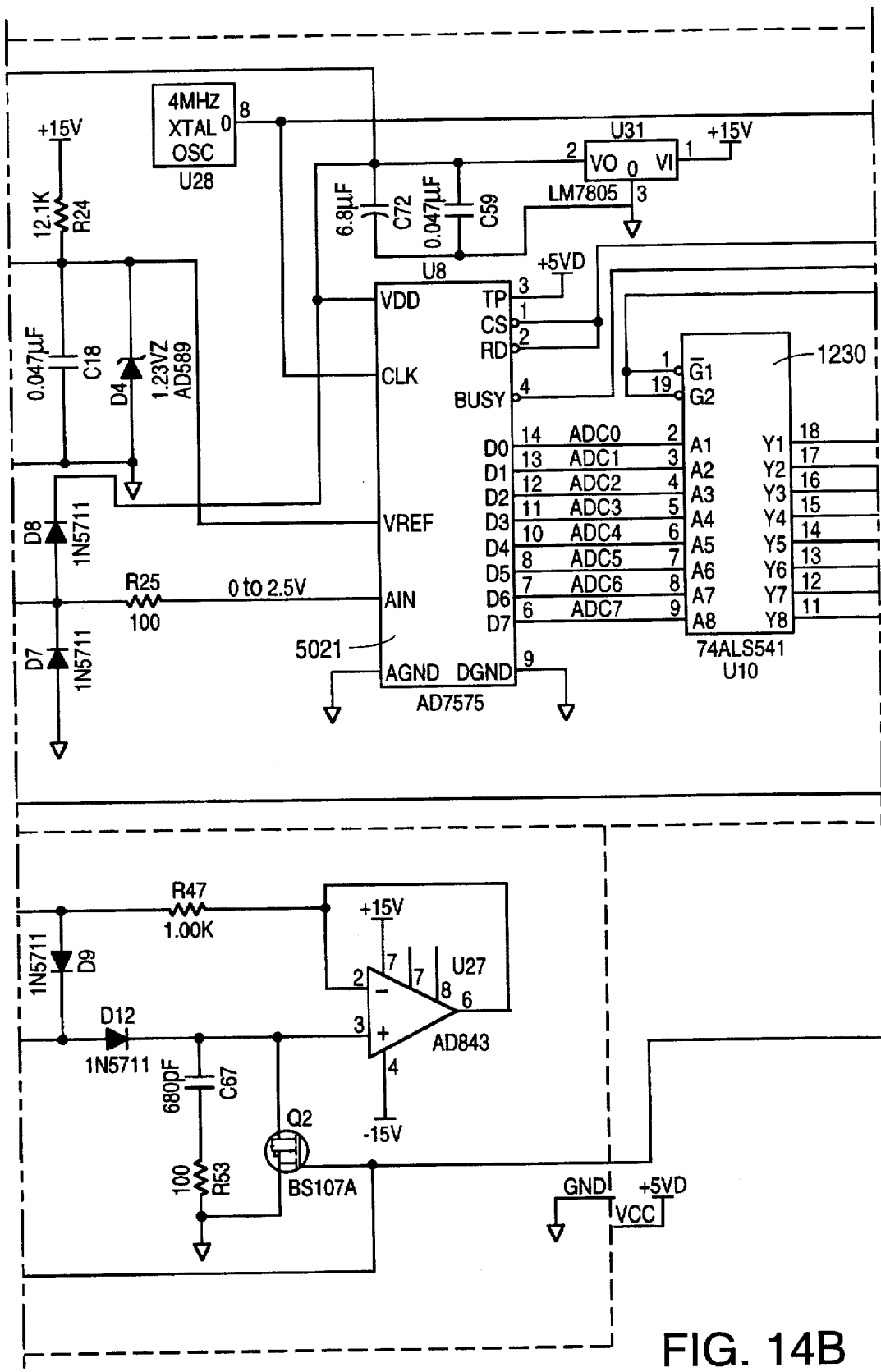
Figure 14C:
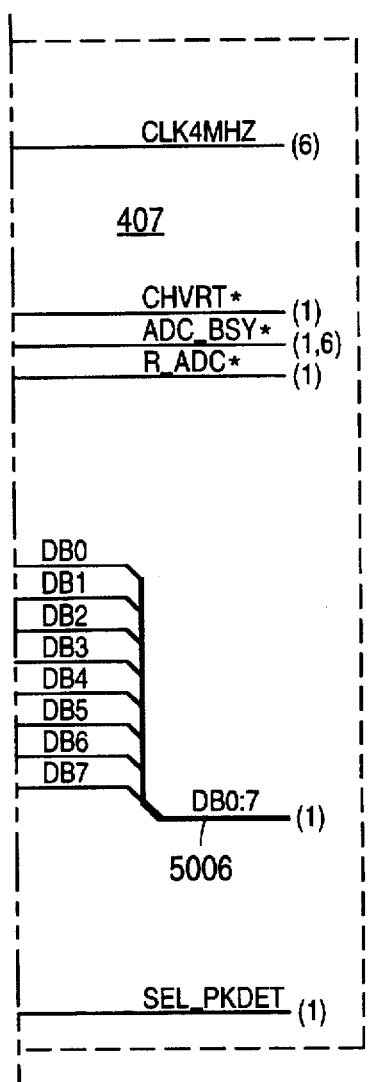
Figure 14C:
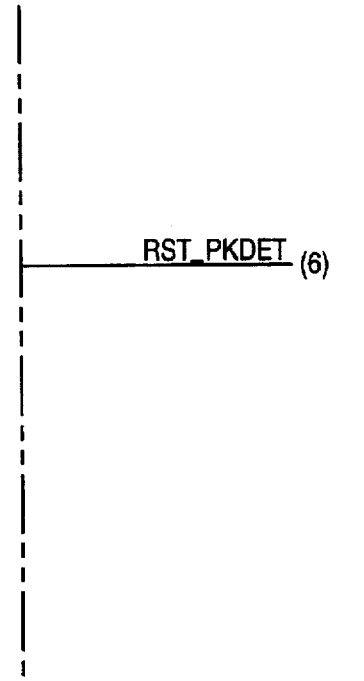
Figure 14:
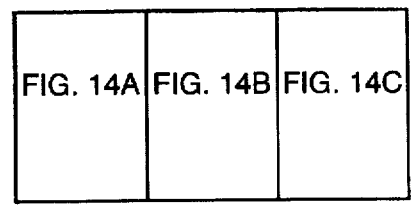
Figure 15A:
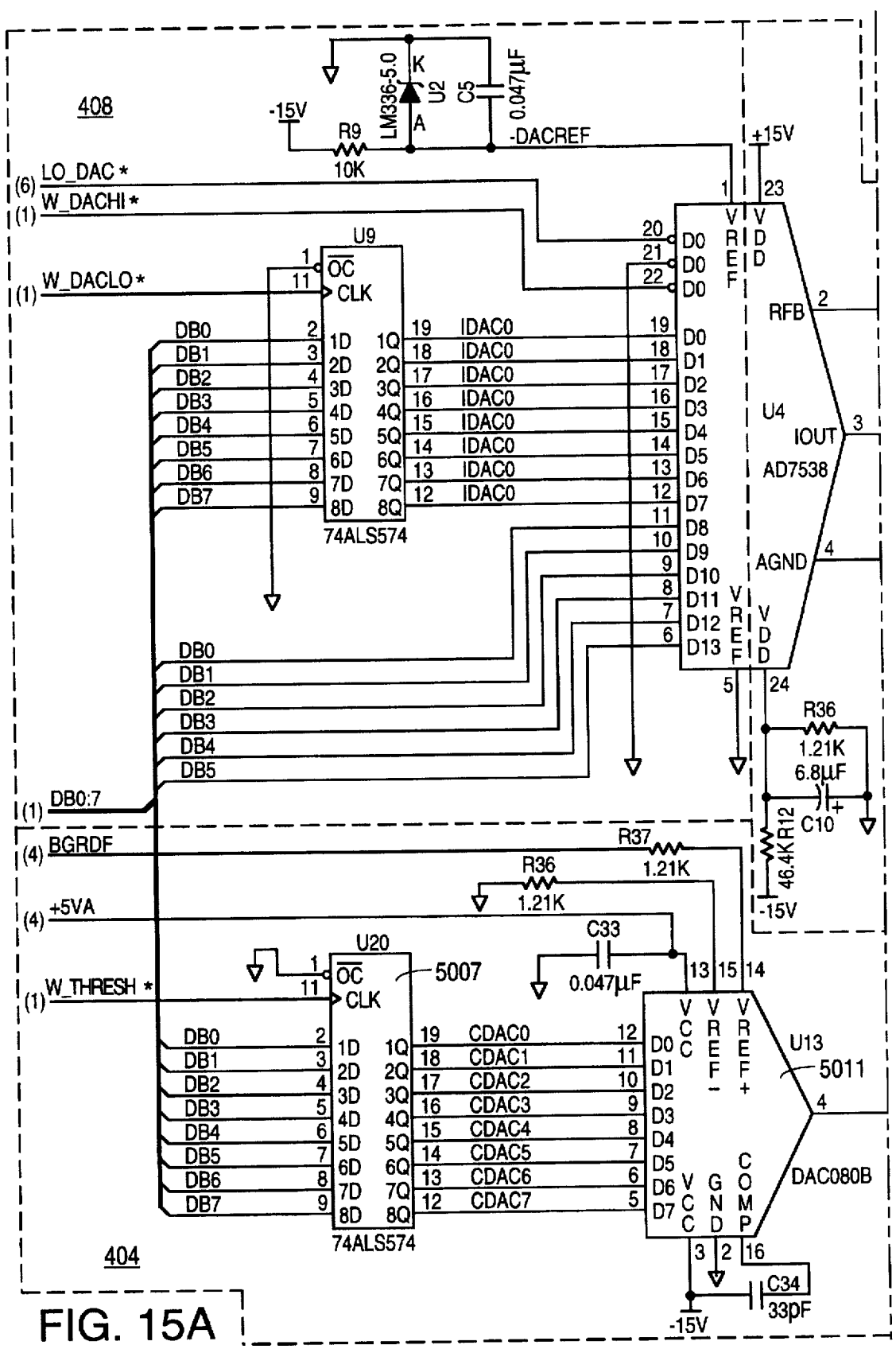
Figures 15, 15B:
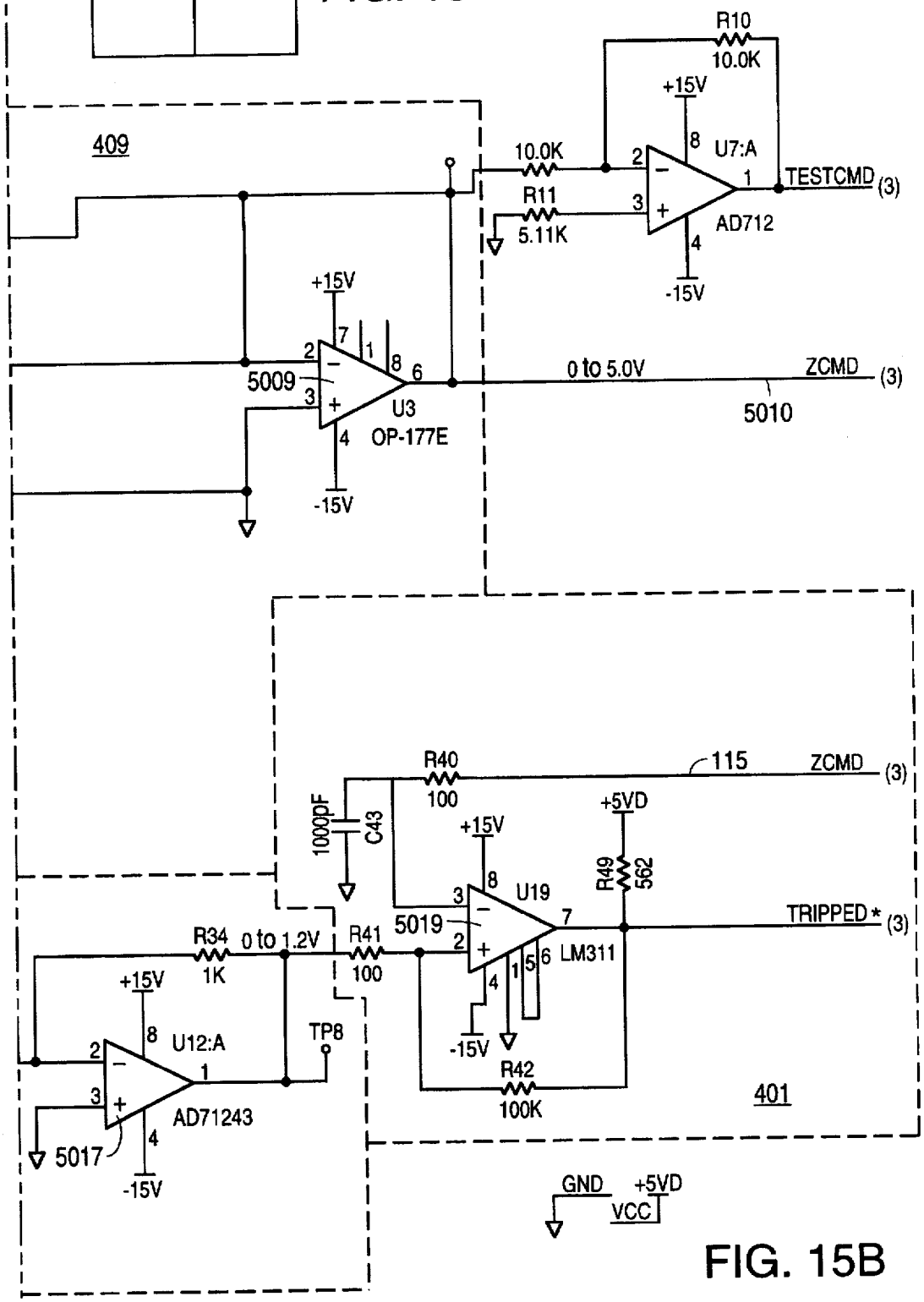
Figure 16A:
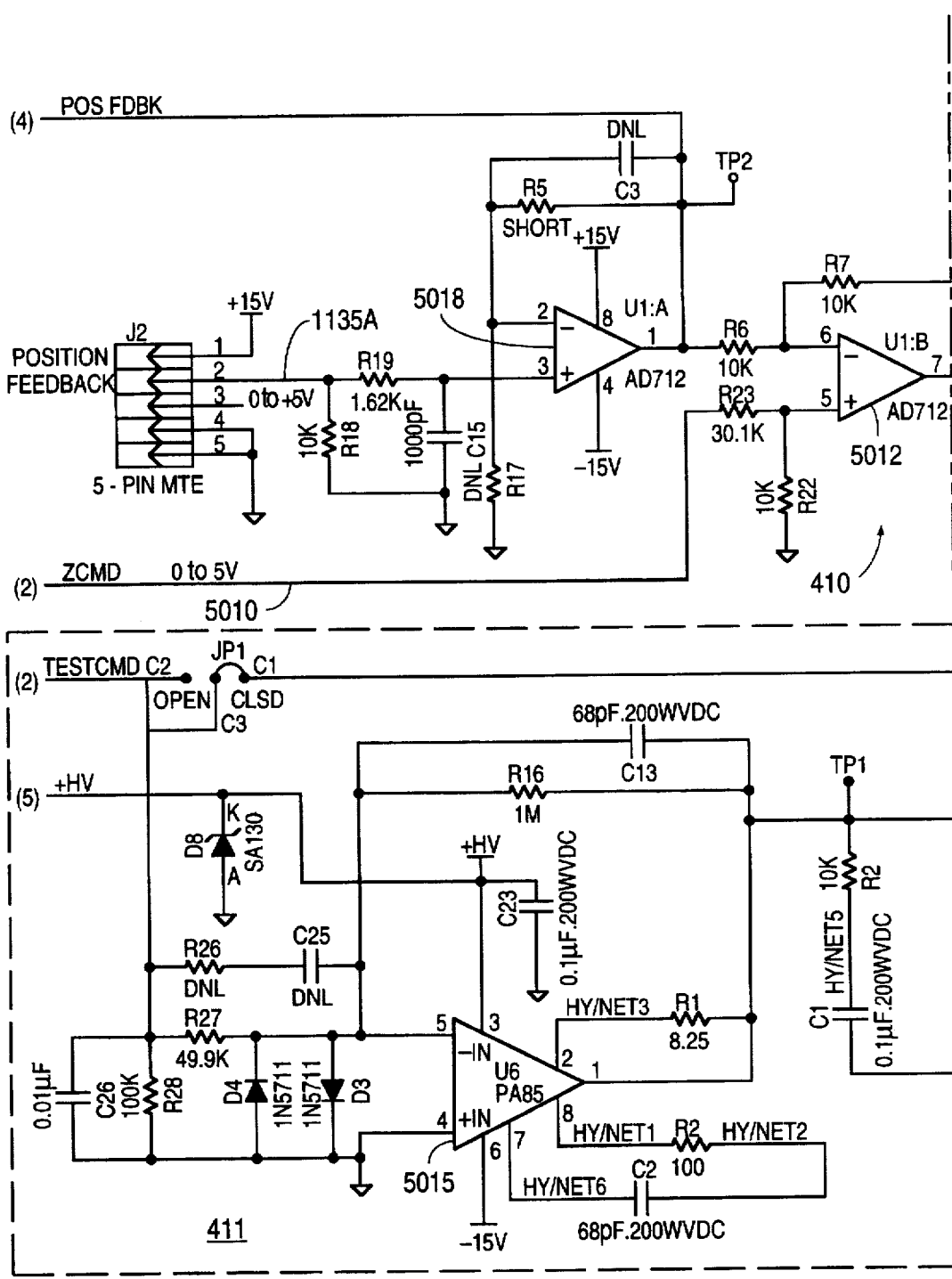
Figure 17A:
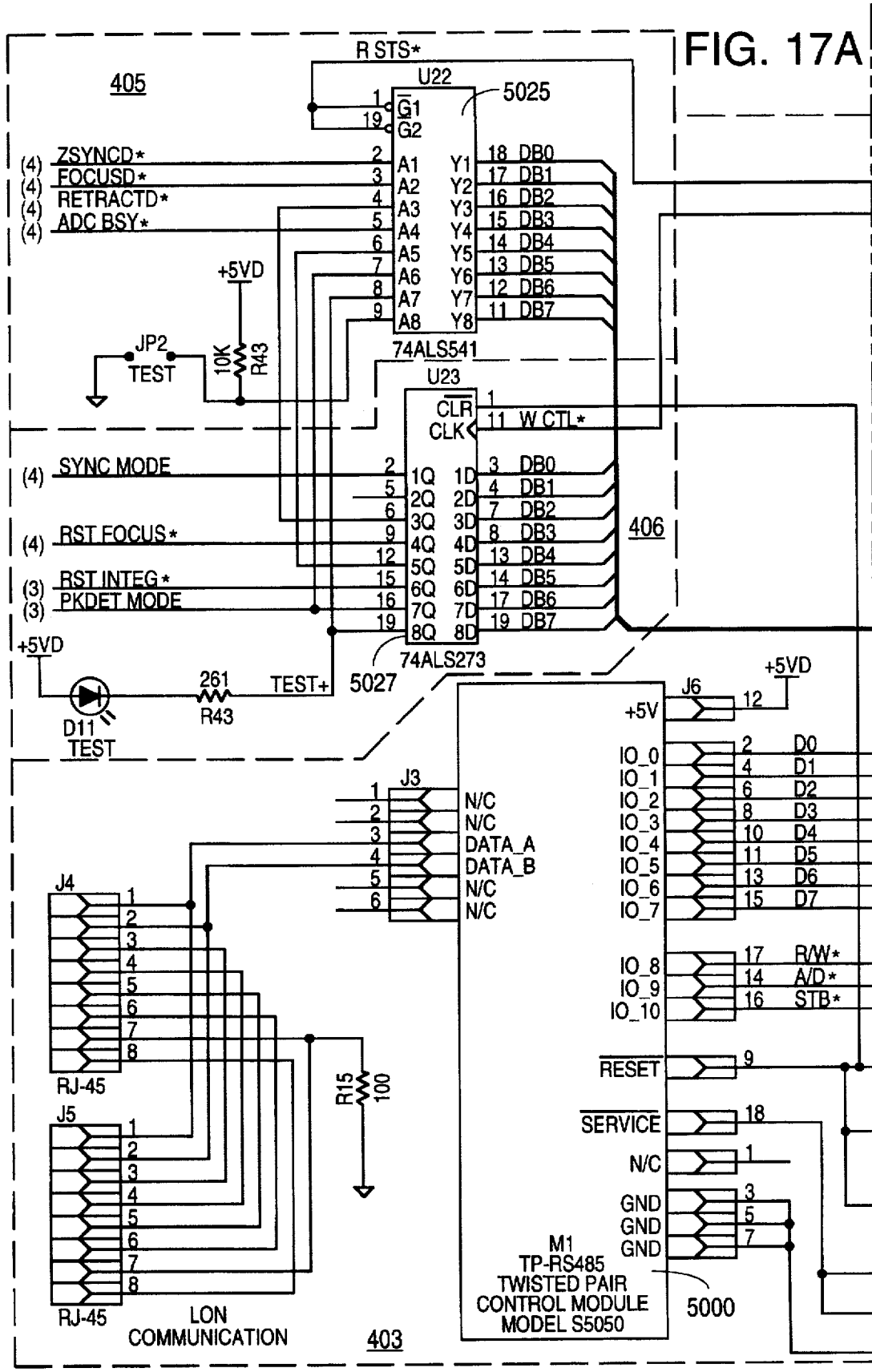
Figure 17B:
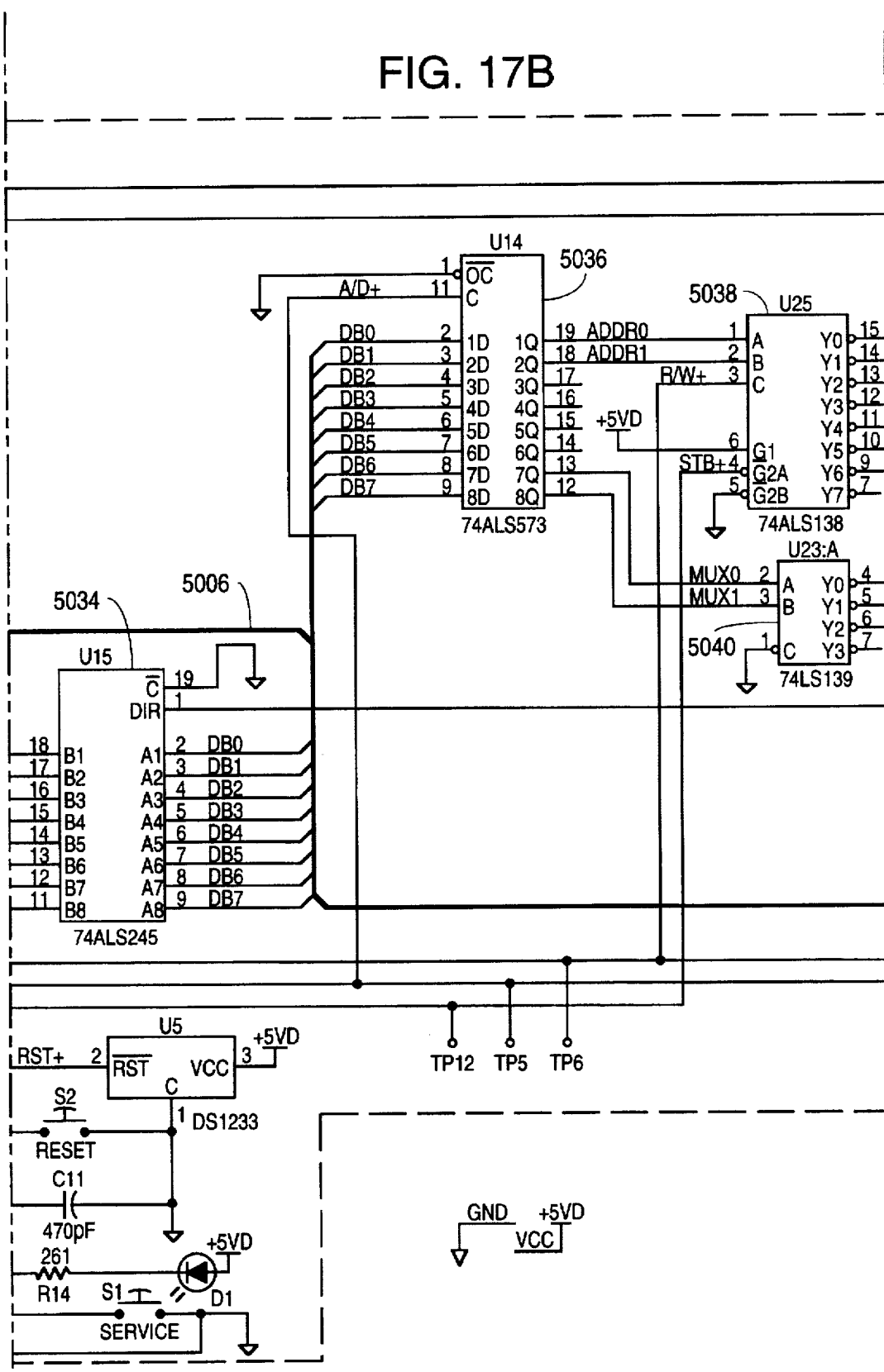
Figures 18, 19, 20A:
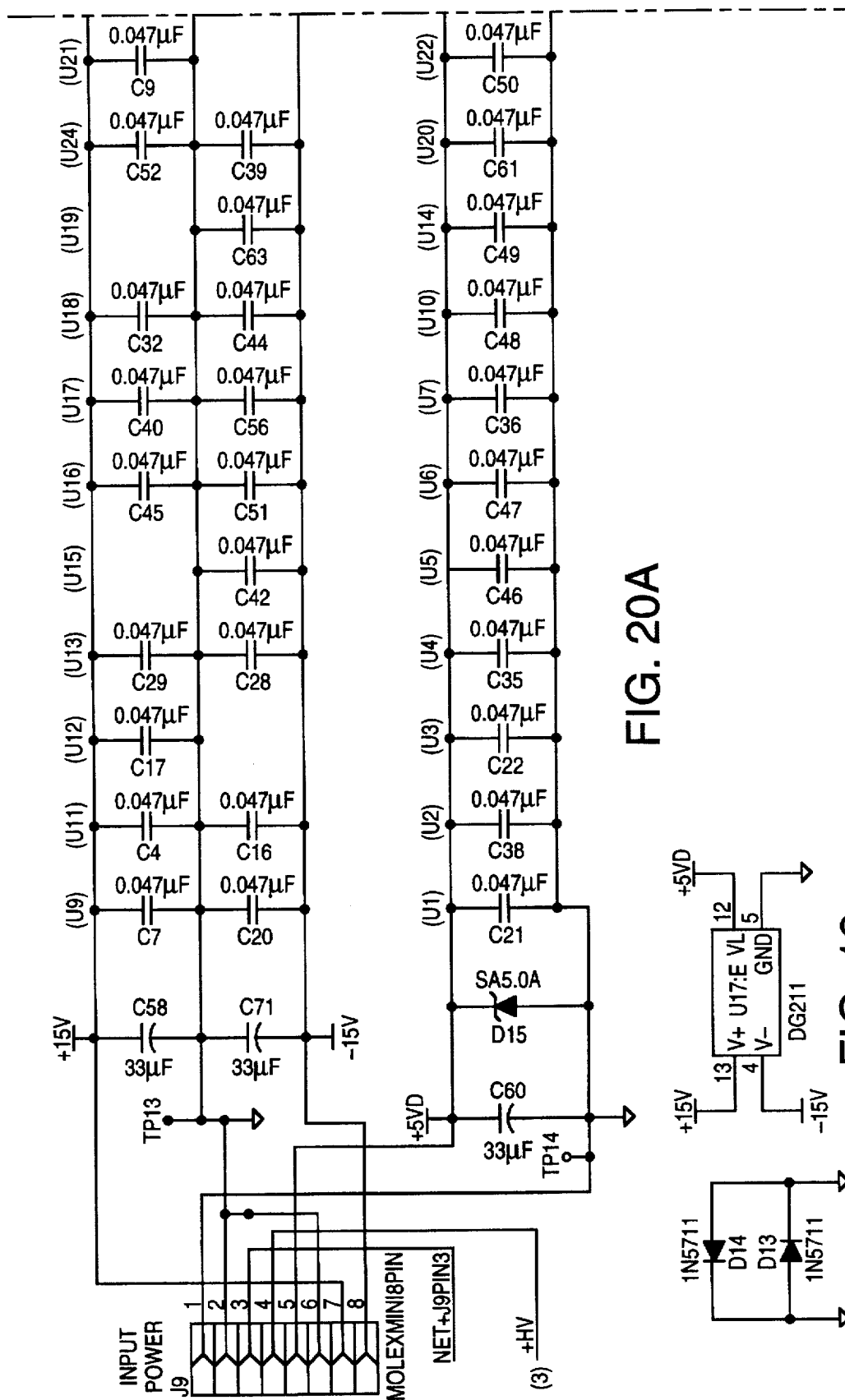
Figure 20:
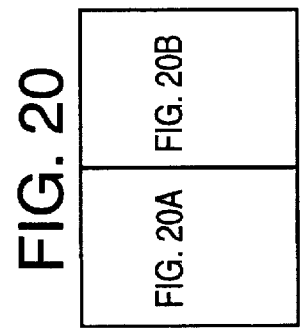
Figure 20B:
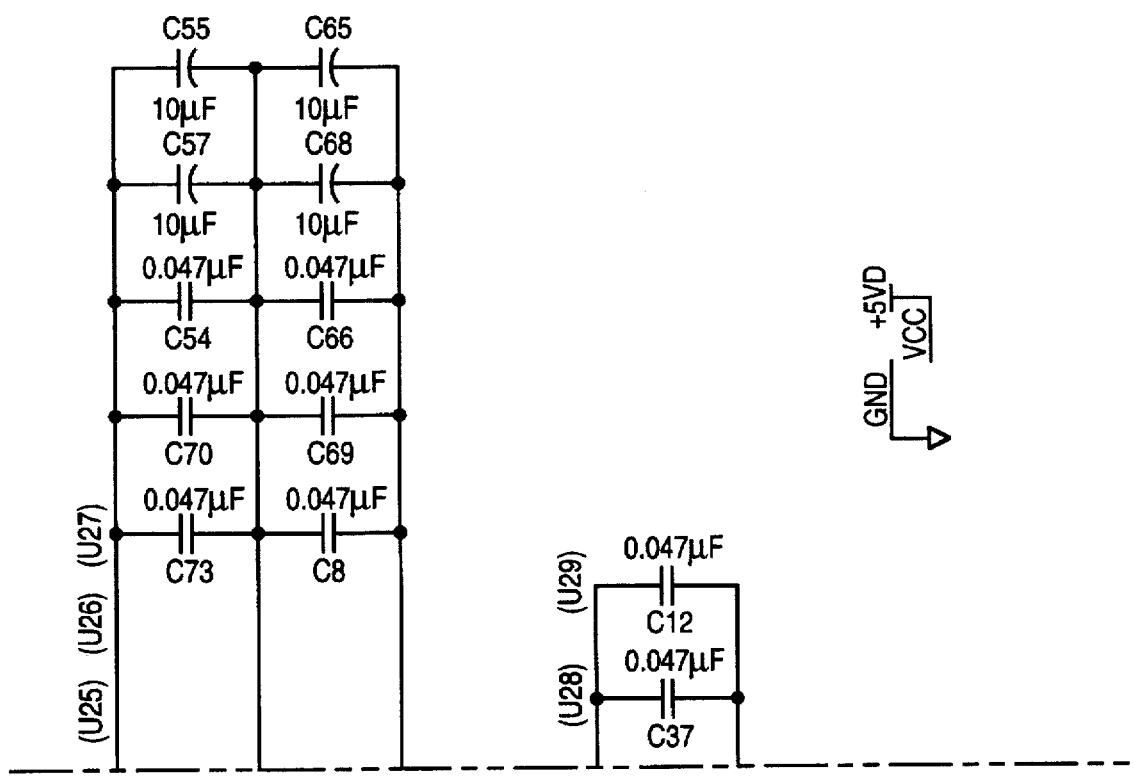
Figure 21:
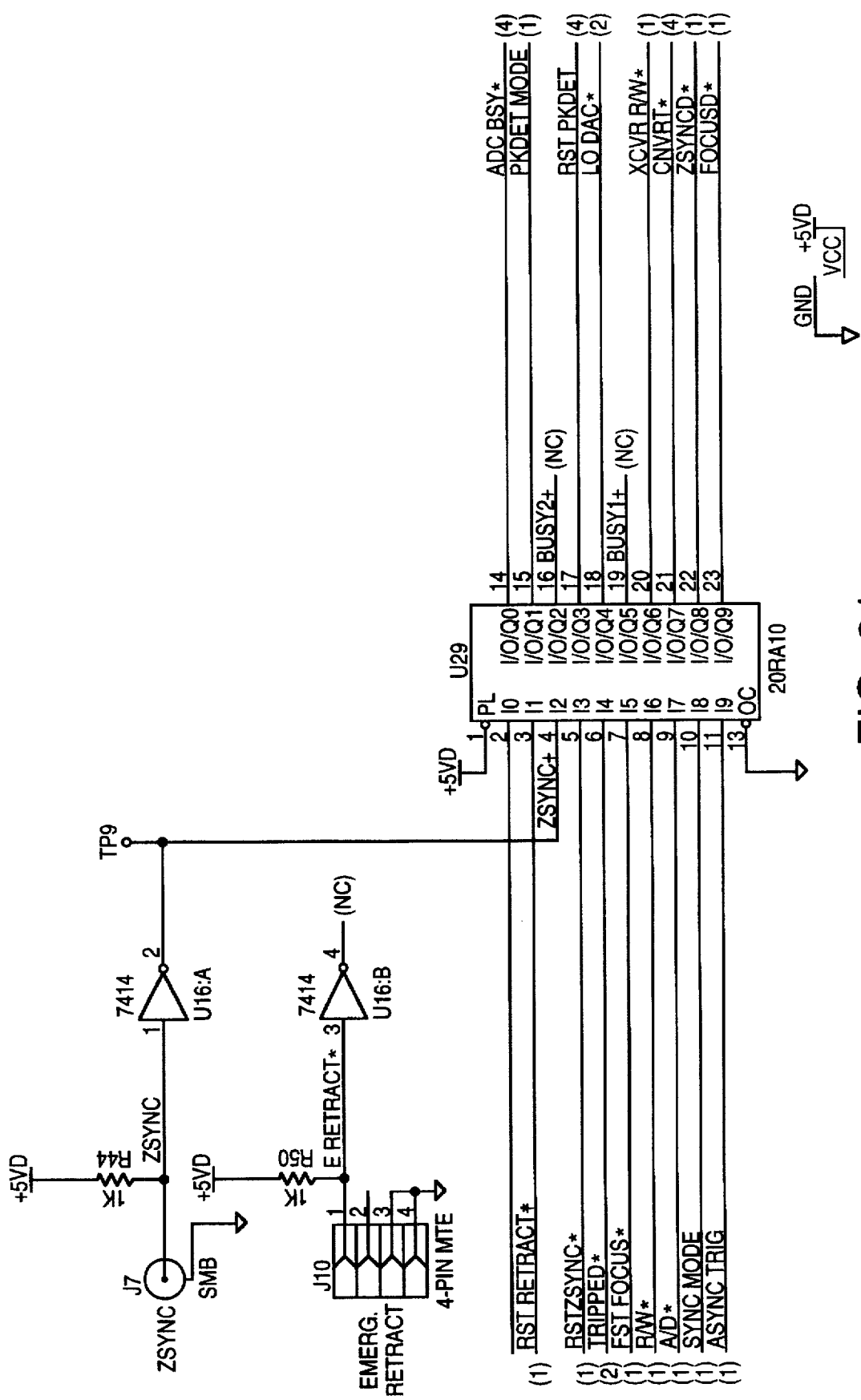

Area peak detector 1210 consists primarily of op-amps U26 and U27 (FIG. 14). The "hold" capacitor for area peak detector 1210 is C67. When the input voltage at pin 3 of op-amp U26 is greater than the hold voltage at capacitor C67, D9 is reverse-biased, so op-amp U26 has no feedback (at least momentarily). The output of op-amp U26 will therefore rise until op-amp U27 responds to the increased output of op-amp U26 and provides feedback via resistor R47. In this manner, when the input voltage to op-amp U26 is greater than the hold voltage, op-amp U26 drives the hold voltage higher to equal the input voltage. When the input voltage to op-amp U26 is less than the hold voltage, a diode D12 is reverse-biased and op-amp U26 receives a feedback signal through diode D9. Because diode D12 is reverse-biased, changes in the input voltage at op-amp U26 do not affect the hold voltage when op-amp U26's input voltage is less than the hold voltage.

Op-amp U27 buffers the hold voltage to minimize the current drawn from hold capacitor C67 (and hence the droop rate), and to provide feedback to op-amp U26. Transistor Q2 resets hold capacitor 67. Transistor Q1 guarantees that the input voltage of op-amp U26 is less than the hold voltage during reset (the hold voltage is zero during reset), so that transistor U26 does not slew positive during the reset operation. When the input voltage at U26 pin 3 is greater than the hold voltage at C67, D9 is reverse biased, so U26 has no feedback (at least momentarily). U26's output rises (slews positive) at the maximum rate possible for the particular op-amp (its "slow side") until U27 responds to the increased output of U26 and provides feedback via R47.

Diode D10 and resistor R46 establish a small negative voltage (approx. −0.4 V in one embodiment) for clamping the input signal during reset. Resistors R53 and R47 slow down area peak detector 1210, to reduce overshoot that is common in conventional area peak detectors. Resistor R53 limits the rate at which capacitor C67 can be charged, resulting in an acquisition bandwidth of 2.3 MHz in one embodiment. Resistor R47 works with parasitic capacitance of U26 and D9 to form a feedback filter for composite op-amp U26/U27. Resistor R47 acts to stabilize (reduce overshoot) of the composite op-amp. Both resistors R53 and R47 are determined empirically. Even with resistors R53 and R46, area peak detector 1210 provides an extremely fast response, and the combination of resistor R52 and capacitor C64 acts as a filter to limit the bandwidth of the input signal, so that high frequency noise does not pass through to area peak detector 1210.

An auto-focus routine AFPeakSync (page 37 of microfiche appendix B) that performs an autofocus operation during using an area scan method by a microscope system 100 is similar to auto-focus routine AFFast (page 36 of microfiche appendix B) described above (FIG. 8B). As seen in FIG. 8B, in a first fine pass, auto-focus routine AFFast steps from bottom to top of the fine Z-axis range of movement in large steps, then returns to a position below the coarse step that had the highest focus signal.

In a second fine pass, auto-focus routine AFFast then steps upward again, but this time in small steps (e.g. 0.098 μm). Auto-focus routine AFFast causes a large acceleration due to direction reversal just before the second fine pass by stepping to a position just below the estimated focus position (FIG. 8B). [Larger accelerations imply larger position errors in fine Z-stage 120 and are preferably avoided to improve positioning fidelity.]

Auto-focus routine AFPeakSync also uses two fine passes: a first fine pass and a second fine pass. The first fine pass of routine AFPeakSync (henceforth "AFPeakSync first fine pass") differs from the coarse pass of the coarse Z-stage in the manner described below. The AFPeakSync first fine pass operates similar to the coarse pass of auto-focus routine AFFast. There is no synchronization, and auto-focus routine AFPeakSync steps and measures as quickly as possible, using large steps (e.g. 1.56 micrometer).

Software (Appendix F) in host workstation 116 sets up the page scanner (not shown) to perform the area scan method during the AFPeakSync first fine pass. Routine lonuiSuperfineAF sets up all parameters for use in the area scan method. In routine lonuiSuperFineAF, function lonui_Get_IndexFrPixZoomEnum returns with the current X and Y scanner parameters, such as amplitude of oscillation. After the scanner parameters are set, host workstation 116 instructs fine Z-axis controller 118 to execute a fine autofocus operation. After the fine auto-focus operation is done, host workstation 116 returns scanner parameters to their original values.

In alternative embodiments, the page scanner can execute a line scan method or a spot method during the AFPeakSync first fine pass. The AFPeakSync first fine pass is merely used to move target 112 close enough to focus position 112 so that a AFPeakSync second fine pass can correct residual errors.

Auto-focus routine AFPeakSync avoids the large acceleration of auto-focus routine AFFast in a second fine pass by stepping to a position above the estimated focus position at the end of a first fine pass and continuing in small steps for the second fine pass in the same direction, as illustrated by FIG. 8C.

In one embodiment, a second fine pass in auto-focus routine AFPeakSync covers twice the range of a fine pass in auto-focus routine AFFast, which reduces sensitivity to manufacturing variations and improves performance of the autofocus operation. The increased range of the AFPeakSync second fine pass compensates for any position errors in the AFPeakSync first fine pass that could result in a AFPeakSync step with the highest focus strength being off by one rough step.

Auto-focus routine AFPeakSync spends two page scanner cycles at each position of the AFPeakSync second fine pass. The first cycle allows the fine Z-axis (signal ACTUAL Z POSITION in FIG. 13C) to settle out, and the second cycle acquires the peak magnitude of electronic focus signal 115 from the page scan at the current elevation. Another embodiment of an auto-focus routine can spend only one page scanner cycle by allowing the fine Z movement to settle during a trace 1310 and by acquiring the peak during the retrace 1320.

Auto-focus routine AFPeakSync executes in about 1.5 seconds, compared to 0.9 seconds for auto-focus routine AFFast because of the time required to perform an area scan at each of several elevations of target 112. In spite of such an increased execution time, a microscope system that uses auto-focus routine AFPeakSync is faster overall as compared to a microscope system that uses auto-focus routine AFFast, because with increased reliability of the auto-focus operation using routine AFPeakSync, manual focus adjustments are needed only rarely.

Figure 13C:
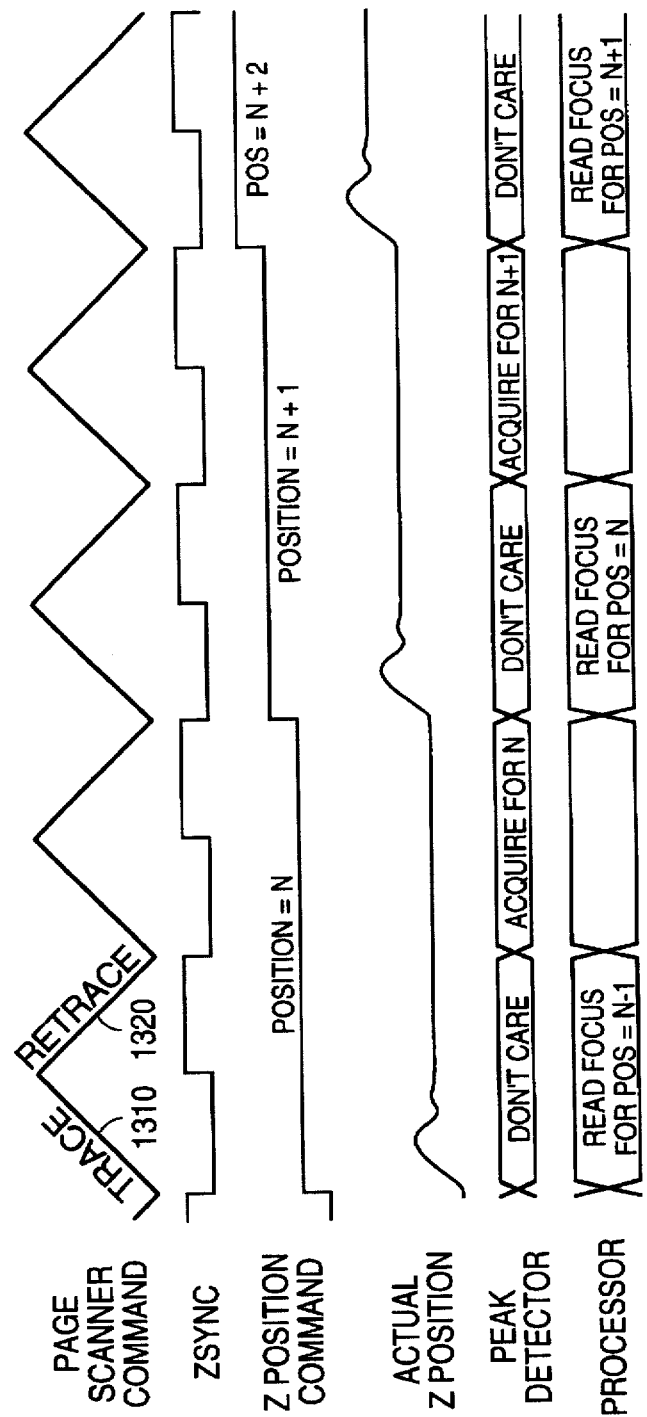

The first fine pass of auto-focus routine AFPeakSync steps as quickly as possible irrespective of where the scanner is during sampling. In the second fine pass, however, auto-focus routine AFPeakSync runs the page scanner at a high rate (>100 Hz) and allows one page scanner cycle for fine Z-stage 120 to settle, before doing data acquisition on the next cycle, as illustrated in FIG. 13C. Auto-focus routine AFPeakSync therefore spends two page scanner cycles at each Z position (e.g. elevation). Furthermore, in area peak detector mode, an analog-to-digital converter 5021 is automatically started when a rising edge in signal ZSYNC occurs, and area peak detector 1210 is automatically reset. So, auto-focus routine AFPeakSync causes host microprocessor 5000 to wait for a rising edge in signal ZSYNC and then read the peak magnitude detected from the previous page scan from analog-to-digital converter 5021. Resetting signal ZSYNC also resets analog-to-digital converter 5021 and so ADC 5021 is read before resetting signal ZSYNC.

In peak detector mode, analog-to-digital converter 5021 is controlled only by a rising edge in signal ZSYNC. An asynchronous conversion is not possible without resetting the peak detector mode bit. Peak detector 1210 obtains a representation of the highest intensity that occurred in a video frame at a given Z elevation. Peak detector 1210 allows microscope system 100 to repeatably focus on the layer with the highest reflectivity.

Microscope system 100 can use programmable offset FocOff to allow the user to select any predetermined layer to focus on. In one embodiment, microscope system 100 initially focuses on a layer ("brightest layer") of target 112 that generates the largest electronic focus signal. The user can adjust the position of target 112 to bring a predetermined layer into focus. Microscope system 100 records the target's adjustment as an offset from the brightest layer. In subsequent auto-focus operations, microscope system 100 focuses on the brightest layer and then automatically moves target 112 through the adjustment offset that was specified by the user, to focus on the predetermined layer.

As the relative reflectivities of the layers in a wafer are repeatable and independent of the illumination power, the relative positions of a predetermined layer chosen by a user is at a repeatable offset from the brightest layer. So microscope system 100 can repeatably focus on any predetermined layer after a single adjustment. Microscope system 100 focuses on such a predetermined layer as long as the layer structure stays constant, for example for array type structures, such as RAM arrays. If, after selecting a predetermined layer, areas off a RAM array are to be imaged, a simple re-adjustment allows the user to continue.

In one embodiment, the function to specify the offset is implemented as a system function that can be mapped by a user to any function key of host workstation 116. Once mapped to a function key, the offset function can be accessed by the user from the keyboard at any time. When so accessed, host workstation 116 compares the current target position with the focus position estimate of last auto-focus operation, calculates the difference and stores the difference as the offset for finding the predetermined layer in future auto-focus operations.

The offset is limited to ±5 microns, to make it easier to recover from an improperly set offset (a typical semiconductor topology is less than 1 µm) and only fine Z-stage 120 is moved during offset calculation. The offset is calculated assuming coarse Z-stage 122 has not moved since last auto-focus operation.

While the present invention has been described in connection with specific embodiments, variations on these embodiments will be obvious to those having ordinary skill in the art. For example, target 112 may be moved by means other than a stepper motor or a piezoelectric element, such as a linear voice coil motor or an electrostrictive actuator. Furthermore, target 112 can initially be positioned above the focus position, with the first pass in any of the embodiments beginning by moving target 112 in a negative Z direction. In addition, although the present invention was described in connection with a microscope that reflects a maximum intensity to the photodetector during a focused condition, it is clear that the invention may be modified to operate with a microscope that reflects a minimum intensity to the photodetector during a focused condition.

Furthermore, although the invention, as described, utilizes a laser beam 123 to perform both the auto-focusing and imaging operations, it is understood that a confocal laser optical system could be used to perform an auto-focusing operation for a non-confocal microscope system which utilizes only a white light source to perform the imaging operation. Such an application is advantageous because a non-confocal microscope system utilizing a white light imaging source results in a focus signal which is sinc function, rather than a sinc squared function. Because the sinc function does not exhibit a peak which is as pronounced as the sinc squared function, it is more difficult to determine the focus position using a focus signal generated by a non-confocal, white light optical system. Therefore, using a confocal laser optical system to generate the focus signal used to perform the auto-focus operation in a white light microscope results in a superior electronic focus signal, thereby allowing the auto-focus operation to be performed with greater precision. Confocal white light can also be used, with scanning replaced by detector array, such as a camera.

Although a certain number and types of passes are described above, other number and types of passes can also be used. For example a microscope system 100 can perform a single pass in a coarse auto-focus operation using a median point method and adjust the gain of photodetector 114 followed by two passes in a fine auto-focus operation to estimate focus position 203.

Various embodiments of the invention described above are encompassed by the attached claims.

What is claimed is:

1. A method for automatic focusing of a confocal microscope, said microscope transmitting a laser beam through a lens and through a pinhole of a spatial filter to a surface of a target, said method comprising the steps of:

moving a target relative to a lens of said microscope, said target being moved in a predetermined first direction through a predetermined first distance;

generating an electronic focus signal during movement of said target, the magnitude of said electronic focus signal being a function of the magnitude of light from said laser beam that is reflected from said surface and passes through said pinhole;

recording a plurality of first values of the magnitude of said electronic focus signal during the movement of said target in said first direction; and stopping said movement of said target when said target has travelled through said first predetermined distance, said first predetermined distance being greater than the depth of focus of said lens, said depth of focus being larger than the distance between two adjacent positions at which said first values are recorded, wherein after stopping, said target is at a position other than a position at which said microscope is focused.

2. The method of claim 1, further comprising, after said stopping step the steps of:

calculating a first estimate of a focus position at which the microscope is focused by using said plurality of first values;

moving said target relative to said lens in a second direction, said second direction being opposite said first direction;

generating said electronic focus signal during movement of said target in said second direction;

recording a plurality of second values of said magnitude of said electronic focus signal during movement of said target in said second direction; and stopping said movement of said target in said second direction when said target reaches a stop position, wherein said stop position is derived from said first estimate.

3. The method of claim 2 further comprising:

calculating a second estimate of the position at which said microscope is focused by using said plurality of second values; and moving said target to said second estimate.

4. The method of claim 2 wherein said calculating step comprises:

summing all of said plurality of first values to generate a full-sum;

dividing said full-sum by 2 to generate a half-sum; and repeatedly summing a sequence of said plurality of first values to generate a plurality of partial sums until one of said plurality of partial sums exceeds said half-sum.

5. The method of claim 4 further comprising using the elevation at which said partial sum exceeds said half-sum as said first estimate.

6. The method of claim 4 further comprising determining a starting position and a stopping position, said stopping position and said starting position being on opposite sides of an estimated focus position, wherein said starting position is at a distance of at least a depth of focus of said lens from said estimated focus position and further wherein said stopping position is at said distance.

7. The method of claim 6 further comprising a start-up move for moving said target to said starting position if said target is away from said starting position.

8. The method of claim 2, wherein said target is moved through said first distance at a first velocity and through said second distance at a second velocity, said second velocity being less than said first velocity.

9. The method of claim 1, further comprising calculating a first estimate of the position at which the microscope is focused by using said plurality of first digitized values.

10. The method of claim 9, further comprising moving said target to said first estimate.

11. The method of claim 1, wherein said target is moved by a stepper motor or by a piezo electrically driven element.

12. The method of claim 1, wherein said step of generating further comprises:

measuring said intensity of light reflected from said surface of said target through said pin hole in a direction reverse to the incident path of said laser beam; and transforming said measured intensity into said electronic focus signal.

13. The method of claim 12, wherein said step of transmitting further comprises moving said laser beam to define a line on said surface of said target.

14. The method of claim 1 further comprising the step of setting up gain and adjusting the gain if said target moves through said first distance without said absolute value of said magnitude of said electronic focus signal being a predetermined optimal value.

15. The method of claim 1 wherein said recording occurs at periodic intervals.

16. The method of claim 1 wherein the majority of said first digitized values are non-zero.

17. A method for positioning a target close to a focus position in a confocal microscope, said confocal microscope generating an electronic focus signal having a magnitude proportional to light reflected by said target, said electronic focus signal having a peak that indicates a focus condition, said method comprising the steps of:

positioning said target such that said focus position is within a first range of motion of said target;

moving said target a plurality of first steps through said first range of motion of said target, each of said first steps having a first width;

measuring a plurality of first strengths of said electronic focus signal at each of said first steps;

calculating a first estimate of the position at which said confocal microscope is focused by using said plurality of first strengths;

moving said target a plurality of second steps through a second range of motion, wherein said second range of motion includes second steps above and below said first estimate, each of said second steps having a second width;

measuring a plurality of second strengths of said electronic focus signal at each of said second steps;

calculating a second estimate of the position at which said confocal microscope is focused by using said plurality of second strengths;

moving said target to said second estimate.

18. The method of claim 17, wherein said second range of motion is shorter than said first range of motion.

19. The method of claim 17, wherein said second width is shorter than said first width.

20. The method of claim 17, wherein said first width is smaller than width of said focus signal.

21. The method of claim 17, wherein said target is moved in a first direction through said plurality of first steps and in a second direction through said plurality of second steps, said second direction being identical to said first direction.

22. The method of claim 17, wherein said target is moved in a second direction through said plurality of second steps and in a second direction through said plurality of second steps, said second direction being opposite to said first direction.

23. A method for automatically focusing a microscope that transmits a laser beam through a lens and through a pinhole of a spatial filter to a surface of a target, said method comprising the steps of:

moving a target relative to a lens of said microscope in a first direction;

generating an electronic focus signal for a plurality of points in an area of said target at least three points of said plurality of points defining a plane;

recording as a first value the largest value of said electronic focus signal for said plurality of points for each position in a plurality of first positions of said target with respect to said lens; and stopping said movement of said target when said target has travelled through a first predetermined distance, wherein said first predetermined distance is at a position other than a position at which said microscope is focused.

24. The method of claim 23, further comprising, after said stopping step the steps of:

calculating a first estimate of the position at which the microscope is focused by using a plurality of said first values;

moving said target relative to said lens in a second direction, said second direction being opposite said first direction;

generating said electronic focus signal for a plurality of points in said area of said target, at least three points of said plurality of points defining a plane;

recording as a second value, the largest value of said electronic focus signal for said plurality of points for each position in a plurality of second positions of said target with respect to said lens; and stopping said movement of said target in said second direction when said target reaches a stop position, wherein said stop position is derived from said first estimate.

25. The method of claim 23 further comprising:

calculating a second estimate of the position at which said microscope is focused by using said plurality of second values; and moving said target to said second estimate.

26. The method of claim 23 wherein said target is moved through said first distance at a first velocity and through said second distance at a second velocity, said second velocity being less than said first velocity.

27. The method of claim 23 wherein said second direction is identical to said first direction.

28. The method of claim 23 wherein said second direction is opposite to said first direction.

29. An apparatus for automatic focusing of a confocal microscope, said microscope having a laser, a lens and a spatial filter, said apparatus comprising:

means for moving a target relative to said lens of said microscope, said target being moved in a predetermined first direction through a predetermined first distance;

means for generating an electronic focus signal during movement of said target, the magnitude of said electronic focus signal being a function of the magnitude of light from said laser beam that is reflected from said surface and passes through said spatial filter;

means for recording a plurality of first values of the magnitude of said electronic focus signal during the movement of said target in said first direction, said means for recording being coupled to said means for generating; and means for stopping said movement of said target when said target has travelled through said first predetermined distance, said first predetermined distance being greater than the depth of focus of said lens, said depth of focus being larger than the distance between two adjacent positions at which said first values are recorded, wherein after stopping, said target is at a position other than a position at which said microscope is focused.

30. The apparatus of claim 29 further comprising a peak detector coupled to said means for recording, wherein said peak detector supplies the maximum value of said electronic focus signal that is encountered while a laser beam is scanned across an area of said target, while said target is held stationary.

* * * * *